US012762926B2

(12) United States Patent
Sharma et al.

(10) Patent No.: US 12,762,926 B2
(45) Date of Patent: Oct. 13, 2026

(54) SYSTEMS AND METHODS FOR CASINO ASSET LOCATION MONITORING

(71) Applicant: Aristocrat Technologies, Inc., Las Vegas, NV (US)

(72) Inventors: Rajneesh Sharma, Las Vegas, NV (US); Jared Mayberry, Richmond (CA); Kristofor Jacobson, Las Vegas, NV (US); Binh Nguyen, Reno, NV (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 307 days.

(21) Appl. No.: 18/470,299

(22) Filed: Sep. 19, 2023

(65) Prior Publication Data

US 2024/0013615 A1 Jan. 11, 2024

Related U.S. Application Data

(63) Continuation-in-part of application No. 17/985,067, filed on Nov. 10, 2022, now Pat. No. 12,430,986.

(60) Provisional application No. 63/497,624, filed on Apr. 21, 2023, provisional application No. 63/409,972, filed on Sep. 26, 2022, provisional application No. 63/409,977, filed on Sep. 26, 2022, provisional application No. 63/278,237, filed on Nov. 11, 2021.

(51) Int. Cl.
*G07F 17/32* (2006.01)

(52) U.S. Cl.
CPC ...... *G07F 17/3232* (2013.01); *G07F 17/3223* (2013.01)

(58) Field of Classification Search
CPC .......................... G07F 17/3232; G07F 17/3223
See application file for complete search history.

(56) References Cited

U.S. PATENT DOCUMENTS

| | | | |
|---|---|---|---|
| 6,935,958 | B2 | 8/2005 | Nelson |
| 7,357,299 | B2 | 4/2008 | Frerking |
| 7,438,221 | B2 | 10/2008 | Washington |

(Continued)

OTHER PUBLICATIONS

International Search Report and Written Opinion issued in PCT/US22/79672, mailing date Feb. 15, 2023, 15 pages.

(Continued)

*Primary Examiner* — Kevin Y Kim
(74) *Attorney, Agent, or Firm* — Armstrong Teasdale LLP

(57) ABSTRACT

In one aspect, a management system configured to monitor locations of a plurality of gaming assets of a gaming venue is provided. The management system includes a host system and a plurality of location controllers. The plurality of location controllers are in wireless communication with the host system and form a wireless network therebetween. At least one location controller of the plurality of location controllers is coupled to a gaming asset of the plurality of assets. The location controller is configured to determine, based on the information retrieved via the wireless network, a location of the location controller, determine whether the location of the location controller has changed, and forward the information retrieved via the wireless network to the host system for updating the location of the gaming asset within the gaming venue in response to determining that the location of the location controller has changed.

16 Claims, 40 Drawing Sheets

(56) References Cited

U.S. PATENT DOCUMENTS

| | | | |
|---|---|---|---|
| 7,492,267 | B2 | 2/2009 | Bilyeu |
| 7,701,344 | B2 | 4/2010 | Mattice |
| 7,780,526 | B2 | 8/2010 | Nguyen |
| 7,883,003 | B2 | 2/2011 | Giobbi |
| 8,172,684 | B2 | 5/2012 | Adiraju |
| 8,226,474 | B2 | 7/2012 | Nguyen |
| 8,267,792 | B2 | 9/2012 | Buchholz |
| 8,282,465 | B2 | 10/2012 | Giobbi |
| 8,282,490 | B2 | 10/2012 | Arezina |
| 8,392,506 | B2 | 3/2013 | Rowe |
| 8,506,395 | B2 | 8/2013 | Bytnar |
| 8,512,144 | B2 | 8/2013 | Johnson |
| 8,616,984 | B2 | 12/2013 | Mattice |
| 8,618,932 | B2 | 12/2013 | Maia |
| 8,814,706 | B2 | 8/2014 | Wells |
| 8,834,254 | B2 | 9/2014 | Buchholz |
| 9,153,095 | B2 | 10/2015 | Adiraju |
| 9,204,291 | B2 | 12/2015 | Jackson |
| 9,245,408 | B2 | 1/2016 | Jabara |
| 9,269,221 | B2 | 2/2016 | Gobbi |
| 9,322,974 | B1 | 4/2016 | Giobbi |
| 9,380,417 | B1 | 6/2016 | Boyle |
| 9,483,905 | B2 | 11/2016 | Oberberger |
| 9,552,693 | B1 | 1/2017 | Reeves |
| 9,749,780 | B2 | 8/2017 | Huang |
| 9,852,578 | B2 | 12/2017 | Nelson |
| 10,217,318 | B2 | 2/2019 | Boudreau |
| 10,395,465 | B2 | 8/2019 | Bytnar |
| 10,591,303 | B2 | 3/2020 | Nelson |
| 10,706,677 | B2 | 7/2020 | Nelson |
| 10,748,381 | B2 | 8/2020 | Lestrange |
| 10,769,885 | B2 | 9/2020 | Hoehne |
| 10,818,132 | B2 | 10/2020 | Abouchar |
| 10,825,292 | B2 | 11/2020 | Schwartz |
| 10,986,607 | B2 | 4/2021 | Ta |
| 11,043,066 | B2 | 6/2021 | Shepherd |
| 11,191,055 | B1 | 11/2021 | Swope |
| 2008/0015013 | A1* | 1/2008 | Gelman .............. G07F 17/3241 463/25 |
| 2010/0085916 | A1 | 4/2010 | Yu |
| 2011/0130197 | A1* | 6/2011 | Bytnar ................ G07F 17/3227 463/25 |
| 2011/0183732 | A1 | 7/2011 | Block |
| 2012/0046096 | A1* | 2/2012 | Morrison ............ G07F 17/3237 463/25 |
| 2012/0231886 | A1 | 9/2012 | Gomez |
| 2013/0065666 | A1 | 3/2013 | Schueller |
| 2013/0080238 | A1 | 3/2013 | Kelly |
| 2013/0310163 | A1 | 11/2013 | Smith |
| 2017/0061442 | A1 | 3/2017 | Barlow |
| 2018/0053194 | A1 | 2/2018 | Bond |
| 2019/0035224 | A1 | 1/2019 | Okahara |
| 2019/0180558 | A1 | 6/2019 | Merati |
| 2019/0295368 | A1 | 9/2019 | Arnone |
| 2020/0206614 | A1 | 7/2020 | Colenbrander |
| 2021/0005047 | A1 | 1/2021 | Nguyen |
| 2021/0287486 | A1 | 9/2021 | Nguyen |
| 2021/0350659 | A1 | 11/2021 | Purohit |
| 2021/0350674 | A1 | 11/2021 | Nelson |
| 2021/0390828 | A1 | 12/2021 | Kubajak |

OTHER PUBLICATIONS

Zimmerman et al., "Magic quadrant for indoor location services" Gartner, published Feb. 23, 2022, ID: G00746167, 28 pages.

MeshTrack, Mest Network Indoor Location Tracking, https://ximplar.com, Copyright 2019, 13 pages.

Office Action (Final Rejection) dated May 23, 2025 for U.S. Appl. No. 17/985,057 (pp. 1-8).

Office Action (Non-Final Rejection) dated Aug. 29, 2025 for U.S. Appl. No. 17/985,057 (pp. 1-8).

Office Action (Final Rejection) dated Jun. 26, 2025 for U.S. Appl. No. 17/985,075 (pp. 1-10).

Office Action (Notice of Allowance and Fees Due (PTOL-85)) dated Oct. 28, 2025 for U.S. Appl. No. 17/985,075 (pp. 1-9).

* cited by examiner

Meshed Routers, Multi-Radio

SYSTEMS AND METHODS FOR CASINO ASSET LOCATION MONITORING

CROSS-REFERENCE TO RELATED APPLICATIONS

This application claims priority to U.S. Provisional Patent Application No. 63/497,624, filed Apr. 21, 2023 and titled "SYSTEM AND METHODS FOR CASINO ASSET LOCATION MONITORING" and further, this application is a continuation-in-part of U.S. Non-Provisional patent application Ser. No. 17/985,067, filed Nov. 10, 2022, and titled "MODULAR HARDWARE AND SOFTWARE PLATFORM FOR A GAMING SYSTEM", which claims priority to U.S. Provisional Patent Application No. 63/278,237, filed Nov. 11, 2021, and titled "MODULAR HARDWARE AND SOFTWARE PLATFORM FOR A GAMING SYSTEM"; U.S. Provisional Patent Application No. 63/409,977, filed Sep. 26, 2022 and titled "ELECTRONIC GAME DEVICE INTEROPERABILITY WITH CASINO MANAGEMENT SYSTEMS"; and U.S. Provisional Patent Application No. 63/409,972, filed Sep. 26, 2022 and titled "SYSTEMS AND METHODS FOR CAPTURING REAL-TIME DATA FOR OPTIMIZING A CASINO ENVIRONMENT", all of which are hereby incorporated by reference in their entirety.

TECHNICAL FIELD

The field of this disclosure relates generally to electronic gaming, and more specifically, to systems and methods for tracking the location of casino assets.

BACKGROUND

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

Some known gaming devices may also use historical horse racing results (e.g., or other historical data) to determine wagering game outcomes. In some known systems, it may be desired and/or required for at least a portion of a historical event associated with the historical data to be displayed. Thus, according to some known systems, if a display device configured to display historical event malfunctions or is otherwise inoperable, a gaming device associated with that display device may be required to shut down until that display device is fixed or replaced (e.g., because until the display device is fixed, the historical event(s) desired/required to be displayed as part of an electronic game will not be displayed). Accordingly, systems and methods are desired for dynamic monitor detection in electronic gaming such that if an initial display device becomes inoperable, data is automatically displayed on a different display device instead of requiring a shutdown of the gaming device until the initial display device is fixed and/or replaced.

BRIEF DESCRIPTION

In one aspect, a management system configured to monitor locations of a plurality of gaming assets of a gaming venue is provided. The management system includes a host system and a plurality of location controllers. The plurality of location controllers are in wireless communication with the host system and form a wireless network therebetween. At least one location controller of the plurality of location controllers is coupled to a gaming asset of the plurality of assets. The at least one location controller is configured to determine, based on the information retrieved via the wireless network, a location of the at least one location controller, determine whether the location of the at least one location controller has changed, and forward the information retrieved via the wireless network to the host system for updating the location of the gaming asset within the gaming venue in response to determining that the location of the at least one location controller has changed.

In another aspect, a method operable by a management system for monitoring locations of a plurality of gaming assets of a gaming venue is provided. The management system includes a host system and a plurality of location controllers in wireless communication with the host system and forming a wireless network therebetween. The method includes coupling a location controller of the plurality of location controllers to a gaming asset of the plurality of gaming assets, and determining, by the location controller and based on information retrieved via the wireless network, a location of the location controller. The method further includes determining, by the location controller, whether the location of the location controller has changed, and forwarding, by the location controller, the information retrieved via the wireless network to the host system for updating the location of the gaming asset within the gaming venue in response to determining that the location of the location controller has changed.

In another aspect, a management system configured to monitor locations of a plurality of devices within a gaming venue is provided. The management system includes a host system and a plurality of location controllers in wireless communication with the host system and forming a wireless network therebetween. At least on location controller of the plurality of location controllers is configured to receive wireless identifiers from at least one of the plurality of devices that are proximate to the at least one location controller, identify, based on the wireless identifiers, which of the at least one of the plurality of devices is a mobile device, determine whether a location of the mobile device has changed, and forward information regarding the mobile device to the host system for updating the location of the mobile device within the gaming venue in response to determining that the location of the mobile device has changed.

DETAILED DESCRIPTION

Figure 1:
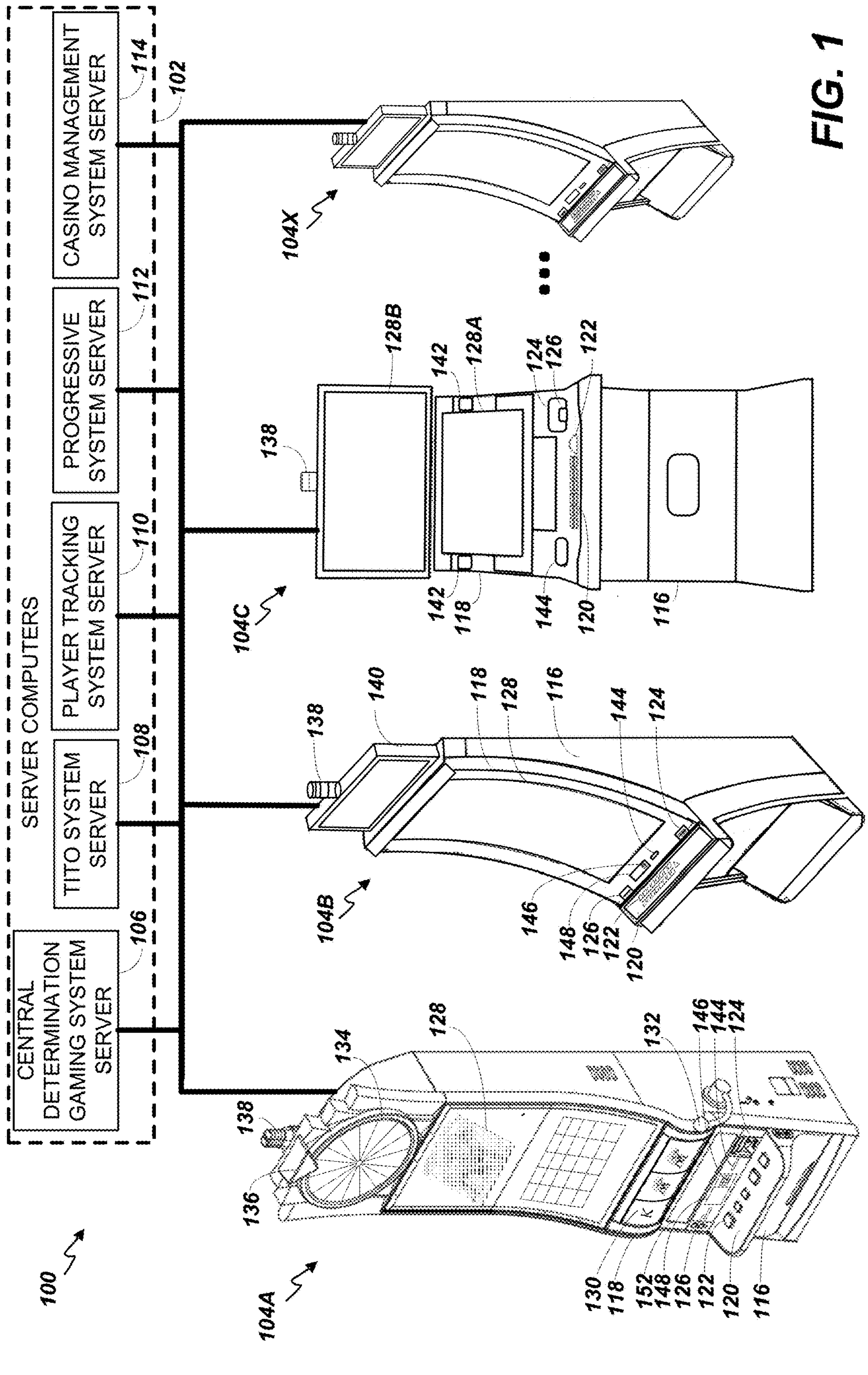
FIG. 1 illustrates several different models of EGMs which maybe be networked to various gaming related servers in an example embodiment.

FIG. 1 illustrates several different models of EGMs which may be networked to various gaming related servers in an example embodiment. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat ° Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
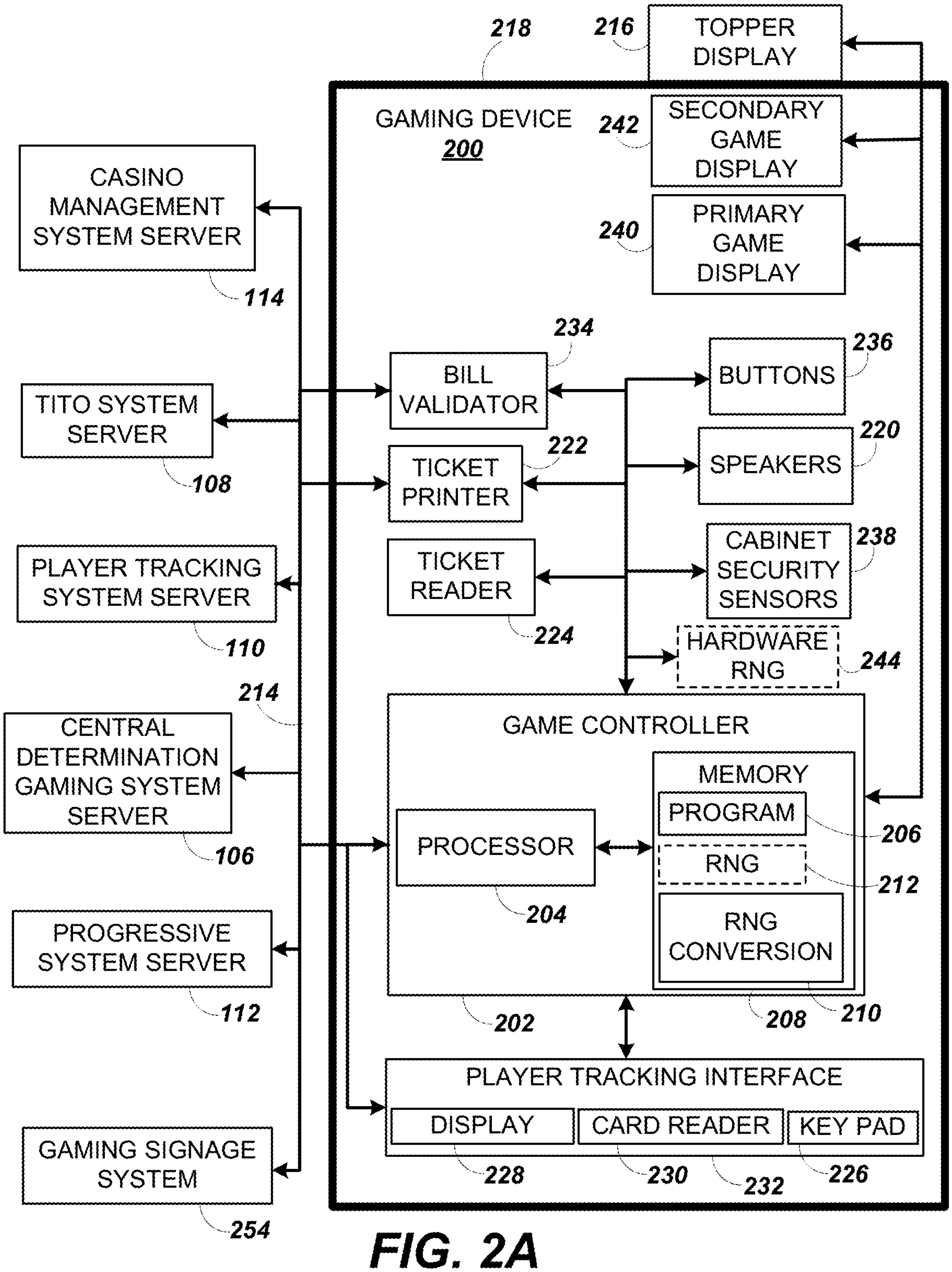
FIG. 2A is a block diagram depicting various functional elements of an EGM in an example embodiment.

Many or all the above-described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat ° Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat ° Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting various functional elements of a gaming device 200 (e.g., an EGM) in an example embodiment. All or parts of gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110.

Player tracking system server 110 may be, for example, an OASIS ° system manufactured by Aristocrat ° Technologies, Inc. Player tracking system server 110 is used to track play (e.g., amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
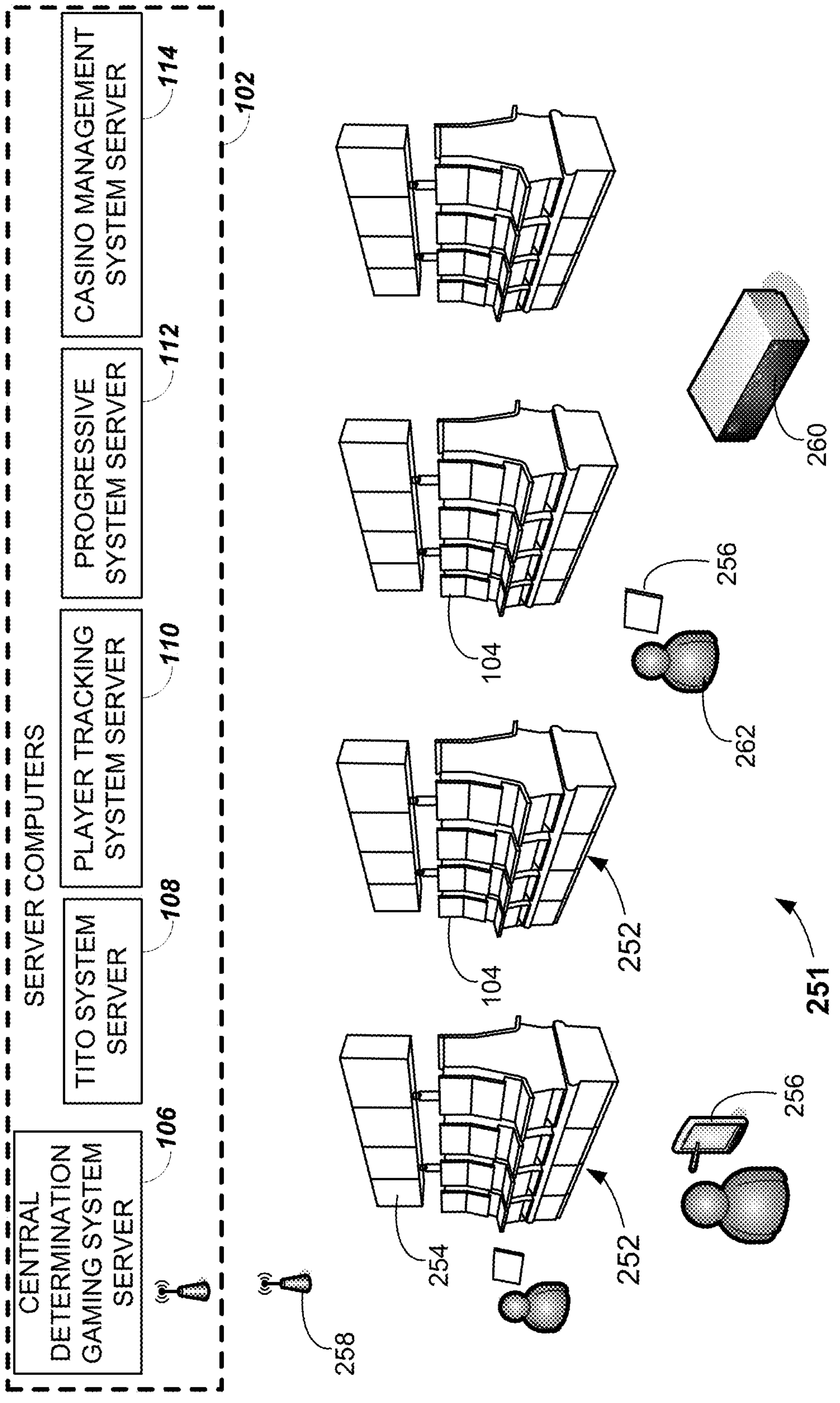
FIG. 2B depicts a casino gaming environment in an example embodiment.

FIG. 2B depicts a casino gaming environment in an example embodiment. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

Figure 2C:
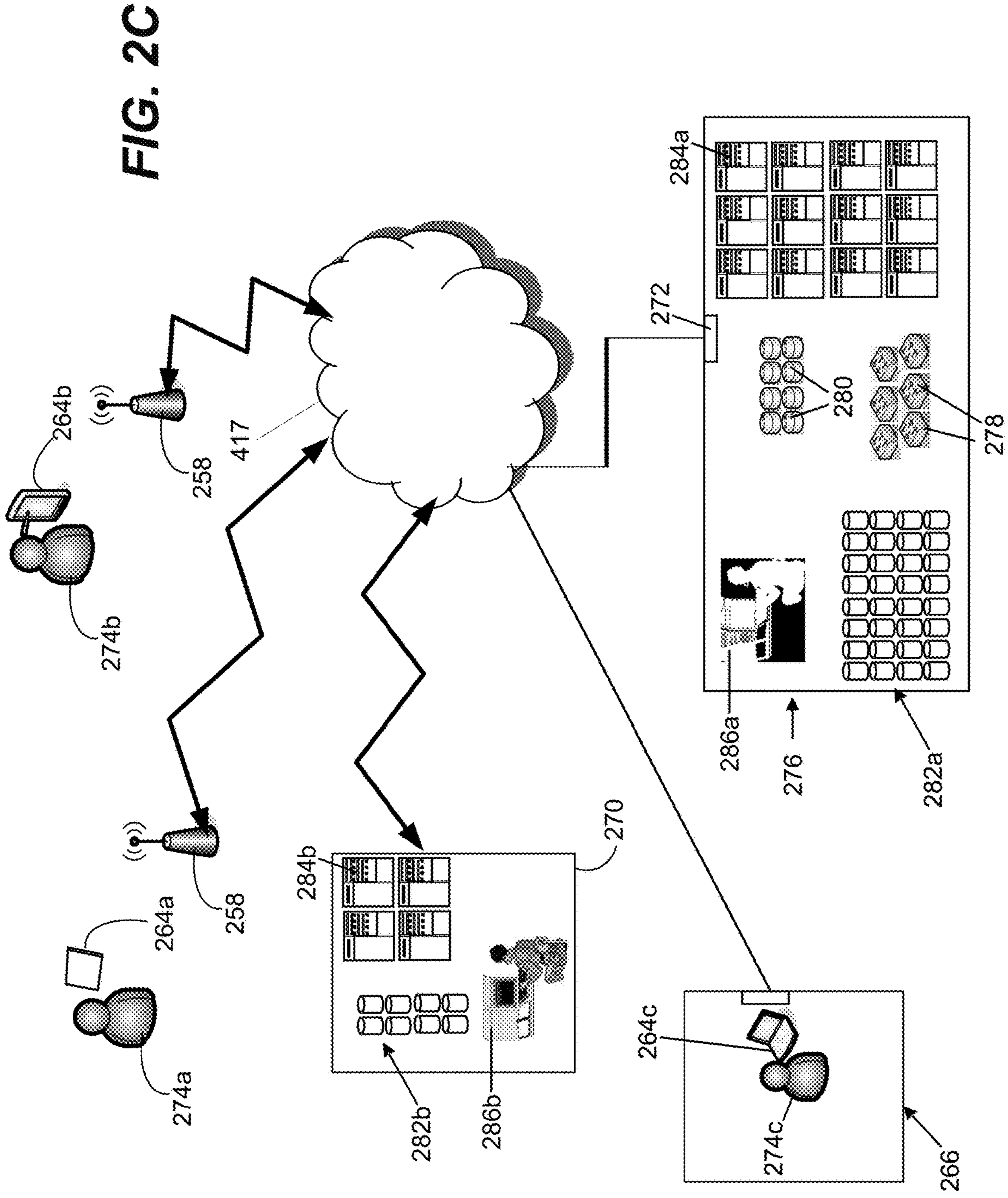
FIG. 2C is a diagram of components of a system for providing online gaming in an example embodiment.

FIG. 2C is a diagram of components of a system for providing online gaming in an example embodiment. As with other figures presented in this disclosure, the numbers, types and arrangements of gaming devices shown in FIG. 2C are merely shown by way of example. In this example, various gaming devices, including but not limited to end user devices (EUDs) 264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282*a*, servers 284*a* and one or more workstations 286*a*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server(s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
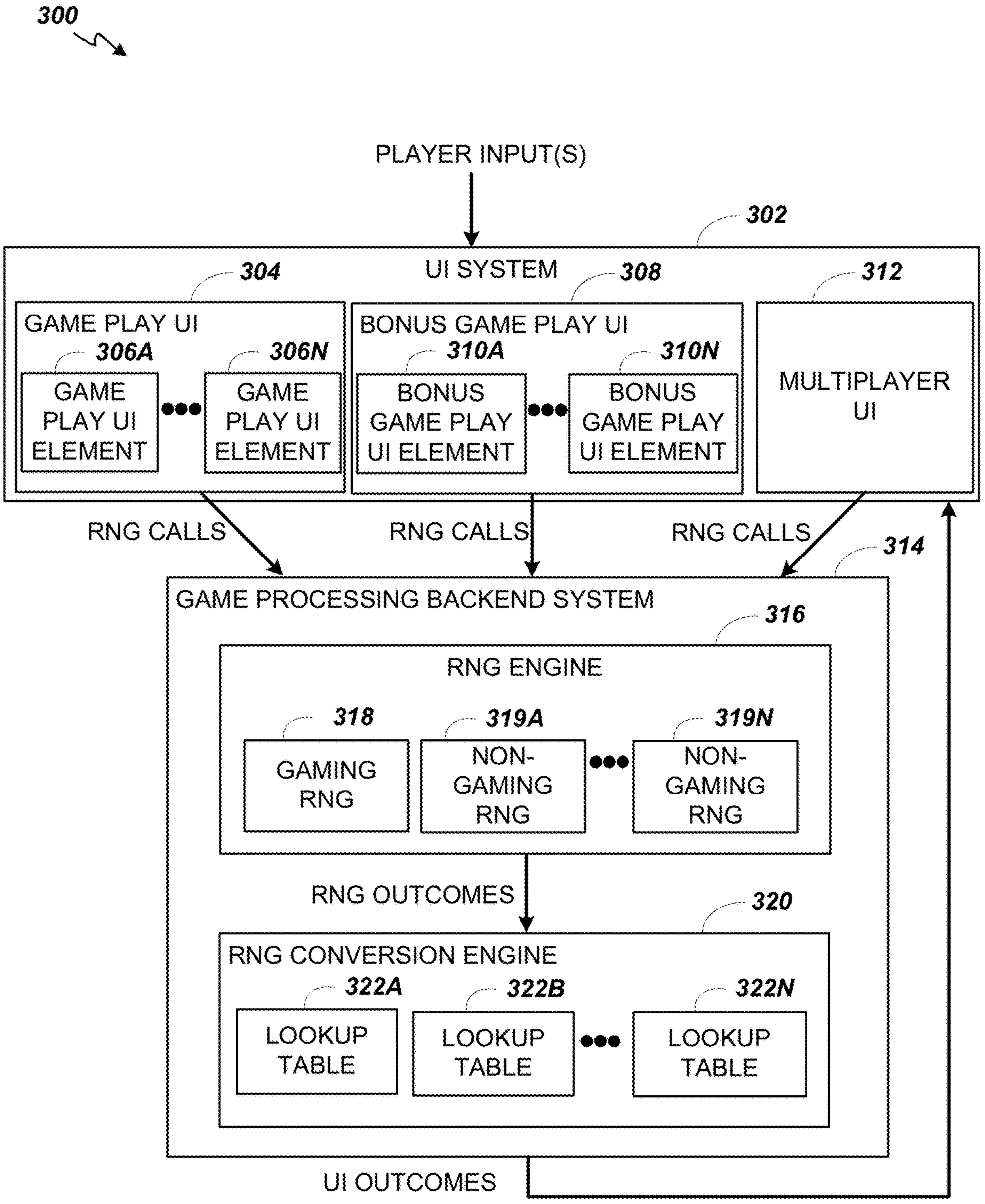
FIG. 3 illustrates, in block diagram form, an implementation of a game processing architecture algorithm that implements a game processing pipeline for the play of a game in accordance with various implementations described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

Further described herein are network-based systems and methods for seamlessly operating multi-vendor gaming devices and management systems within a casino.

Electronic gaming machines (EGMs), electronic gaming tables (EGTs), or other types of gaming devices provide a variety of wagering games such as slot games, video poker games, video blackjack games, roulette games, video bingo games, keno games and other types of games that are frequently offered at casinos and other locations. EGMs and EGTs are made by a variety of different manufactures, including but not limited to Aristocrat (ATI), Light and Wonder (LNW), International Game Technology (IGT), Konami Gaming, etc. Many EGMs/EGTs communicate with slot machine interface boards (SMIBs) via the slot accounting system (SAS) or the game to system (G2S) protocol. Further, there are a number of different casino monitoring/management systems (CMS) that are provided by the different EGM/EGT manufactures. The result of the incompatible frontend and backend is that when a casino buys EGMs/EGTs from vendor A, and installs the CMS system from vendor A to manage and control the casino's various EGMs/EGTs, then the casino may be locked into vendor A's solution, as interoperability between the gaming machines, their SMIBs, and management solutions from different vendors is generally non-existent. This limits the options that casinos have regarding management system solutions that deviate from the already installed base of vendor A's management solution.

Gaming devices (e.g., EGMs, EGTs, bar tops, gaming servers, mobile devices, mobile game devices, etc.), may be a device located in a physical casino and/or at remote locations for online gaming. Gaming devices are made by a variety of different vendors, with the different vendors typically providing a closed management system for monitoring and controlling that vendor's gaming device. A SMIB is used within an EGM/Ts to allow the EGM/Ts to connect to a system server. However, SMIBs made by different vendors are proprietary, and may use different controllers, power supplies, connectors, hardware, board sizes, and proprietary communication protocols. Each vendor's SMIB is designed to connect its proprietary management system to its EGM/Ts and to all other manufacturers' EGM/Ts. For instance, there is a SMIB from supplier A designed to connect to supplier A's machines, and to supplier B's, C's, and D's machines, a SMIB from supplier B designed to connect to supplier B's machines as well as to supplier A's, C's, and D's machines, etc. Once a casino decides to network its casino floor, it is locked into one vendor's hardware and software solutions.

For example, a casino may initially select an implementation from supplier A, with supplier A's SMIBs installed in the EGM/Ts that communicate with supplier A's CMS. As used herein, a CMS refers to any backend system or software service designed to operate with a casino's gaming device network such as a casino accounting system, a ticket voucher system, a player account system, a social network system, a responsible gaming system, a marketing system, a bonus system, a progressive system, a concierge system, and/or a Remote Gaming System (RGS). Generally, RGS is a solution for vendors and operators that enables implementation and distribution of online, mobile, and server-based gaming content.

In this initial implementation, the CMS utilizes supplier A's ticket-in-ticket-out (TITO) server. If at some point in the future, the casino desires to switch to a TITO server from supplier B, then supplier A's SMIBs in the EGM/Ts would be unable to communicate with supplier B's TITO server, due to the different protocols in use by both supplier B's TITO server and supplier A's SMIBs. Casinos therefore are prevented from integrating different subsets of CMS solutions from different suppliers.

In the embodiments described herein, a protocol management service operates to route and translate communications between different types of EGM/Ts and CMS servers. Using the protocol management service, an SMIB from supplier A within an EGM/T can communicate with not only supplier A's CMS server, but also to a CMS server provided by a different supplier.

In one embodiment, a universal SMIB (uSMIB) is described, which implements the protocol management service within the uSMIB. The uSMIB communicates with EGM/Ts using a variety of different EGM/T interface protocols (e.g., SAS, G2S, etc.), and also communicates with different CMS systems using their proprietary CMS protocols. This allows for a plug-and-play casino network. Casinos can mix and match any EGM/T from any manufacturer, and any CMS system from any manufacturer, in the same network, using a uSMIB installed in the EGM/Ts. In this embodiment, the uSMIB provides protocol and routing support for a variety of different CMS solutions. For example, the uSMIB may communicate with an EGM/T from supplier A (e.g., via G2S), a player tracking (PT) server from supplier A using a CMS protocol from supplier A, and also with a TITO server from supplier B using a CMS protocol of supplier B. If the casino decides to replace the PT server from supplier A with an PT server from supplier C, then the routing tables and protocol mapping for PT information from the EGM/T may be updated at the uSMIB, such that the uSMIB switches from communicating with the PT server from supplier A via the CMS protocol of supplier A to communicating to the PT server of supplier C using the CMS protocol of supplier C.

In another embodiment, a hybrid approach is implemented that utilizes a uSMIB and a protocol management service external to the uSMIB. In this hybrid approach, the uSMIB communicates with EGM/Ts using a variety of different EGM/T interface protocols (e.g., SAS, G2S, etc.), and also communicates with the external protocol management service. The external protocol management service communicates with different CMS servers using their proprietary CMS protocols. This allows for a plug-and-play casino network. Casinos can mix and match any EGM/T from any manufacturer, and any CMS server from any manufacturer, in the same network, using a uSMIB installed in the EGM/Ts and the protocol management service executing, for example, on a local server or in the cloud.

For example, the uSMIB may communicate with an EGM/T from supplier A (e.g., via G2S), and communicate with the protocol management service to exchange PT information and TITO information for the EGM/T to the CMS. The protocol management service exchanges PT information with supplier A's PT server using supplier A's CMS protocol, and exchanges TITO information with supplier B's TITO server using supplier B's CMS protocol. If the casino decides to replace supplier A's PT server with a supplier C's PT server, then the routing tables and protocol mapping for PT information from the EGM/T may be updated at the protocol management service, such that the protocol management service switches from communicating with supplier A's PT server via supplier A's CMS protocol to communicating with supplier C's PT server using supplier C's CMS protocol.

In another embodiment, a software approach is applied that utilizes a proxy controller and the protocol management service. The protocol management service may, for example, be provided by a cloud service. In this implementation, the EGM/Ts may utilize standard vendor-supplied SMIBs, which communicate with the CMS servers via their native CMS protocols. The proxy controller reroutes the native CMS protocol communications between the EGM/Ts and the CMS servers through the protocol management service, and the protocol management service translates between the native CMS protocol communications at the source EGM/Ts and the CMS protocols of the destination CMS servers. This allows for a plug-and-play casino network where any gaming device can communicate to any backend services, and vice versa. Casinos can mix and match any EGM/Ts from any manufacturer, and any CMS server from any manufacturer, in the same network, using a proxy controller (which may be one or more of the uSMIBs) and the protocol management service executing, for example, on a virtual machine in the cloud.

For example, supplier A's SMIB may communicate with supplier A's EGM/Ts via G2S, and also communicate with supplier A' CMS servers via supplier A's CMS protocol. PT information and TITO information generated by supplier A's SMIB in supplier A's CMS protocol is intercepted by the proxy controller and forwarded to the protocol management service. The protocol management service exchanges PT information with supplier A's PT server using supplier A's CMS protocol, and exchanges TITO information with supplier B's TITO server using supplier B's CMS protocol. If the casino decides to replace supplier A's PT server with a supplier C's PT server, then the routing tables and protocol mapping for PT information from supplier A's SMIB may be updated for the protocol management service, such that the protocol management service switches from communicating with supplier A's PT server via supplier A's CMS protocol to communicating to supplier C's PT server using supplier C's CMS protocol. In this implementation, supplier A's SMIB is replaced with an uSMIB. The uSMIB, as a proxy controller, can host a protocol management application or service at the gaming device and receive protocol and/or routing table update when a backend CMS system changed from one system manufacturer to another. Alternatively, the protocol management service can be a centralized (e.g., cloud based) system that communicates to all connected gaming devices, regardless of who makes them. The advantage of a centralized system is that each gaming device's uSMIB does not have to be updated when a backend system changes. The protocol management service may be updated at the central system.

Figure 4:
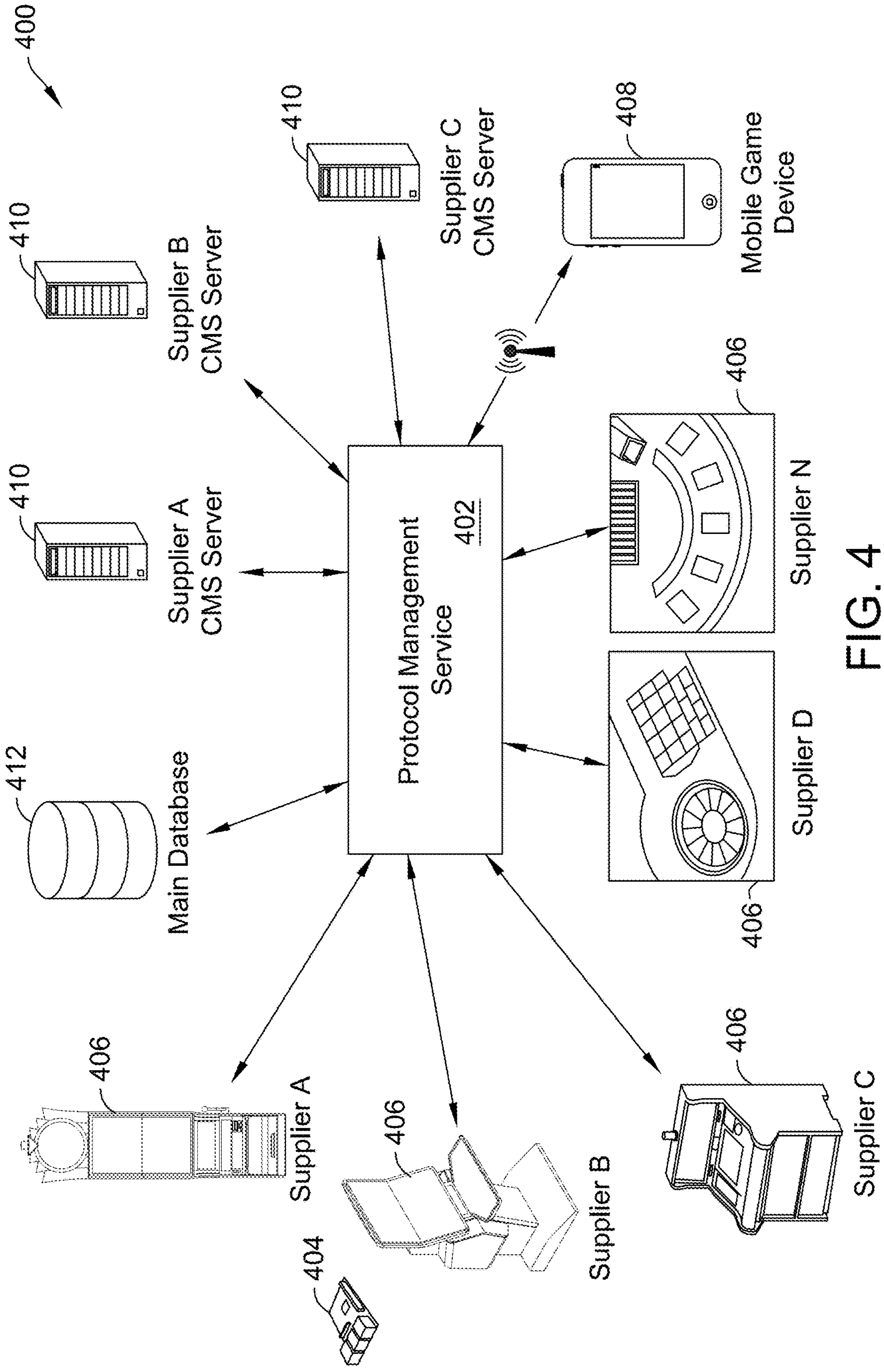
FIG. 4 illustrates an overview of some of the components and services of a system that provides interoperability between different vendor's EGMs/EGTs and different vendor's CMS servers in an example embodiment.

FIG. 4 illustrates an overview of some of the components and services of a system 400 that provides interoperability between various EGM/Ts, mobile game devices, and CMS servers in an example embodiment. In this embodiment, system 400 includes a protocol management service 402, which may be implemented as a local server, in the cloud, by a uSMIB 404, or by combinations thereof. Protocol management service 402 provides interoperability between various EGM/Ts 406, mobile game devices 408, and CMS servers 410. FIG. 4 depicts one example of the different suppliers of EGM/Ts 406 and CMS servers 410. However, system 400 may be implemented with any number of EGM/Ts 406 and CMS servers 410 from different vendors and/or manufacturers, not shown or described. The various supplier EMG/Ts 406 and CMS servers 410 may be provided by, for example, Aristocrat (ATI), Light and Wonder (LNW), International Game Technology (IGT), Konami Gaming, etc.

In this embodiment, system 400 includes a main database 412, which provides protocol definition, mapping, and routing information between EGM/Ts 406, mobile game devices 408, and CMS servers 410. For instance, main database 412 may provide a protocol mapping between supplier A's EGM/Ts 406, supplier B's CMS servers 410, and supplier C's CMS servers 410 to allow supplier A's EGM/Ts 406 to communicate with both supplier B's CMS servers 410 and supplier C's CMS servers 410 in addition to their own supplier A's CMS servers 410.

In system 400, main database 412 stores communication profiles for various components being managed, including EGM/Ts 406 and mobile game devices 408, along with the protocol definitions, and mappings between the managed devices and the CMS servers 410. Protocol management service 402 operates to translate and route messages from EGM/Ts 406 and/or mobile game devices 408 to their mapped CMS servers 410 and back again.

In some embodiments, system 400 includes one or more uSMIBs 404, which may implement some or all of the functionality described herein for protocol management service 402. In one embodiment, uSMIB 404 includes protocol management service 402, provides local support for EGM/T 406 specific communication interfaces, and also provides CMS protocol conversion and routing between EGM/Ts 406 and CMS servers 410. In another embodiment, uSMIB 404 operates with protocol management service 402 partially or fully external to uSMIB 404, provides local support for EGM/T 406 specific communication interfaces, and communicates with protocol management service 402. In another embodiment, uSMIB 404 comprises a virtualized software component that may execute, for example, at mobile game device 408.

Figure 5:
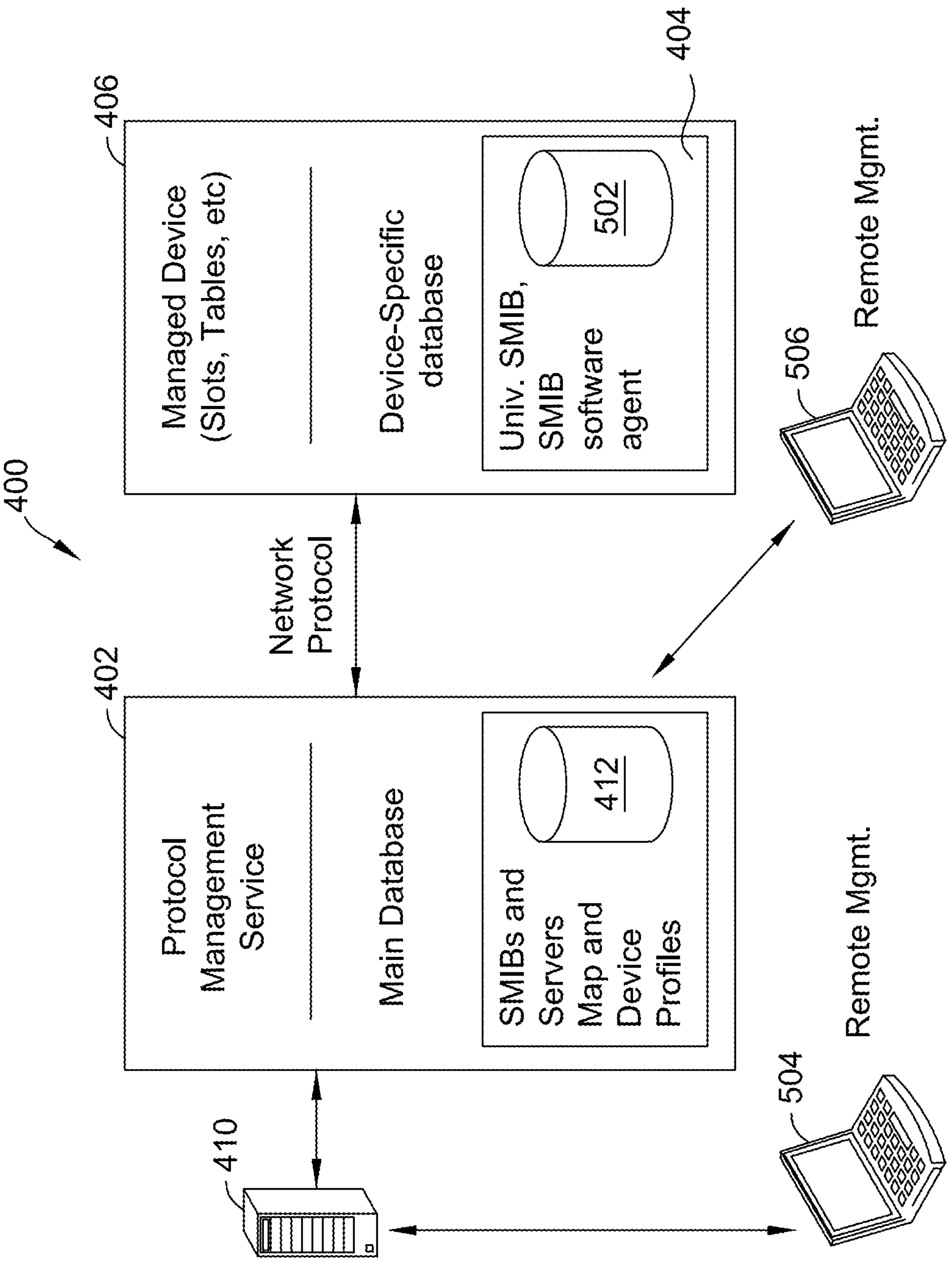
FIG. 5 depicts a portion of the system of FIG. 4 in a hybrid configuration in an example embodiment.

FIG. 5 depicts a portion of system 400 in a hybrid configuration in an example embodiment. In this hybrid configuration, uSMIB 404 provides a local communication interface to EGM/T 406 and communicates with protocol management service 402. Protocol management service 402 implements CMS protocol conversion and routing between uSMIB 404 and CMS servers 410. In this embodiment, uSMIB 404 includes a device-specific database 502. Device-specific database 502 stores configuration data that defines how uSMIB 404 communicates with EGM/T 406 and/or protocol management service 402. During initialization, protocol management service 402 may provide a device profile for EGM/T 406 from main database 412 to uSMIB 404, which is stored by uSMIB 404 as device-specific database 502. The device profile configures uSMIB 404 for communicating with EGM/T 406 and/or with protocol management service 402.

For example, consider that a new EGM/T 406 from supplier A is added to the casino floor. uSMIB 404 is added to EGM/T 406, and uSMIB 404 downloads, from protocol management service 402, supplier A's device profile for EGM/T 406, from, for example, main database 412. Supplier A's device profile is stored by uSMIB 404 in device-specific database 502. The device profile defines, for example, that it is connected to supplier A's EGM that speaks SAS, located at the Sunset Station Casino branch, and mapped to supplier B's CMS server and supplier C's CMS server at headquarters. The unique identifier (ID) for EGM/T 406 in this example is 123, and the server IDs in this example are 234 (e.g., a PT server) and 345 (e.g., a casino management server). During operation, in continuing with the example, uSMIB 404 communicates with EGM/T 406, supplier A's device, using SAS protocol, and protocol management service 402. Protocol management service 402 provides routing and CMS protocol translation support that enables EGM/T 406 to communicate with both the PT server and the casino management server. In FIG. 5, remote management systems 504, 506 may be used to remotely administer CMS servers 410 and/or protocol management service 402. For instance, remote management system 506 may be used to update main database 412 with information regarding how CMS servers 410 are mapped, and/or how uSMIBs 404 communicate with EGM/Ts 406, and/or how uSMIBs 404 communicate with protocol management service 402.

Figure 6:
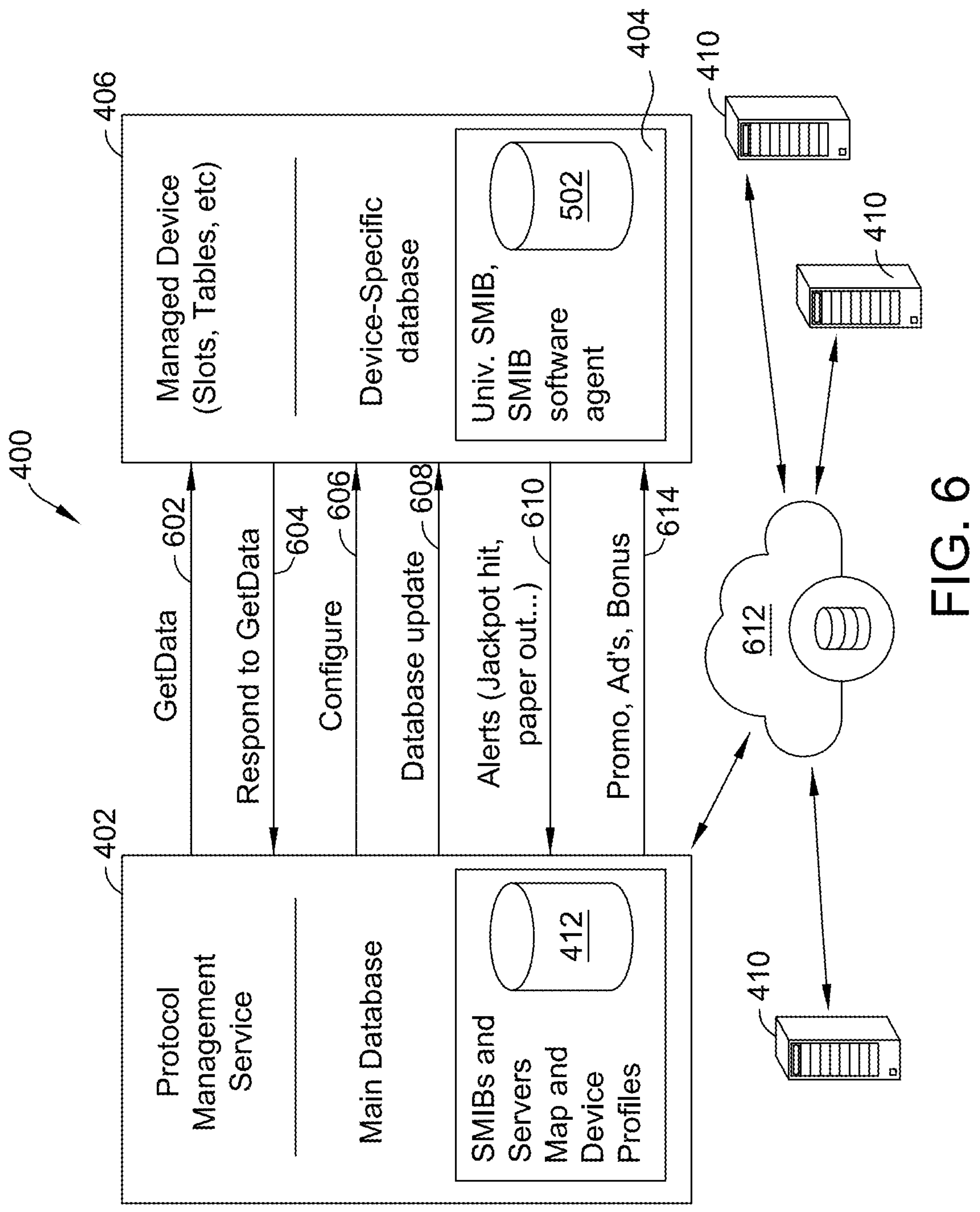
FIG. 6 depicts a portion of the system of FIG. 4 in another hybrid configuration in an example embodiment.

FIG. 6 depicts a portion of system 400 in another hybrid configuration in an example embodiment. FIG. 6 depicts various exemplary communications 602, 604, 606, 608, 610, 614 that may occur between protocol management service 402 and uSMIB 404, however, communications 602, 604, 606, 608, 610, 614 are not limited to these messages. For example, protocol management service 402 may request data from uSMIB 404, using a GetData communication 602, which uSMIB 404 responds to via a response to GetData communication message 604. Protocol management service 402 may provide configuration data to uSMIB 404 via configuration communications 606, which may be used by uSMIB 404 configure how uSMIB 404 communicates with EGM/T 406. Protocol management service 402 may provide database update communications 608 to uSMIB 404, directing uSMIB 404 to update its device-specific database 502. uSMIB 404 may transmit one or more alert communications 610 to protocol management service 402, which may be translated and routed by protocol management service 402 to CMS servers 410 via a network 612. Further, protocol management service 402 may provide uSMIB 404 with various notification communications 614 received from CMS servers 410, such as promotions, advertisements, and bonus information for EGM/T 406.

Figure 7:
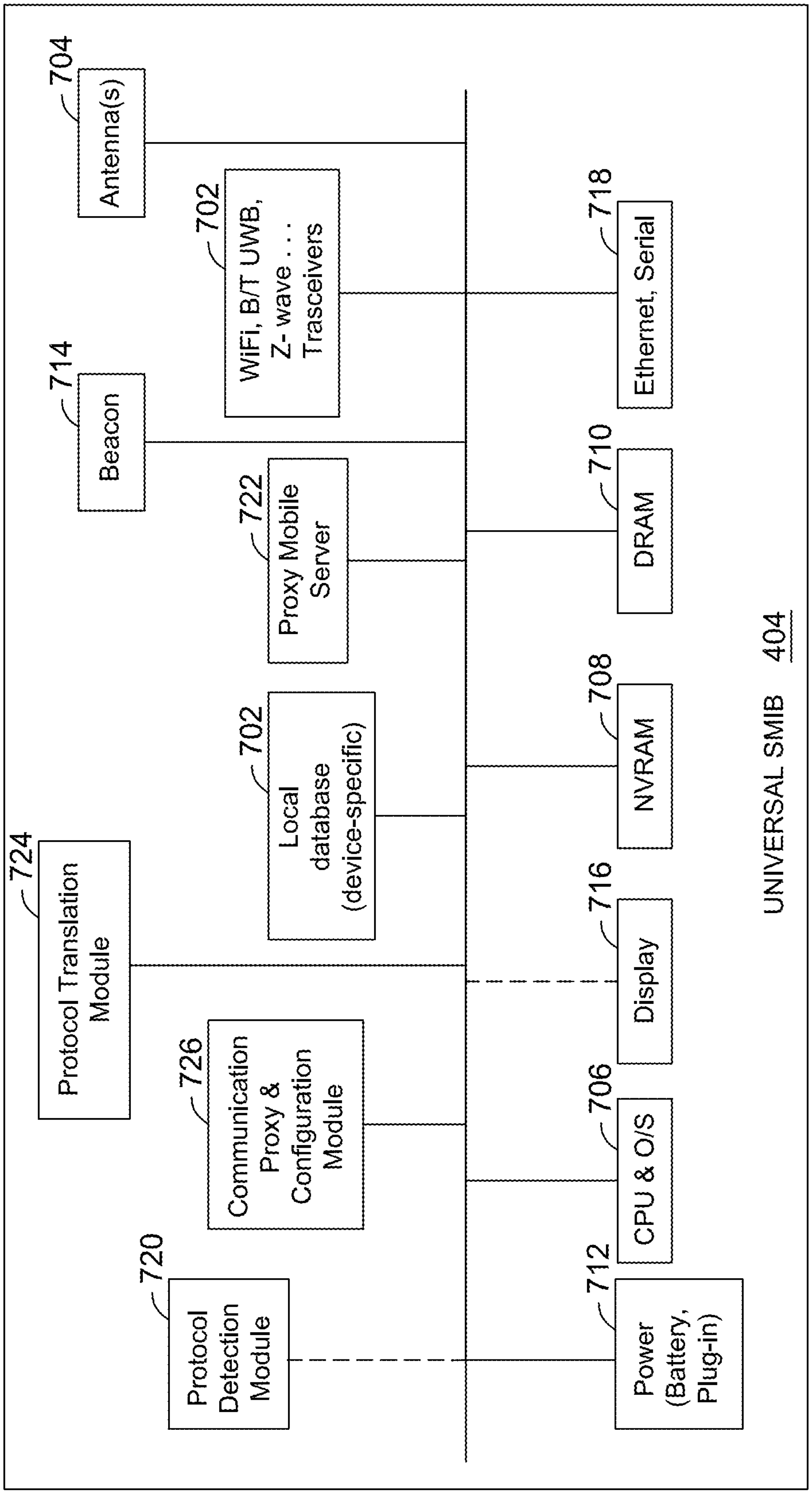
FIG. 7 is a block diagram of a universal SMIB in an example embodiment.

FIG. 7 is a block diagram of uSMIB 404 in an example embodiment. uSMIB 404 includes any component, system, or device that performs the functionality described herein for the uSMIBs described herein. uSMIB 404 will be described with respect to various discrete elements, which perform functions. These elements may be combined in different embodiments or segmented into different discrete elements in other embodiments.

In some embodiments, uSMIB 404 includes one or more wireless transceivers 702 communicatively coupled to one or more antennas 704. Wireless transceivers 702 may implement any wireless network as desired, using any network topology and protocol, including Wi-Fi networks, Bluetooth networks, Z-wave networks, Zigbee networks, Ultra-Wide Band networks, etc.

In this embodiment, uSMIB 404 includes a processor 706, and a non-volatile random-access memory 708 (NVRAM). NVRAM 708 may include, for example, solid-state disks (SSD), ferroelectric RAM (FeRAM), magneto resistive RAM (MRAM), etc. In this embodiment, uSMIB 404 further includes dynamic RAM (DRAM) 710. In this embodiment, uSMIB 404 also includes a power module 712. Power module 712 may include batteries, which provides mobile operation for uSMIB 404 without, and/or in addition to (backup power), using a wired power connection to uSMIB 404. In other embodiments, power module 712 includes a fixed or removable power connection to external power, resulting in uSMIB 404 being hard-wired to a power source. In some embodiments, uSMIB 404 may include one or more of a beacon 714, a display 716, Ethernet/Serial interfaces 718 (e.g., Ethernet, serial bus (e.g., universal serial bus (USB), RS-232, RS-485 interfaces), etc.), an EGM/T protocol detection module 720, and a proxy mobile server 722 for direction communication with mobile devices of users (not shown).

Beacon 714 may, for example, comprise a Bluetooth low-energy (BLE) beacon, or any RF beacon, which interacts with mobile devices of users (not shown) of users to enable system 400 to provide identification and location-based services to the mobile devices. Display 716 may be used to display information, such as the status of uSMIB 404. Ethernet/Serial interfaces 718 may be used, in combination with or instead of wireless transceivers 702 to enable uSMIB 404 to communicate with protocol management service 402 and/or CMS servers 410. EGM/T protocol detection module 720 may be used to allow uSMIB 404 to automatically identify the local communication protocols used by EGM/Ts 406. Proxy mobile server 722 may be used to allow uSMIB 404 to communicate directly with a user's mobile device to, for example, add money to EGM/Ts 406.

In this embodiment, uSMIB 404 includes a protocol translation module 724, which allows uSMIB 404 to communicate with EGM/Ts 406, device-specific database 502, previously described, and a backend system communication proxy & configuration module 726. Communication proxy & configuration module 726 interacts with main database 412 to communicate and to retrieve configuration information and device profiles for EGM/Ts 406. Although not shown in FIG. 7, uSMIB 404 may include protocol management service 402 (e.g., as a component of protocol translation module 724 or as a stand-alone module on uSMIB 404) in embodiments where uSMIB 404 operates in a stand-alone configuration, when protocol management service 402 is not configured external to uSMIB 404. As discussed previously, uSMIB 404 may be virtualized and operate as a virtual machine, a software module, or combinations thereof.

Figure 8:
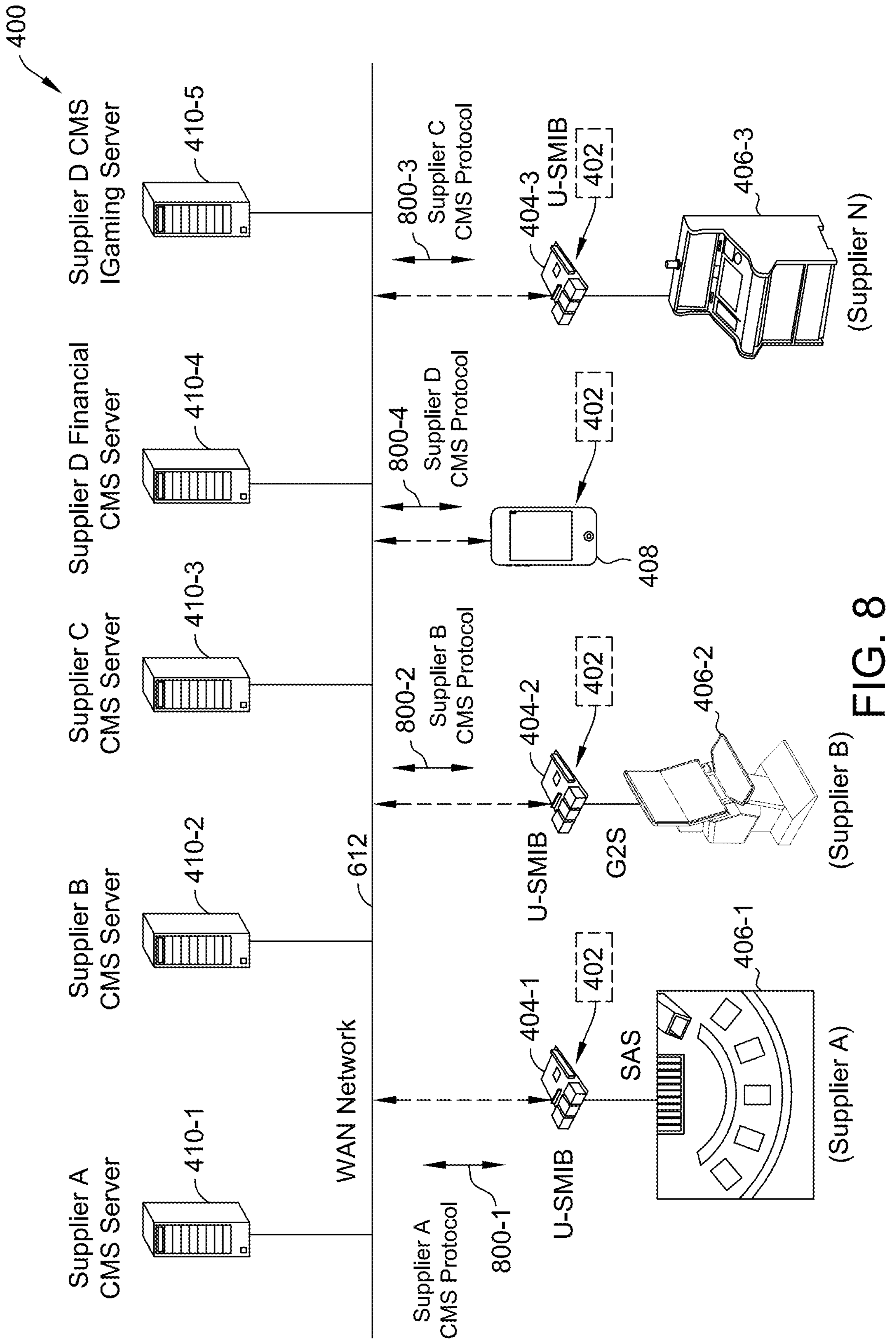
FIG. 8 depicts a portion of the system of FIG. 4 in a stand-alone configuration for a universal SMIB in an example embodiment.

FIG. 8 depicts a portion of system 400 in a stand-alone configuration for uSMIB 404 in an example embodiment. In this embodiment, uSMIBs 404 implement protocol management service 402 locally, and coordinates communication and routing activities between EGM/Ts 406 and CMS servers 410 via network 612. Although FIG. 8 illustrates specific types of CMS servers 410 and EGM/Ts 406 for purposes of discussion, the principles described with respect to FIG. 8 apply to other types of CMS servers 410 and EGM/Ts 406 supplied by different manufactures, vendors, or suppliers, not shown, or described.

In this embodiment, CMS servers 410 include a supplier A's CMS server 410-1, a supplier B's CMS server 410-2, a supplier C's CMS server 410-3, a supplier D's financial server 410-4, and a supplier D's iGaming server 410-5. uSMIBs 404 communicate with their EGM/Ts 406 locally and implement various CMS protocols 800 using protocol management service 402 in order to communicate with CMS servers 410. In particular, uSMIB 404-1 utilizes SAS to communicate locally with a supplier A's EGM/T 406-1, and protocol management service 402 executing at uSMIB 404-1 communicates with supplier A's CMS server 410-1 via a supplier A's CMS protocol 800-1. uSMIB 404-2 utilizes G2S to communicate with a supplier B's EGM/T 406-2, and protocol management service 402 executing at uSMIB 404-2 communicates with supplier B's CMS server 410-2 via a supplier B's CMS protocol 800-2. uSMIB 404-3 utilizes a supplier N EGM/T protocol to communicate with supplier N EGM/T 406-3, and protocol management service 402 executing at uSMIB 404-3 communicates with supplier C's CMS servers 410-3 using supplier C's CMS protocol 800-3. Also illustrated in FIG. 8, mobile game devices 408 may communicate with supplier D's iGaming servers 410-5 via supplier D's CMS protocol 800-4. In this mobile gaming implementation, uSMIB 404 and its associated protocol management service 402 are virtualized software modules integrated into the application executing at mobile game device 408 and provide the protocol conversion, mediation and/or routing services between the mobile application (regardless of which vendor makes the application) and an iGaming server (regardless of which supplier provides the iGaming Server). In one embodiment, the virtual uSMIB and the server protocol mediation modules are compiled as an extension module to the mobile application, and the mobile device can connect to any backend services without a need to know the necessary application programming interface (API). In other embodiments, the backend system services and APIs may be hard-coded to the mobile application.

As discussed previously, EGM/Ts 406 may be mapped dynamically to different CMS servers 410 as desired. For instance, a casino may decide to change supplier A's EGM/T 406-1 from communicating with supplier A's CMS server 410-1 to supplier B's CMS server 410-2. To do so, routing and mapping tables at uSMIB 404-1 are updated, and protocol management service 402 executing at uSMIB 404-1 begins communicating with supplier B's CMS server 410-2 via supplier B's CMS protocol 800-2.

This type of dynamic mapping does not necessarily require that network 612 is a local network in a casino. For example, network 612 may include other networks, such as the Internet. Therefore, CMS servers 410 may include both local servers within a casino, and remote servers at other casinos or in the cloud. Therefore, the topology depicted in FIG. 8 may include multiple casinos that are communicatively coupled together via the Internet or other types of networks, including dedicated encrypted virtual private networks (VPN) tunnels that transit across the Internet between different casinos, or may even be a virtualized network in the cloud.

Figure 9:
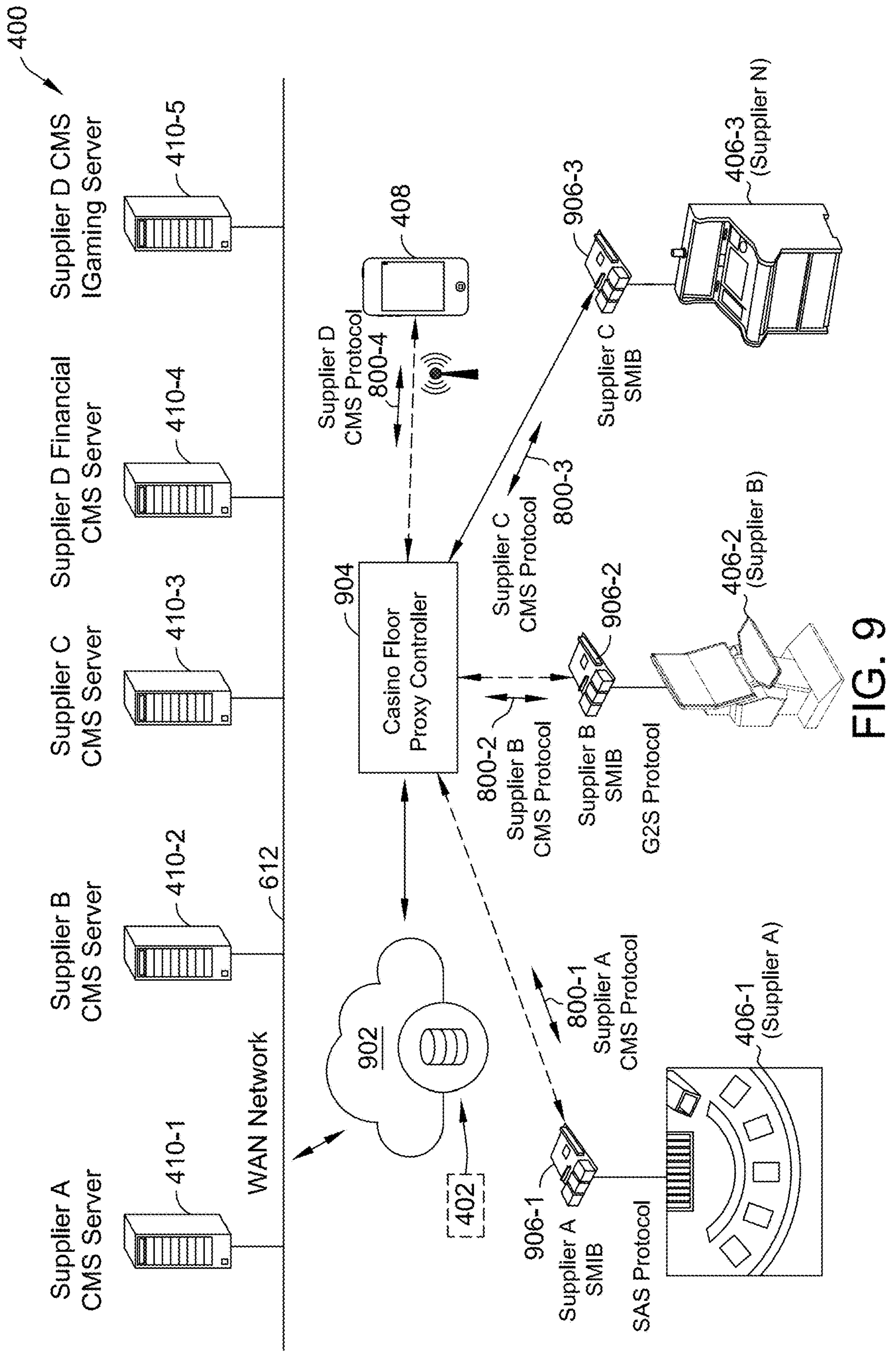
FIG. 9 depicts a portion of system of FIG. 4 in a stand-alone configuration for a protocol management service in an example embodiment.

FIG. 9 depicts a portion of system 400 in a stand-alone configuration for protocol management service 402 in an example embodiment. In this embodiment, protocol management service 402 implements CMS protocol mediation, translation, and routing services in a cloud 902 environment, and uses a proxy controller 904 (which may be local to the casino floor in some embodiments) to intercept CMS protocol 800 messages generated by vendor-specific SMIBs 906 and mobile game devices 408.

In this embodiment, protocol management service 402 operates in cloud 902, and coordinates communications and routing activities between vendor-specific SMIBs 906, mobile game devices 408, and CMS servers 410 in combination with proxy controller 904. Although FIG. 9 illustrates specific types of CMS servers 410, vendor-specific SMIBs 906, mobile game device 408, and EGM/Ts 406 for purposes of discussion, the principles described with respect to FIG. 9 apply to other types of CMS servers 410, vendor-specific SMIBs 906, mobile game devices 408, and EGM/Ts 406 supplied by different manufactures, vendors, or suppliers, not shown, or described.

In this embodiment, CMS servers 410 include supplier A's CMS server 410-1, supplier B's CMS server 410-2, supplier C's CMS server 410-3, supplier D's financial CMS server 410-4, and supplier D's CMS iGaming server 410-5. Vendor-specific SMIBs 906 communicate with their EGM/Ts 406 locally and implement various CMS protocols 800 in order to communicate with CMS servers 410. In particular, vendor-specific SMIB 906-1 utilizes SAS to communicate locally with supplier A's EGM/T 406-1 and is designed to communicate with CMS servers 410 utilizing supplier A's CMS protocol 800-1. Vendor-specific SMIB 906-2 utilizes G2S to communicate with supplier B's EGM/T 406-2 and is designed to communicate with CMS servers 410 utilizing supplier B's CMS protocol 800-2. Vendor-specific SMIB 906-3, provided by supplier C, utilizes a supplier N's EGM/T protocol to communicate with supplier N's EGM/T 406-3, and is designed to communicate with CMS servers 410 utilizing supplier C's CMS protocol 800-3. Mobile game device 408 is designed to communicate with supplier D's financial CMS server 410-4 and supplier D's CMS iGaming server 410-5 utilizing supplier D's CMS protocol 800-4 via a virtualized, vendor specific SMIB module executing at mobile game device 408.

During operation, communications generated by vendor-specific SMIBs 906 and vendor-specific mobile game device 408 in CMS protocols 800 are intercepted by proxy controller 904 and are re-routed to protocol management service 402 operating in cloud 902. Protocol management service 402 dynamically maps the managed devices EGM/Ts 406 and mobile game device 408 communication messages to/from CMS servers 410 and translates CMS protocols 800 to the appropriate protocol based on the type of CMS protocol 800 in use by the destination CMS servers 410. For example, protocol management service 402 may receive from proxy controller 904, communications in supplier A's CMS protocol 800-1 from vendor-specific SMIB 906-1, associated with EGM/T 406-1. Protocol management service 402 may, depending on how EGM/T 406-1 is mapped to CMS servers 410, translate the communications in the supplier A's CMS protocol 800-1 into different CMS protocols 800. For example, although vendor-specific SMIB 906-1 may initially be configured to communicate with supplier A's CMS server 410-1, proxy controller 904 re-routes communications in supplier A's CMS protocol 800-1 from vendor-specific SMIB 906-1 to protocol management service 402, and protocol management service 402 converts and/or translates the communications in supplier A's CMS protocol 800-1 to, for example, supplier C's CMS protocol 800-3. Protocol management service 402 may then forward communications from vendor-specific SMIB 906-1 to supplier C's CMS server 410-3 rather than supplier A's CMS server 410-1.

The same process is used in reverse. For instance, communications in supplier C's CMS protocol 800-3 generated by supplier C's CMS server 410-3 and destined for vendor-specific SMIB 906-1 is converted by protocol management service 402 into communications in supplier A's CMS protocol 800-1, and proxy controller 904 routes the communications from supplier C's CMS server 410-3 to vendor-specific SMIB 906-1. The same process applies to mobile game device 408, where proxy controller 904 intercepts communications from mobile game device 408 to CMS servers 410 and re-routes the communications to protocol management service 402. Protocol management service 402 converts communications in supplier D's CMS protocol 800-4 generated by mobile game device 408 into the appropriate CMS protocols 800 used by the destination CMS servers 410 that mobile game device 408 is mapped to. In the reverse direction, protocol management service 402 converts communication from CMS servers 410 mapped to mobile game device 408 to supplier D's CMS protocol 800-4, and proxy controller 904 routes the communications in supplier D's CMS protocol 800-4 back to mobile game device 408.

Figure 10:
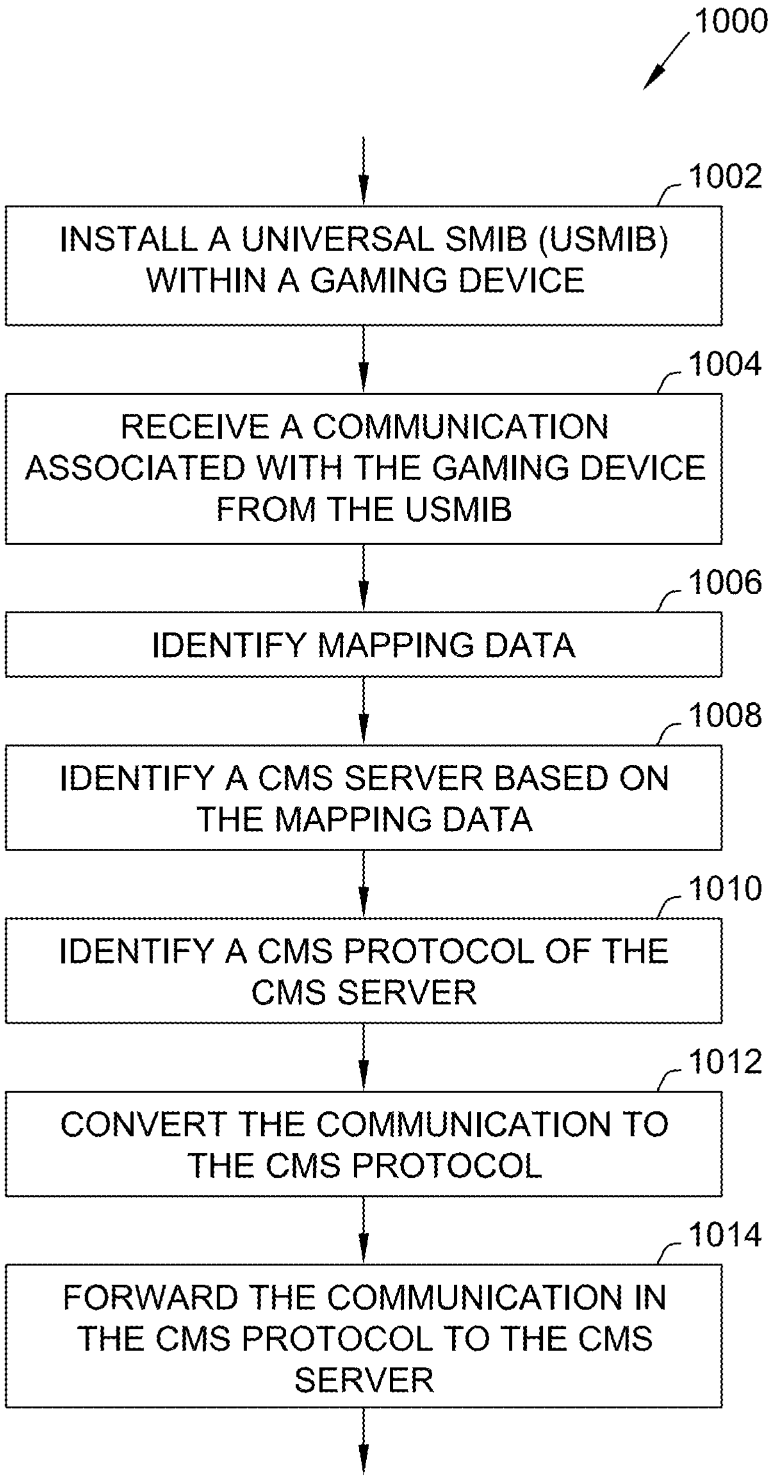
FIG. 10 is a flow chart of a method of translating CMS communications between a plurality of CMS servers and a plurality of gaming devices of at least one gaming venue in an example embodiment.

FIG. 10 is a flow chart of a method 1000 of translating CMS communications between a plurality of CMS servers and a plurality of gaming devices of at least one gaming venue in an example embodiment.

Method 1000 may be performed by various elements of the systems and devices described herein, including server computers 102 (see FIG. 1), gaming device 200 (see FIG. 2A), and the various embodiments of system 400 (see FIGS. 4-9).

Method 1000 begins by installing 1002 a uSMIB within a gaming device of the plurality of gaming devices. For example, uSMIB 404 may be installed within EGM/Ts 406 (see FIG. 4).

Method 1000 continues by receiving 1004, by a protocol management service, a communication associated with the gaming device, from the uSMIB. For example, uSMIB 404 receives an alert from EGM/T 406 and generates alert communication 610 for protocol management service 402 (see FIG. 6).

Method 1000 continues by identifying 1006, by the protocol management service, mapping data that maps the gaming device to a CMS server of the plurality of CMS servers for the communication. For example, protocol management service 402 utilizes main database 412 that maps EGM/Ts 406 to CMS servers 410 (see FIG. 6), based on the context of the alert message, to continue the example.

Method 1000 continues by identifying 1008, by the protocol management service, the CMS server based on the mapping data. For example, protocol management service 402 identifies one of CMS server 410 as the target for the communication based on main database 412 (see FIG. 6).

Method 1000 continues by identifying 1010, by the protocol management service, a CMS protocol of the CMS server. For instance, protocol management service 402 utilizes main database 412 to identify CMS protocol 800 associated with CMS server 410 that is the target for the communication (see FIG. 6).

Method 1000 continues by converting 1012, by the protocol management service, the communication into the CMS protocol of the CMS server. For example, protocol management service 402 converts alert communication 610 generated by uSMIB 404 into CMS protocol 800 associated with CMS server 410 that is the target for the communication (see FIG. 6).

Method 1000 continues by forwarding 1014, by the protocol management service, the communication in the CMS protocol to the CMS server. For example, protocol management service 402 forwards the communication in CMS protocol 800 associated with CMS server 410 that is the target for the communication (see FIG. 6).

In some embodiments, method 1000 further comprises transmitting, to the uSMIB by the protocol management service, configuration data that configures the uSMIB to communicate with the gaming device and the protocol management service. For example, protocol management service 402 utilizes configuration communications 606 and/or database update communications 608 to configure uSMIB 404 to talk to EGM/T 406, and uSMIB 404 stores this configuration data in device-specific database 502.

In some embodiments, the CMS server comprises a first CMS server, the CMS protocol comprises a first CMS protocol, and method 1000 further comprises receiving, by the protocol management service, an update to the mapping data that changes the first CMS server to a second CMS server. For example, protocol management service 402 receives an update to main database 412 from remote management system 506.

Method 1000 continues in this embodiment by receiving, by the protocol management service, a subsequent communication associated with the gaming device from the uSMIB. For example, protocol management service 402 receives a new communication from uSMIB 404 (see FIG. 6).

Method 1000 continues in this embodiment by identifying, by the protocol management service, the second CMS server for the subsequent communication based on the updated mapping data. For instance, protocol management service 402 identifies a new CMS server 410 as the target for communications from uSMIB 404 and EGM/T 406 (see FIG. 6).

Method 1000 continues in this embodiment by identifying, by the protocol management service, a second CMS protocol of the second CMS server, where the first CMS protocol and the second CMS protocol are different CMS protocols. For example, protocol management service 402 identifies CMS protocol 800 of the new target CMS server 410 utilizing main database 412 (see FIG. 6).

Method 1000 continues in this embodiment by converting, by the protocol management service, the subsequent communication into the second CMS protocol of the second CMS server. For instance, protocol management service 402 converts the subsequent communication (see FIG. 6).

Method 1000 continues in this embodiment by forwarding, by the protocol management service, the subsequent communication in the second CMS protocol to the second CMS server. For example, protocol management service 402 forwards the converted communication to CMS server 410 that is the target of the subsequent communication from uSMIB 404 (see FIG. 6).

In some embodiments of method 1000, the uSMIB implements the protocol management service. For example, uSMIBs 404 implements protocol management service 402 (see FIG. 8). In this embodiment, the gaming device communicates with the uSMIB utilizing at least one of SAS and G2S, and the protocol management service communicates with the plurality of CMS servers utilizing at least two different CMS protocols. For example, uSMIB s 404 communicate locally with EGM/Ts 406, and protocol management service 402 communicates with CMS servers 410 utilizing a variety of CMS protocols 800.

In another embodiment of method 1000, the uSMIB comprises a virtualized uSMIB software module. For example, a virtualized uSMIB 404 may execute within mobile game device 408 (see FIG. 8).

In another embodiment of method 1000, the communication comprises a first communication, and method 1000 further comprises receiving, by the protocol management service, a second communication generated by the CMS server and formatted in the CMS protocol of the CMS server. For example, CMS servers 410 transmit a bonus update for EGM/T 406, which is intercepted by protocol management service 402 (see FIG. 6).

Method 1000 continues in this embodiment by identifying the uSMIB as a target for the second communication based on the mapping data. For example, protocol management service 402 identifies uSMIB 404 as the target based on main database 412 (see FIG. 6).

Method 1000 continues in this embodiment by converting, by the protocol management service, the communication generated by the CMS server form the CMS protocol to a protocol of the uSMIB. For example, protocol management service 402 converts the bonus information into notification communication 614 (see FIG. 6).

Method 1000 continues in this embodiment by forwarding, by the protocol management service, the communication in the protocol of the uSMIB, to the uSMIB. For example, protocol management service 402 forwards notification communication 614 to uSMIB 404 (see FIG. 6).

Further described herein are network-based systems and methods for optimizing a casino environment utilizing environmental data captured in real-time or near real-time from the casino environment.

Legacy casino data collection systems (e.g., a casino monitoring system (CMS)) typically monitors an EGMs cumulative slot game data, while a player tracking system typically monitors a player's gaming activities at the EGMs. Casinos may also include video surveillance systems, which collect data on players, but the video surveillance systems are typically only used for security purposes (e.g., identifying cheating, loitering, and crimes). These types of legacy data capture systems fail to provide real-time or near real-time data regarding the status of a casino floor, the result of which is that a casino manager may not be able to efficiently manage the casino floor in response to dynamic changes in the conditions at the casino floor.

Modern casinos may offer new products which are not monitored or captured by traditional data collection systems installed in casinos. These new products may include iGaming (e.g., online gaming, Internet gaming, social gaming, non-casino based gaming, etc.), digital payments, location-based services, mobile concierge services, etc. Further, dynamic casino floor data such as foot traffic flow, local-area gaming activities, casino service dispatch, audiovisual celebrations, sounds, temperature, air quality, brightness, etc., are not captured by traditional data collection system installed in casinos, which may hamper the ability of the casino floor manager to manage the operations of the casino floor and respond, adjust, or optimize the operation of the casino floor in view of such dynamic data events or conditions. Thus, there is a need to provide dynamic floor data and analytics to the casino floor managers in order for them to perform real-time or near real-time optimization of the casino floor and also, to observe and adapt to changing patterns on the casino floor over time.

In the embodiments further provided herein, environmental sensors are described which may be installed at various locations throughout a casino for capturing environmental data regarding the casino. The environmental sensors, in various embodiments, measure temperatures, air quality, audio, video, brightness, humidity, or other data regarding the environment in the casino over of time. The environmental sensors may capture audio and/or video clips, which may record various dynamic and/or transient events and their locations in the casino, such as crowd noise level, jackpot hits, crowd cheers, etc. The environmental sensors may identify foot traffic flow direction and/or intensity, crowd density information, and provide capabilities to locate users in the casino (e.g., by communicating with an application executing on mobile devices of the users). Some examples of the mobile devices include smart phones, tablets, laptops, etc. Various location-based services may be implemented in the casino based on the user location data, including concierge services. For example, a user may request food and/or drinks using a mobile application, which dynamically updates the user's location in the casino based on the proximity of the user's mobile device to the environmental sensors. This allows a location server to dynamically locate the user to provision services within the casino as the application communicates with the environmental sensors distributed throughout the casino. In some cases, the indoor location data within the casino is captured in ways other than using a global positioning system (GPS) or a cellular output from a user's cell device because this type of GPS or cellular data may be unreliable or difficult to obtain within a casino.

In some embodiments, the environmental sensors form mesh networks, which communicate with the servers in the casino and/or to a cloud-based data storage system. A cloud-based data storage system provides access to the environmental data generated by the environmental sensors from a centrally accessible data repository (e.g., various data analytic services may query a cloud-based message queue for any or all of the environmental data they might need). In some embodiments, the environmental sensors communicate with one or more gateways in the casino, which collate, and forward environmental data generated by the environmental sensors to local and/or remote storage. In some embodiments, the gateways and/or the environmental sensors communicate directly with a slot machine interface board (SMIB). Traditional SMIBs are generally used within EGMs, such as slot machines, gaming tables, etc., to link to various system servers and often provide a wired high-speed data link to the casino network. In these embodiments, enhanced SMIBs (eSMIBs) may include both wired and wireless interfaces, with the wireless interfaces communicating with the gateways and/or the environmental sensors, and the wired interfaces providing network access to the eSMIBs for transmitting both legacy game monitoring data handled by a typical SMIB, and environmental data generated by the environmental sensors. In some embodiments, the eSMIBs may be similar to uSMIBs 404 previously described, with the exception that the eSMIBs may not implement protocol management service 402. In other embodiments, the eSMIBs implement protocol management service 402, and may operate the same or similarly to uSMIBs 404.

In some embodiments, the environmental data generated by the environmental sensors is combined with static data for the casino for analytical purposes. Static data includes, in various embodiments, a layout of the casino, the location of EGMs, shops, offices, automated teller machines (ATMs), rental kiosks, restaurants, etc. In some embodiments, machine learning and/or artificial intelligence may be used to overlay and analyze both the environmental data and the static data and their relationship in order to optimize the operation of the casino floor more efficiently. For instance, using analytics, bonuses, progressives, promotions, and/or location-based advertisements may be dynamically reconfigured as a functional of the foot-traffic flow density and crowd noise level on the casino floor based on the real-time environmental data generated by the environmental sensors. These and other features described herein that are enabled as a result of the environmental data generated by the environmental sensors provide improvements to the user experience in the casino, and/or provide improvements in the operation of the casino, thereby improving the art of casino management and/or casino operation. The inputs to a machine learning/artificial intelligence model may include, but are not limited to, foot-traffic density, "gaming noise" energy level at a location, running average trend of revenue generation as a function of location, game type at a location, jackpot levels, theoretical win/loss over a period of time at the location (e.g., one hour), whether the win/loss is trending up or down, etc. The outputs from the machine learning/artificial intelligence model may include, but are not limited to, boosting the level of extra payout via better pay tables, higher bonusing, free games given out, to whom this applies, for how long this applies, how frequently this applies, etc. Over time, the machine learning/artificial intelligence model may obtain the expertise to automatically micro-target the right players and/or groups of players on their particular games to push up the earning average at a location.

Figure 11:
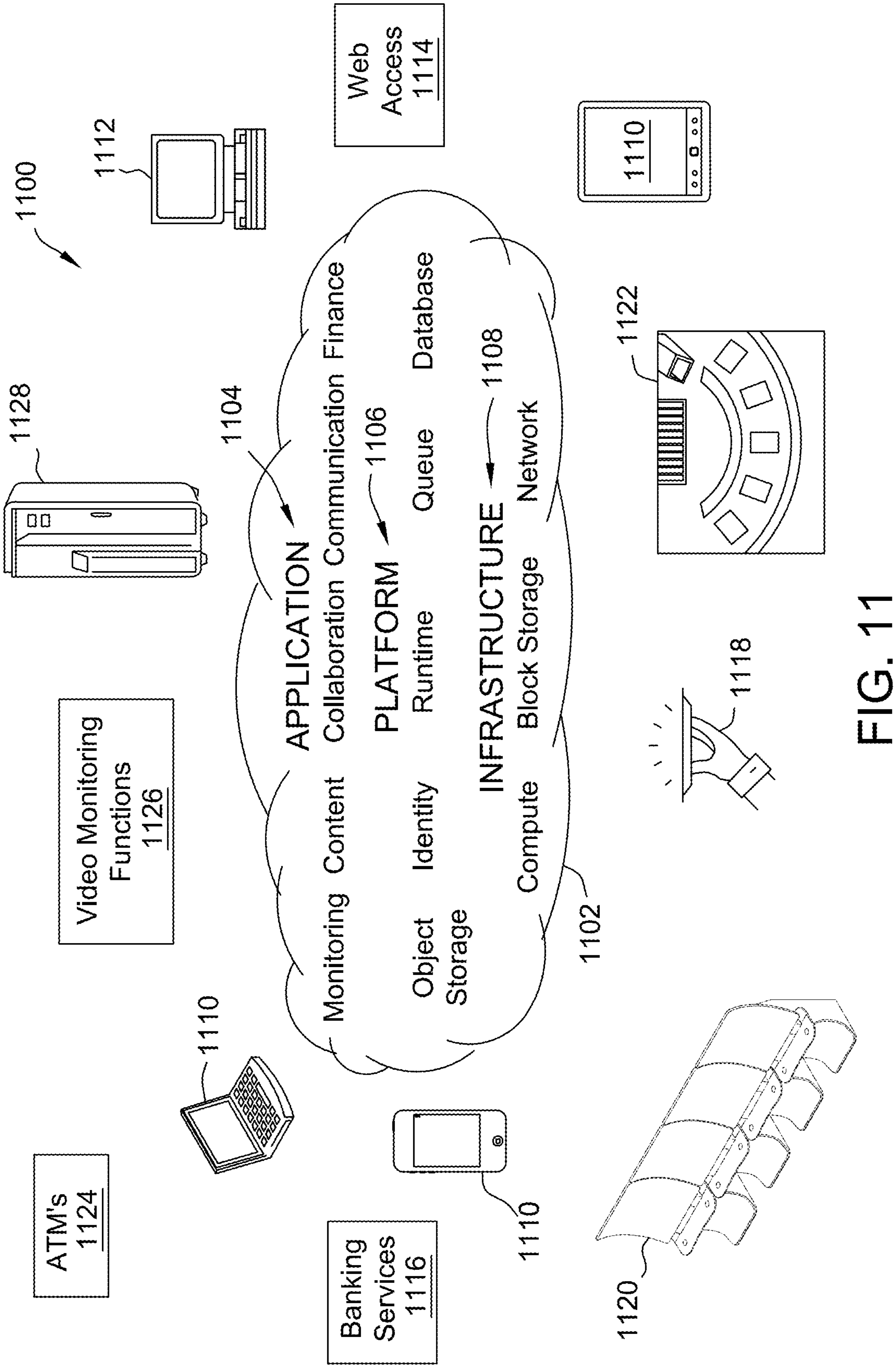
FIG. 11 illustrates an overview of some of the components and services that may be provided by a system that integrates environmental data captured from the casino along with legacy casino data in an example embodiment.

FIG. 11 illustrates an overview of some of the components and services that may be provided by a system 1100 that integrates environmental data captured from the casino along with legacy casino data in an example embodiment. In this embodiment, system 1100 includes various components 1102, such as applications 1104 (e.g., monitoring applications, content delivery applications, collaboration applications, communication application, finance applications, etc.), platform components 1106 (e.g., object storage, identity management, runtime components, queue components, database components, etc.), and infrastructure 1108 (e.g., compute devices, block storage, network, etc.), which interact and/or control the various elements of system 1100. In this embodiment, system 1100 includes mobile devices 1110 (e.g., smart phones, tablets, laptops, etc.), and desktop computers 1112. System 1100 interacts with mobile devices 1110 and/or desktop computers 1112 to implement various service/control functions such as web access 1114, banking services 1116, location-based services on a casino floor, concierge services 1118, communications with EGMs 1120 (e.g., slot machines), gaming tables 1122, ATMs 1124, video monitoring functions 1126, etc. System 1100 may be implemented by one or more servers 1128, which may include some or all of the functionality previously described with respect to central determination gaming system server 106, TITO system server 108, player tracking system server 110, progressive system server 112, and/or casino management system server 114 (see FIG. 1).

Figure 12:
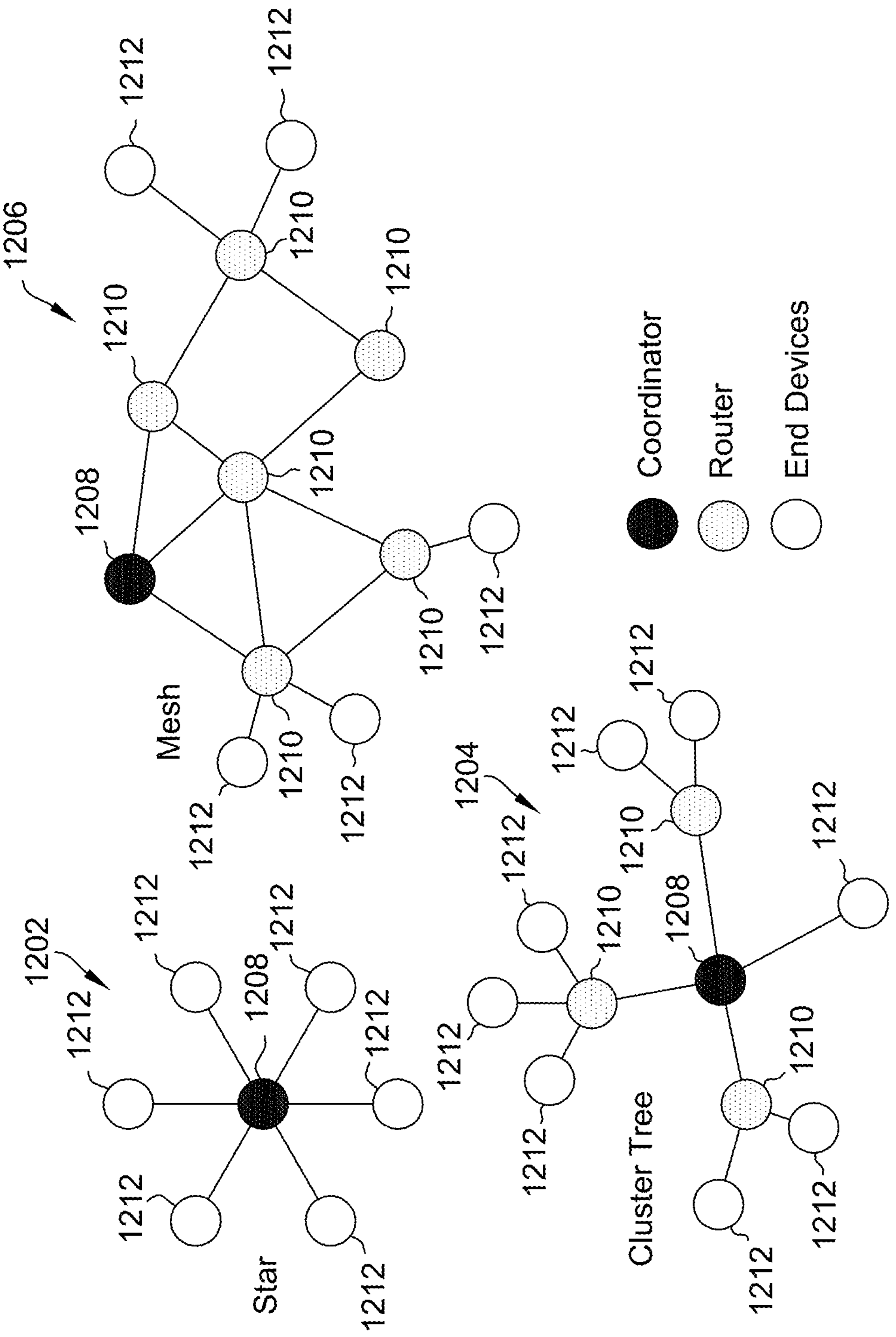
FIG. 12 illustrates various communication network topologies that may be implemented by the system of FIG. 11 in an example embodiment.

FIG. 12 illustrates various communication network topologies that may be implemented by system 1100 in an example embodiment. In particular, FIG. 12 illustrates a star network 1202, a cluster tree network 1204, and a mesh network 1206. Legacy SMIB s (hard wired) collect slot accounting data from EGMs 1120 (e.g., money in, money out, jackpot hits, total games played, games won, etc.). Typical legacy casino networks use star network 1202 or cluster tree network 1204 topologies to transport data between EGMs 1120 and servers 1128. System 1100 implements both legacy networks (e.g., star network 1202 and/or cluster tree network 1204) along with mesh network 1206 in some embodiments to implement the various functions, features, and services described herein for system 1100. System 1100 leverages the existing slot systems and their wired network connections for backhauling both legacy data and environmental data generated by the environmental sensors, which may be installed inside of gaming devices (e.g., EGMs 1120, gaming tables 1122, etc.), or outside of gaming devices (e.g., walls, ceiling, floor, on top of a slot machine, etc.). When mobile device 1110 operates as a gaming device, mobile device 1110 may operate as a virtual environmental sensor, capturing data using the location, orientation, and direction of travel of mobile device 1110, along with a temperature, audiovisual clips (via microphone and cameras), etc. A virtual environmental sensor is a software-emulated system that captures environmental data using available sensors of mobile device 1110 and reports the data to the casino's environmental data server—even while mobile device 1110 is moving throughout the casino floor (i.e., mobile environmental sensors, crowd sourced). The environmental sensors and/or mobile devices 1110 (when operating as a virtual environmental sensor) may be network together via mesh network 1206 and forward their data to a coordinator node 1208 in some embodiments. Coordinator node 1208 may also be referred to as a gateway.

In some embodiments, coordinator node 1208 is located in an EGM (e.g., coordinator node 1208 resides at an eSMIB that includes both wired and wireless network interfaces). In this embodiment, the eSMIB s include both a wired network interface (e.g., to star network 1202 and/or cluster tree network 1204) for a legacy casino accounting system and also include a wireless interface (e.g., to mesh network 1206) to communicate, receive and route the environmental data generated by the environmental sensors to servers 1128 and their databases. This type of hybrid network approach helps to improve the transition from legacy casino networks to future casino networks that include other wireless topologies, such as mesh network 1206. For a new casino with no legacy networks, eSMIBs may utilize mesh network 1206 exclusively, with a few eSMIBs operating as coordinator nodes 1208 and equipped with a high-speed wired or wireless network interface for backhauling data. In the networks depicted in FIG. 12, coordinator nodes 1208 communicate with and/or interact with various other network elements including routers 1210 and end devices 1212. Routers 1210 generally route data across cluster tree network 1204 and mesh network 1206. In cluster tree network 1204, routers 1210 are typically stand-alone devices. In mesh network 1206, routers 1210 may be formed from the environmental sensors distributed in the casino. End devices 1212 may be, in some embodiments, server computers 102 (see FIG. 1) for star network 1202 and cluster tree network 1204, while end devices 1212 in mesh network 1206 may include mobile devices 1110 (see FIG. 4).

In some embodiments, mesh network 1206 handles a variety of functions. In a casino, these functions may be separated. Multiple mesh networks with the same or different architectures can co-exist in a casino. For instance, one mesh network 1206 may be used for mobile iGaming and their smart phone locations, another mesh network 1206 may be used for fixed devices (e.g., EGMs), another mesh network 1206 may be used for providing floor navigation information for patrons, while another mesh network 1206 may be used for security camera surveillance, etc. This type of network segregation may be important in a casino because some networks are open (e.g., public access Wi-Fi networks) while other networks are secured (e.g., slot accounting data, table data, software downloads, user authentication, progressives, financial data, audit data, etc.).

Figure 13:
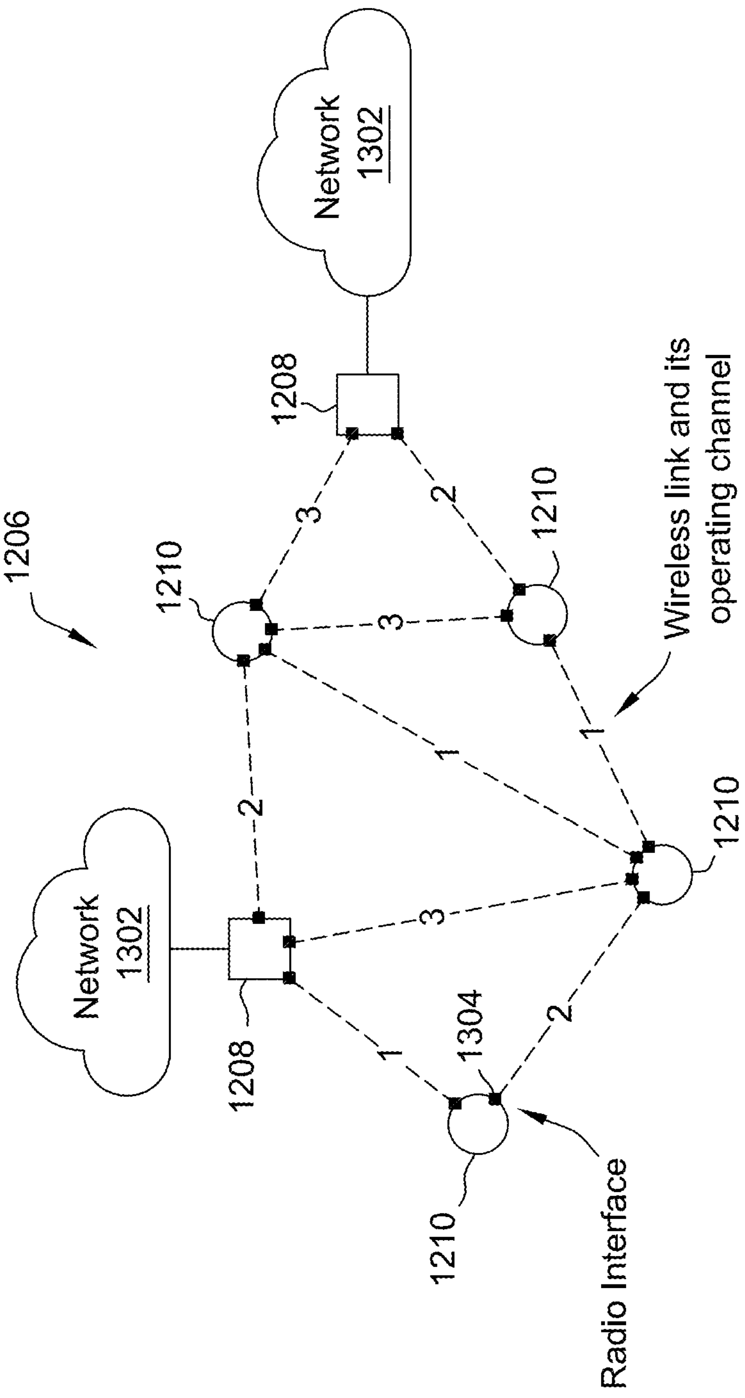
FIG. 13 depicts a simplified view of a mesh network depicted in FIG. 12 in an example embodiment.

FIG. 13 depicts a simplified view of mesh network 1206 in an example embodiment. In this embodiment, coordinator node 1208 (also referred to as a gateway) utilizes a wired connection to a network 1302 and is used to backhaul data forwarded across mesh network 1206 by routers 1210. Each of routers 1210 may include one or more wireless interfaces 1304, which may operate on different wireless standards or channels 1, 2, 3 (e.g., Bluetooth, Ultra-Wide-Band, Wi-Fi, Zigbee, Z-Wave, Radio Frequency Identification, etc.). The ability for router 1210 to communicate using multiple wireless interfaces 1304 allows router 1210 to collect data from different environmental sensors from different manufacturers that operate on different wireless standards. As discussed previously, routers 1210 in mesh network 1206 may be formed from the environmental sensors, with coordinator node 1208 backhauling the environmental data generated by the environmental sensors across network 1302 to one or more local and/or cloud-based servers.

Figure 14:
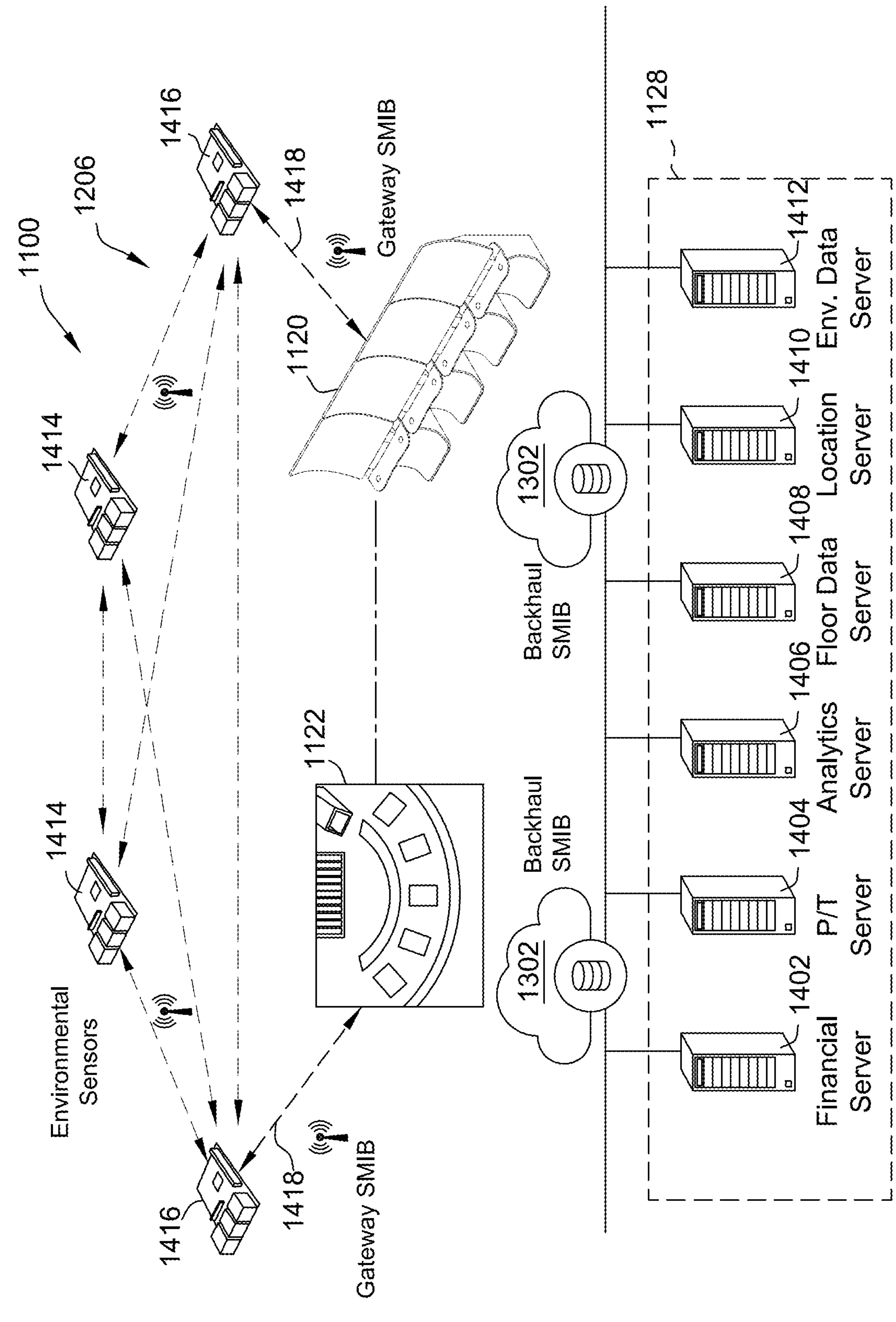
FIG. 14 depicts a portion of the system of FIG. 11 in another example embodiment.

FIG. 14 depicts a portion of system 1100 in another example embodiment. In this embodiment, system 1100 includes mesh network 1206, EGMs 1120, gaming tables 1122, and servers 1128. In this embodiment, servers 1128 include a financial service server 1402, a player tracking server 1404, an analytics server 1406, a floor data server 1408, a location server 1410, and an environmental data server 1412. Any of servers 1128 may implement the various functions described for server computers 102 in FIG. 1. Further, any of servers 1128 may be implemented virtually in the cloud.

In this embodiment, mesh network 1206 includes environmental sensors 1414 and gateways 1416 (one or both of which may be installed internally or externally to a gaming device). In some embodiments, gaming tables 1122 and/or EGM 1120 operate as gateways 1416 and collect data from environmental sensors 1414, with gateway 1416 operating as an environmental sensor in this embodiment. In other embodiments, gateways 1416 are stand-alone devices, capable of connecting wired or wirelessly directly with network 1302. In this embodiment, environmental sensors 1414 communicate with each other and also with gateways 1416. In this embodiment, EGMs 1120, and gaming tables 1122 included eSMIBs, which include both a wired interface to network 1302 and a wireless interface that communicates to mesh network 1206 via gateways 1416 to provide high-speed backhauling functions.

During operation, environmental sensors 1414 generate environmental data previously described, which is forwarded across mesh network 1206 to gateways 1416. Gateways 1416 collate the environmental data and forward the environmental data via wireless links 1418 (e.g., which may be a long-range wireless link such as Wi-Fi, ultra-wideband, Cellular, LoRa, etc.) to the eSMIBs (not shown) in EGMs 1120 and gaming tables 1122. The eSMIBs then backhaul the environmental data generated by environmental sensors 1414 and legacy data generated by EGMs 1120 and gaming tables 1122 to one or more of servers 1128, and/or to an intermediate cloud data repository.

In this embodiment, floor data server 1408 stores layout information for a casino. For instance, floor data server 1408 may store information that locates EGMs 1120, gaming tables 1122, and environmental sensors 1414 as spatial data for the casino floor. Environmental data generated by environmental sensors 1414 is routed across mesh network 1206 by environmental sensors 1414, to gateways 1416. Gateways 1416 collate the environmental data and forward the environmental data over wireless links 1418 to the eSMIBs (not shown) within EGMs 1120 and gaming tables 1122. The eSMIBs backhaul the environmental data to environmental data server 1412 via network 1302, allowing the new casino-wide environmental data to ride on top of legacy casino networks, while reducing implementation costs and accelerate integration. That is, the eSMIBs also backhaul legacy game data via network 1302 to, for example, to player tracking server 1404.

Analytics server 1406 utilizes the environmental data stored by environmental data server 1412 to provide analytics regarding the real-time status of the casino floor based on the environmental data generated by environmental sensors 1414. For example, analytics server 1406 may utilize floor layout data and the locations of environmental sensors 1414 on the casino floor, which may be stored by floor data server 1408 as spatial data, game play activities, along with user location data stored by location server 1410 to generate analytics regarding one or more of temperatures at different locations on the casino floor, the air quality at different locations on the casino floor, audio levels at different locations on the casino floor, the brightness at different locations on the casino floor, the humidity at different locations on the casino floor, foot traffic flow at different locations on the casino floor (e.g., direction and/or density), player concentrations at different locations on the casino floor, the detection of transient events (e.g., transient crowd cheer noise), etc.

To generate location data for users, an application executing on mobile devices 1110 may query environmental sensors 1414, which, in some embodiments, provide a unique identifier (ID) back to mobile devices 1110. The unique ID may then be forwarded by mobile devices 1110 to location server 1410, which correlates the approximate location of a user on the casino floor based on the known locations for environmental sensors 1414 and their unique IDs.

Figure 15:
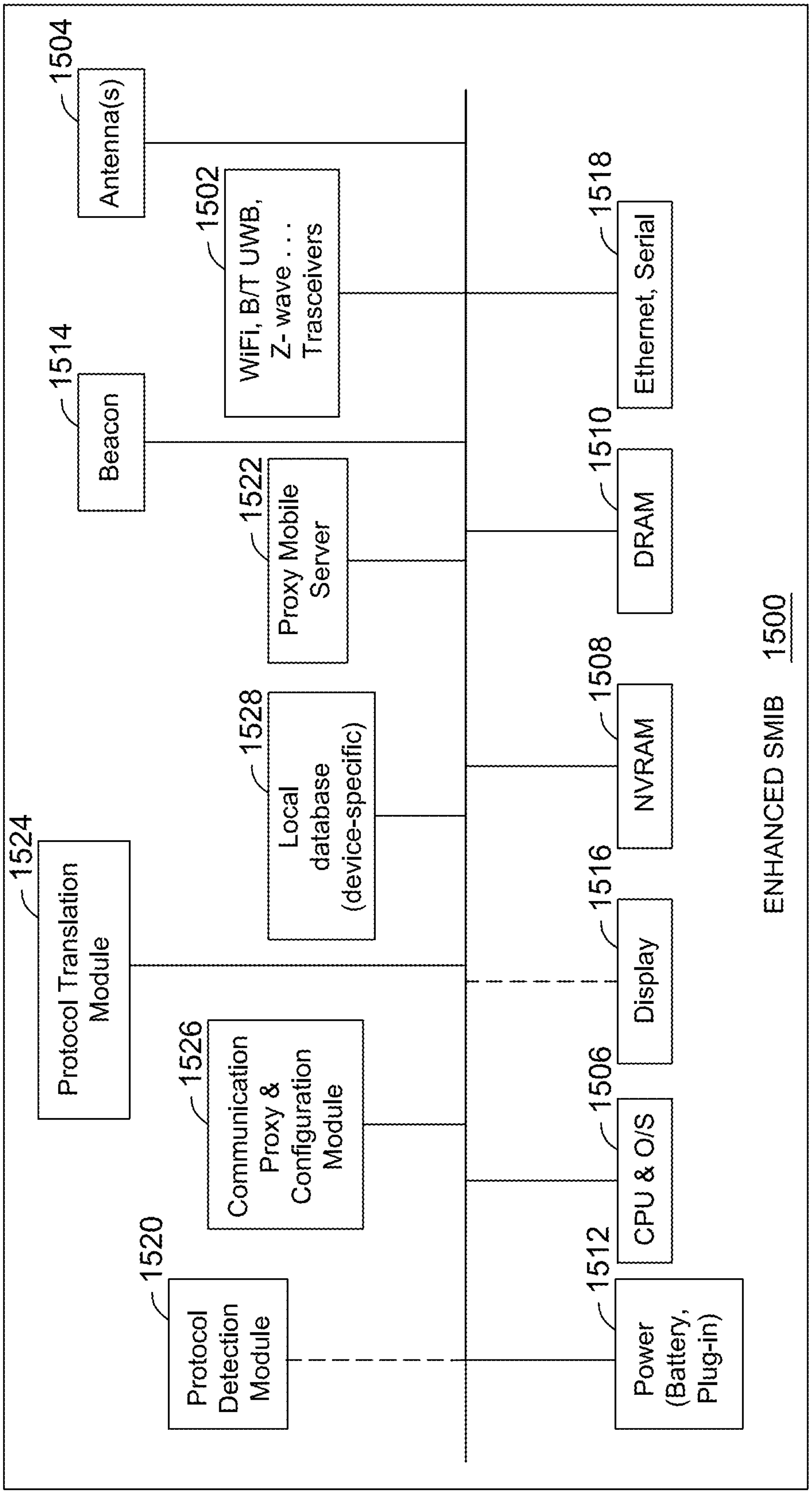
FIG. 15 is a block diagram of an enhanced slot machine interface board that may be used by the system of FIG. 11 in an example embodiment.

FIG. 15 is a block diagram of an eSMIB 1500 in an example embodiment. eSMIB 1500 includes any component, system, or device that performs the functionality described herein for the eSMIBs described herein. eSMIB 1500 will be described with respect to various discrete elements, which perform functions. These elements may be combined in different embodiments or segmented into different discrete elements in other embodiments. eSMIB 1500 may, for instance, be located in EGMs 1120 and/or gaming tables 1122 and used to backhaul both environmental data generated by environmental sensors 1414 and legacy data generated by EGMs 1120 and gaming tables 1122, to network 1302 (see FIG. 13). Further, eSMIB 1500 may include other components, not shown, such as the components previously described with respect to game controller 202 of FIG. 2A.

In some embodiments, eSMIB 1500 includes one or more wireless transceivers 1502 communicatively coupled to one or more antennas 1504. Wireless transceivers 1502 may implement any wireless network as desired, including Wi-Fi networks, Bluetooth networks, Z-wave networks, Zigbee networks, etc.

In this embodiment, eSMIB 1500 includes a processor 1506, a non-volatile random-access memory (NVRAM) 1508, and a dynamic RAM (DRAM) 1510. In this embodiment, eSMIB 1500 includes a power module 1512. Power module 1512 may include batteries, which provides mobile operation for eSMIB 1500 without using a wired power connection to eSMIB 1500. In other embodiments, power module 1512 includes a fixed or removable power connection to external power, resulting in eSMIB 1500 being hard-wired to a power source. In some embodiments, eSMIB 1500 may include one or more of a beacon 1514, a display 1516, an Ethernet/serial interface 1518 (e.g., one or more Ethernet and/or universal serial bus (USB) interfaces, parallel (IEEE-488), RS-232, RS-485. etc.). In this embodiment, eSMIB 1500 further includes an EGM protocol detector module 1520 and a proxy mobile server 1522.

Beacon 1514 may, for example, comprise a Bluetooth low-energy (BLE) beacon which interacts with mobile devices 1110 of users to enable system 1100 to provide location-based services to the users. Display 1516 may be used to display information, such as the status of eSMIB 1500. Ethernet/serial interface 1518 may be used to communicate with EGMs 1120 and/or gaming tables 1122, network 1302, and mesh network 1206.

In some embodiments, EGM protocol detector module 1520 may be used to allow eSMIB 1500 to automatically identify the local communication protocols used by EGMs 1120 and/or gaming tables 1122. In some embodiments, proxy mobile server 1522 may be used to allow eSMIB 1500 to communicate directly with mobile devices 1110 to, for example, allow a user to add money to EGMs 1120 and/or gaming tables 1122.

In some embodiments, eSMIB 1500 includes a protocol translation module 1524, and/or a communication proxy & configuration module 1526, and/or a local database 1528. Protocol translation module 1524 allows eSMIB 1500 to communicate with different vendor's servers 1128 that use different protocols. Communication proxy & configuration module 1526 may interact with a main database of system 1100 (not shown) to retrieve configuration information and device profiles for EGMs 1120 and/or gaming tables 1122, which may be stored in local database 1528.

During operation, environmental sensors 1414 generate environmental data of their surroundings within the casino floor, which is forwarded to gateway 1416. eSMIB 1500 communicates with gateway 1416 and/or environmental sensors 1414 via wireless link 1418 and forwards the environmental data to network 1302 via Ethernet/serial interface 1518 (e.g., via Ethernet). The environmental data may then be provided, by network 1302, to environmental data server 1412 (see FIG. 14), to some other server, and/or to a cloud repository. eSMIB 1500 also generates game data, based on player use of EGMs 1120 and/or gaming tables 1122. This game data, which may be referred to as legacy data, is forwarded by eSMIB 1500 across network 1302 utilizing Ethernet/serial interface 1518 (e.g., via Ethernet), to servers 1128 (e.g., to player tracking server 1404 of FIG. 14).

Figure 16:
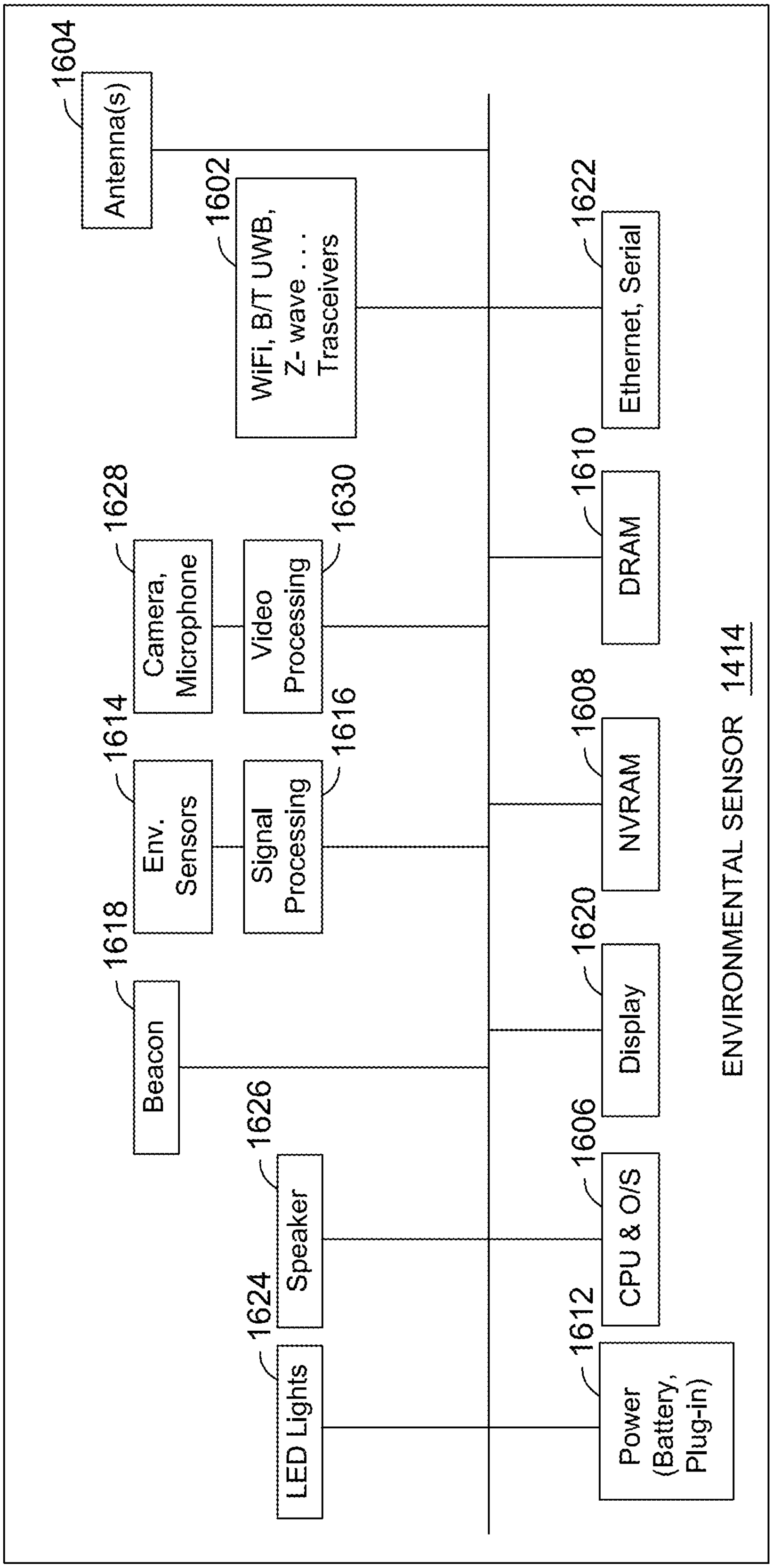
FIG. 16 is a block diagram of an environmental sensor that may be utilized by the system of FIG. 11 in an example embodiment.

FIG. 16 is a block diagram of environmental sensor 1414 in an example embodiment. Environmental sensor 1414 includes any component, system, or device that performs the functionality described herein for the environmental sensors described herein. Environmental sensor 1414 will be described with respect to various discrete elements, which perform functions. These elements may be combined in different embodiments or segmented into different discrete elements in other embodiments.

In this embodiment, environmental sensor 1414 includes one or more wireless transceivers 1602 communicatively coupled to one or more antennas 1604. Wireless transceivers 1602 may implement any wireless network as desired, as previously described, in order to implement mesh network 1206 and in some embodiments, wireless link 1418 (e.g., when environmental sensor 1414 operates as gateway 1416). In this embodiment, environmental sensor 1414 includes a processor 1606, a non-volatile random-access memory 1608 (NVRAM, such as NAND Flash, Magnetic RAM, Ferroelectric RAM, etc.), and DRAM 1610. In this embodiment, environmental sensor 1414 includes a power module 1612, sensors 1614, and signal processing circuits 1616. Power module 1612 may include batteries, which provides mobile operation for environmental sensor 1414 without using a wired power connection to environmental sensor 1414. In other embodiments, power module 1612 includes a fixed or removable power connection to external power, resulting in environmental sensor 1414 being hard-wired to a power source. Sensors 1614 generate the environmental data regarding the space that environmental sensor 1414 is within, such as temperature, air quality, audio-visual (sound, video), humidity, as well as video analytic information such as crowd density, foot-traffic flow, loitering, etc. Signal processing circuits 1616 operate to process the signals generated by sensors 1614 into a desired format. For example, signal processing circuits 1616 may convert analog signals generated by sensors 1614 into digital signals, prior to transmission of the environmental data across mesh network 1206. In some embodiments, environmental sensor 1414 may include one or more of a beacon 1618 for identification and location data, a display 1620 (e.g., a liquid crystal display), Ethernet/serial interface 1622 (e.g., Ethernet, parallel (IEEE-488) and/or serial (USB, RS-232, RS-485) interfaces), light emitting diodes (LEDs) 1624, a speaker 1626, a camera and/or microphone 1628, and/or a video processing module 1630.

Beacon 1618 may, for example, comprise a Bluetooth low-energy (BLE) beacon which interacts with mobile devices 1110 to enable system 1100 to provide location-based services to mobile devices 1110. Display 1620 may be used to display information, such as the status of environmental sensor 1414. Ethernet/serial interface 1622 may utilize Ethernet and/or USB when environmental sensor 1414 operates as gateway 1416, when programming environmental sensor 1414, etc. LEDs 1624 may also be used to provide status information regarding environmental sensor 1414. Speaker 1626 may also be used to provide audio status information regarding environmental sensor 1414. Camera and/or microphone 1628 may be used to capture video and/or audio of the environment proximate to environmental sensor 1414, both of which are types of the environmental data generated by environmental sensor 1414. Video processing module 1630 may be used to reformat raw video/audio data into a more suitable format for transmission across mesh network 1206 (e.g., the use of compression such as H.264, H.265, etc.).

Figure 17:
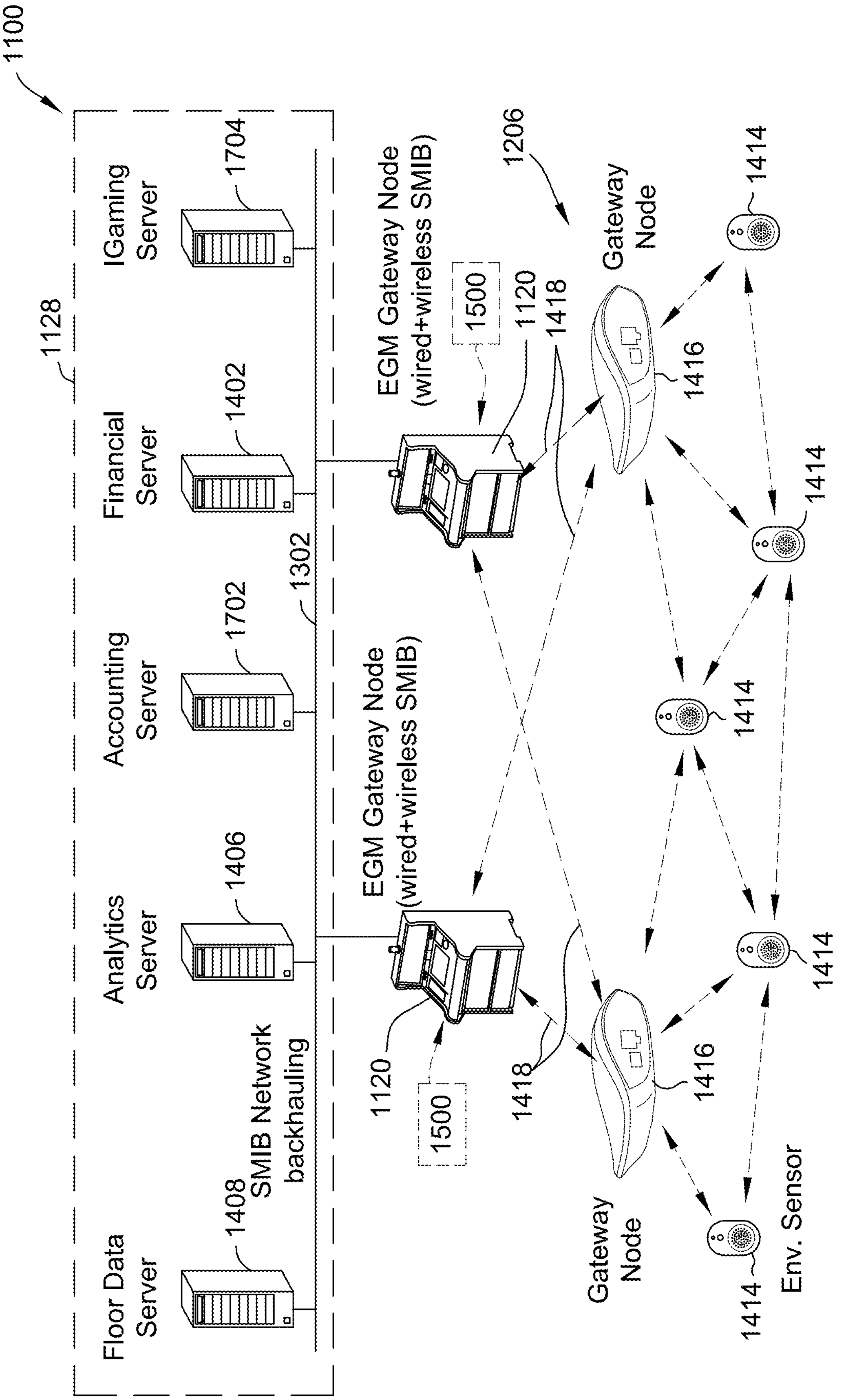
FIGS. 17-19 depict various portions of the system of FIG. 11 in example embodiments.

FIG. 17 depicts a portion of system 1100 in another example embodiment. In this embodiment, system 1100 includes mesh network 1206, servers 1128, and EGMs 1120, which include eSMIB s 1500. In this embodiment, servers 1128 include an accounting server 1702 and an iGaming server 1704. Accounting server 1702 and/or iGaming server 1704 may implement some or all of functionality previously described for server computers 102 of FIG. 1. Further, any of accounting server 1702 and/or iGaming server 1704 may be implemented virtually in the cloud.

In this embodiment, mesh network 1206 includes environmental sensors 1414 and gateways 1416. EGMs 1120 include both a wireless interface to mesh network 1206 and a wired interface to network 1302, which is provided by eSMIB s 1500 deployed within EGMs 1120. In some embodiments, EGMs 1120 comprise gaming tables 1122.

During operation, environmental sensors 1414 generate the environmental data previously described, which is forwarded across mesh network 1206 by environmental sensors 1414 to gateways 1416. Gateways 1416 collate the environmental data and forward the environmental data via wireless links 1418 (e.g., which may be a long-range wireless link such as Wi-Fi, ultra-wideband, etc.) to eSMIBs 1500 in EGMs 1120. eSMIBs 1500 also capture legacy gaming data (e.g., number of games played, money in, money paid out, number of jackpots paid, etc.) for EGMs 1120. eSMIB s 1500 then backhaul both the legacy gaming data and the environmental data to one or more of servers 1128, and/or to a cloud repository.

Figure 18:
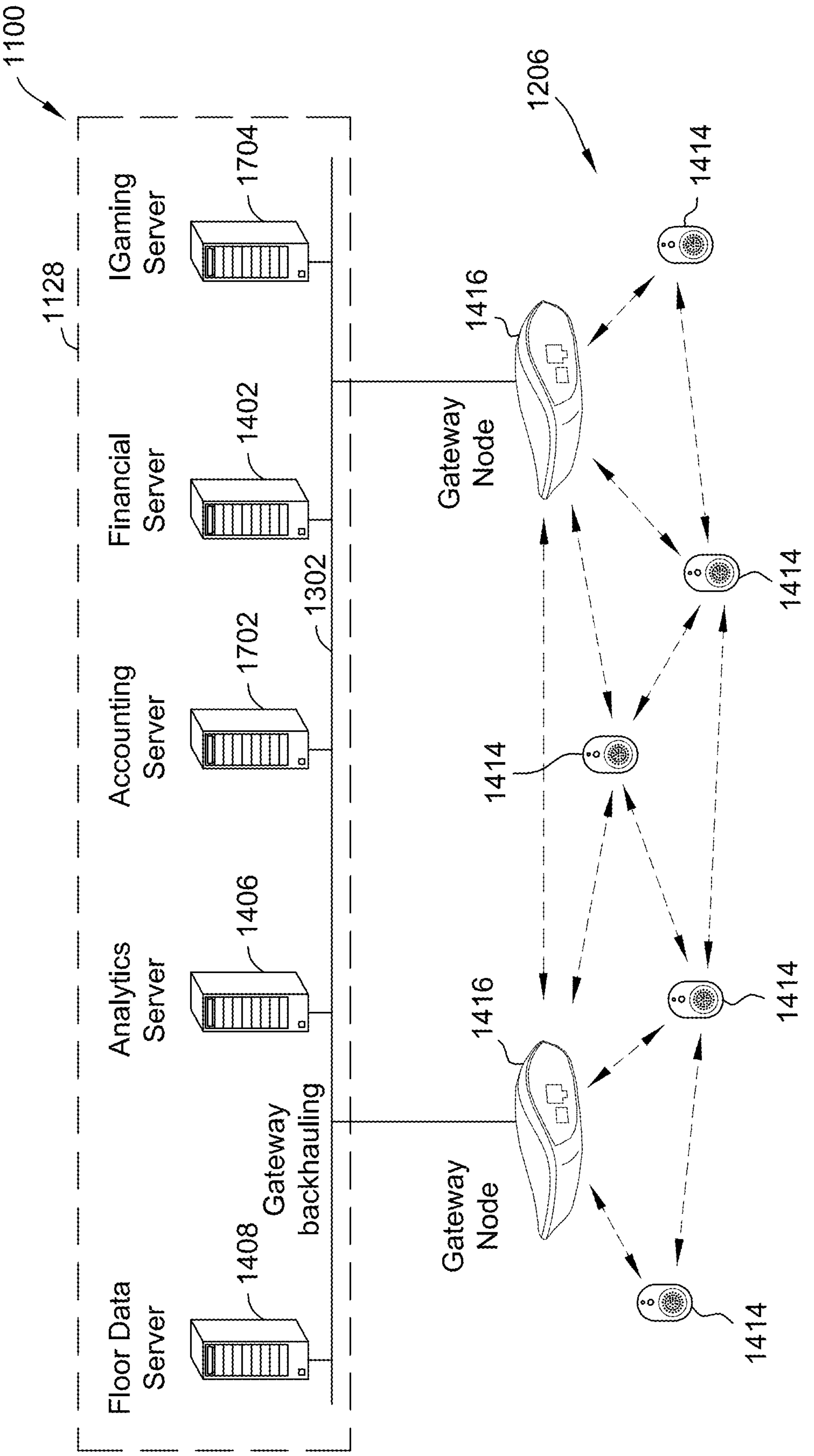

FIG. 18 depicts a portion of system 1100 in another example embodiment. In this embodiment, system 1100 includes mesh network 1206 and servers 1128. EGMs 1120 are not used in this embodiment as a backhauling gateway in cases where they are not available, not accessible, or installing eSMIB 1500 is not permitted.

In this embodiment, mesh network 1206 includes environmental sensors 1414 and gateways 1416. Gateways 1416 include both wired and/or wireless interfaces that communicate with network 1302, and wireless interfaces that communicate with mesh network 1206.

During operation, environmental sensors 1414 generate environmental data previously described, which is forwarded across mesh network 1206 by environmental sensors 1414 to gateways 1416. Gateways 1416 collate the environmental data and backhaul the environmental data to one or more of servers 1128 and/or to a cloud-based data repository via a wireless and/or wired interface to network 1302.

Figure 19:
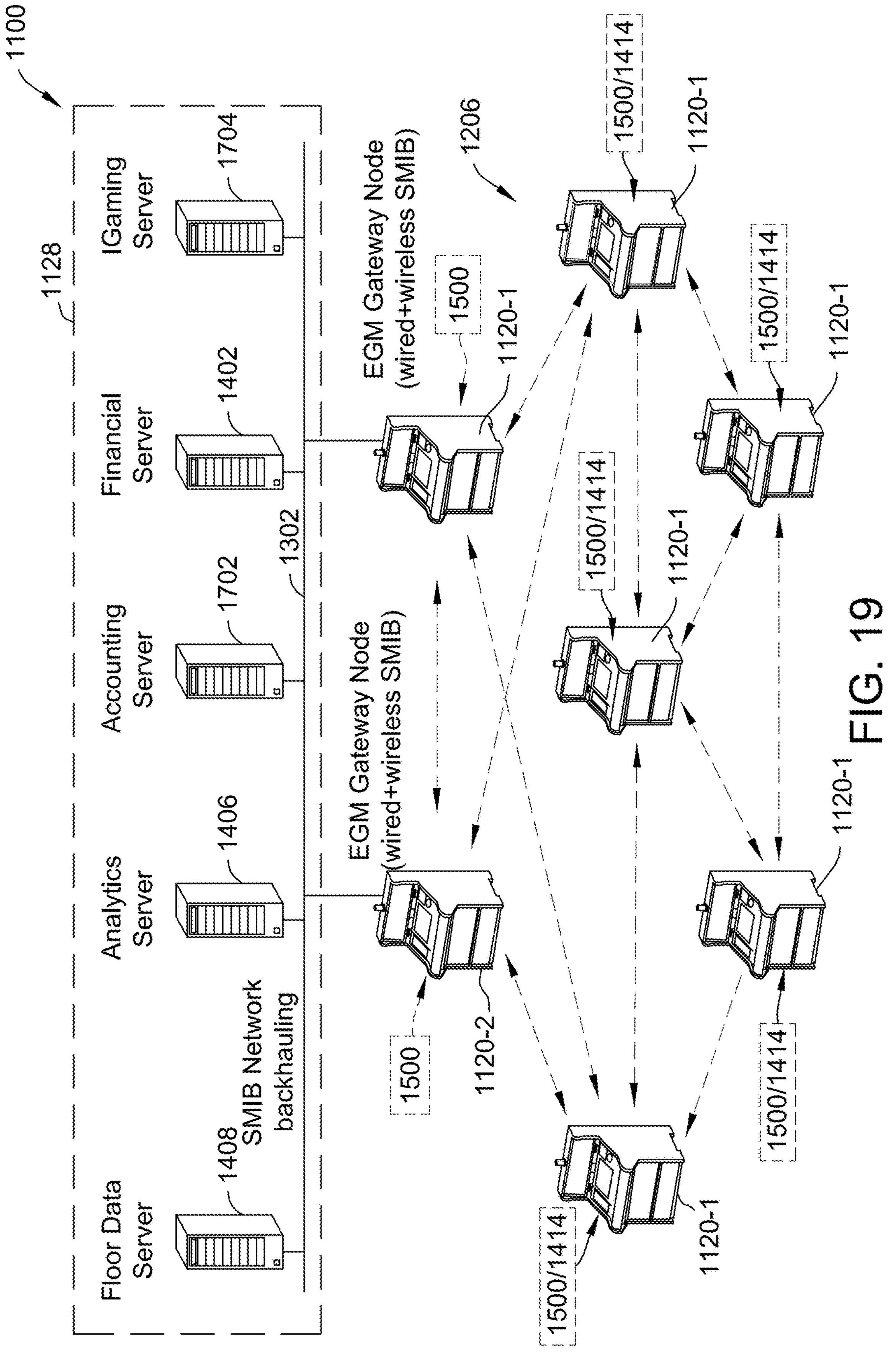

FIG. 19 depicts a portion of system 1100 in another example embodiment. In this embodiment, system 1100 includes mesh network 1206 and servers 1128. In this embodiment, mesh network 1206 includes a combination of eSMIBs 1500 and environmental sensors 1414 located within EGMs 1120-1, and eSMIBs 1500 located within EGMs 1120-2. This implementation may be used when it is possible or permissible to piggy-back the existing casino network by accessing the existing EGMs 1120 to install eSMIBs 1500 and environmental sensors 1414. No new network may be needed. In one embodiment, environmental sensors 1414 are attached as a module to eSMIBs 1500 in EGMs 1120-1. In another embodiment, environmental sensors 1414 and eSMIBs 1500 are separate devices in EGMs 1120-1, with each communicating independently with mesh network 1206. In another embodiment, eSMIBs 1500 include one or more of various components of environmental sensor 1414 as depicted in FIG. 9. In some embodiments, EGMs 1120 comprise gaming tables 1122.

During operation, environmental sensors 1414 generate environmental data previously described based on the conditions proximate to each of EGMs 1120-1, which is forwarded across mesh network 1206 to eSMIBs 1500 located within EGMs 1120-2. eSMIBs 1500 also capture legacy game data for EGMs 1120. eSMIBs 1500 within EGMs 1120-1 forward their legacy game data and environmental data across mesh network 1206 to eSMIBs 1500 within EGMs 1120-2. eSMIBs 1500 within EGMs 1120-2 then backhaul both the legacy game data and the environmental data to one or more of servers 1128 and/or to a cloud repository.

Figure 20:
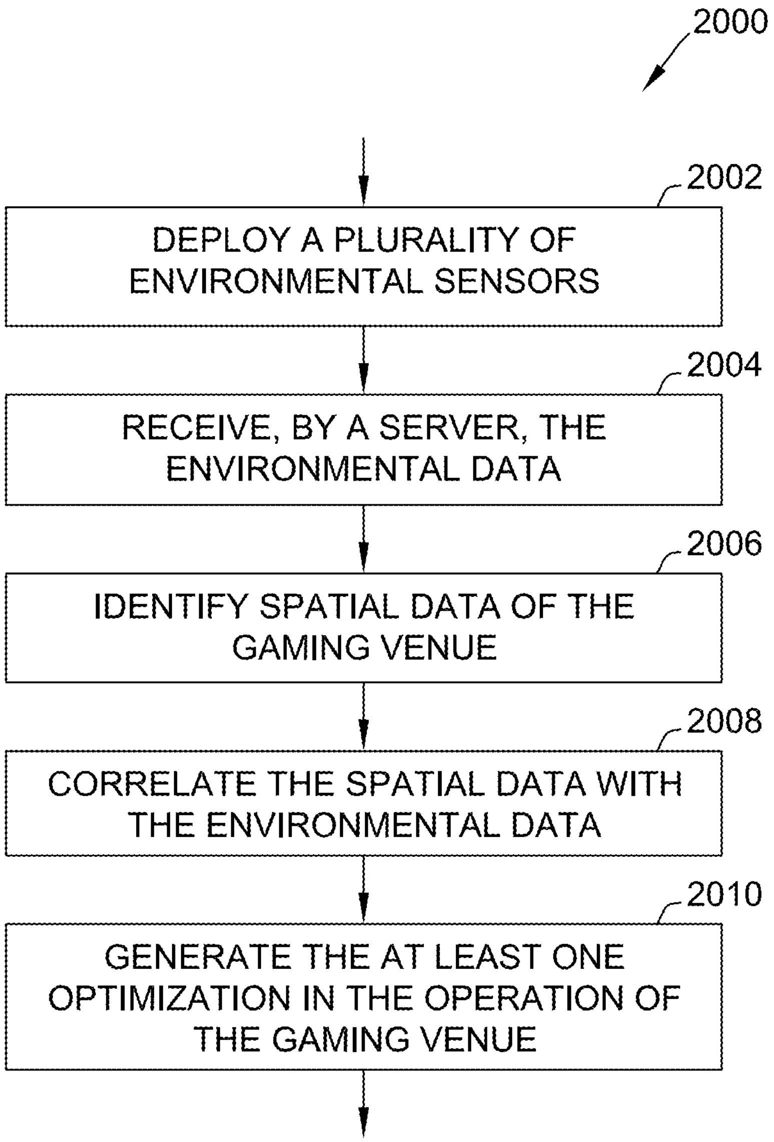
FIG. 20 is a flow chart depicting a method of optimizing an operation of a gaming venue comprising a plurality of gaming devices in an example embodiment.
Figure 21:
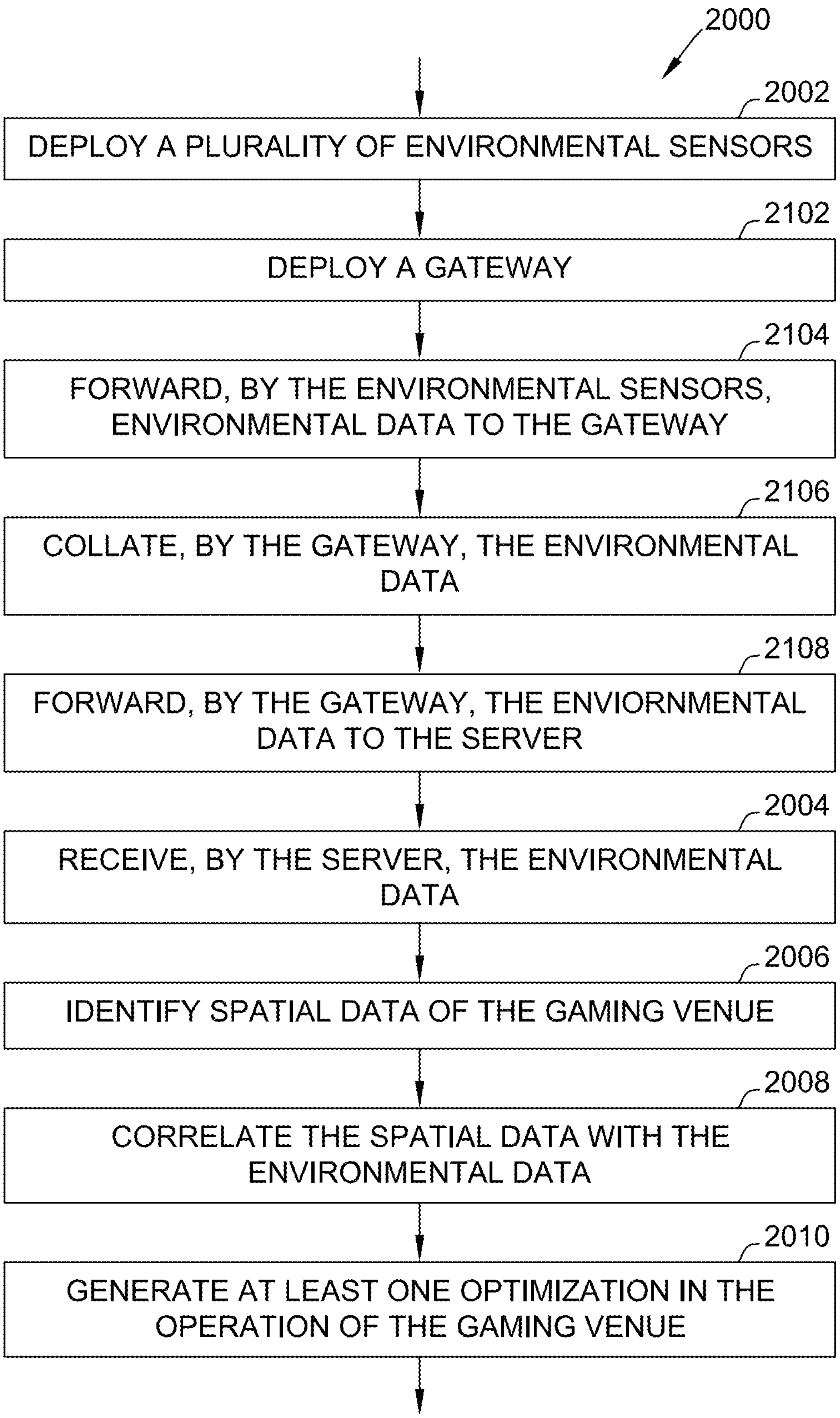
FIG. 21 is a flow chart illustrating additional details of the method depicted by FIG. 20 in an example embodiment.

FIG. 20 is a flow chart of a method 2000 of optimizing an operation of a gaming venue comprising a plurality of gaming devices in an example embodiment. FIG. 21 illustrates additional details of method 2000 in an example embodiment. Method 2000 may be performed by various elements of the systems and devices described herein, including server computers 102 (see FIG. 1), gaming device 200 (see FIG. 2A), and the various embodiments of system 1100 (see FIGS. 11-19).

Method 2000 begins by deploying 2002 a plurality of environmental sensors within the gaming venue, where each of the plurality of environmental sensors includes at least one sensor that captures environmental data at one of the different locations. For example, environmental sensors 1414 may be deployed at different locations around the gaming venue (see FIG. 14).

Method 2000 continues by receiving 2004, by a server, the environmental data from the plurality of environmental sensors. For example, environmental data server 1412 receives the environmental data captured by environmental sensors 1414 (see FIG. 14).

Method 2000 continues by identifying 2006 spatial data of the gaming venue that defines a floor layout of the gaming venue and the different locations of the plurality of environmental sensors. For example, analytics server 1406 identifies the spatial data, which may be stored by floor data server 1408 (see FIG. 14). In some embodiments, method 2000 also identifies the type of gaming devices in the area (e.g., EGMs 1120, gaming tables 1122, mobile devices 1110, etc.), and/or the current gaming activities, and/or the trending gaming activities over a period of time such as one hour, and/or the nearby foot-traffic density and trend (e.g., increasing or decreasing), etc.

Method 2000 continues by correlating 2008 the spatial data with the environmental data to generate a spatial map of the environmental data within the gaming venue. For example, analytics server 1406 generates the spatial map (see FIG. 14).

Method 2000 continues by generating 2010 at least one optimization in the operation of the gaming venue based on the spatial map of the environmental data within the gaming venue. For example, analytics server 1406 generates the at least one optimization (see FIG. 14).

In some embodiments, generating 2010 the at least one optimization further comprises at least one of: modifying bonuses provided by the gaming devices, modifying pay tables for the gaming devices, modifying progressives provided by the gaming devices, modifying promotions provided by the gaming devices, and modifying location-based advertisements displayed in the gaming venue.

In some embodiments, receiving 2004 the environmental data comprises at least one of: receiving a temperature at the different locations within the gaming venue, receiving a humidity at the different locations within the gaming venue, receiving an air quality at the different locations within the gaming venue, receiving a brightness at the different locations within the gaming venue, receiving an audio level at the different locations within the gaming venue, receiving an audio recording at the different locations within the gaming venue, receiving a video recording at the different locations within the gaming venue, receiving a user traffic flow at the different locations within the gaming venue, and receiving a user concentration at the different locations within the gaming venue.

In some embodiments, method 2000 further comprises deploying (2102, see FIG. 21), in the gaming venue, at least one gateway that includes a first wireless interface that communicatively couples with a first wireless network, and a second wireless interface that communicatively couples with a second wireless network. This embodiment, each of the environmental sensors further includes a third wireless interface that communicatively couples with the first wireless network. For example, gateways 1416 are deployed, which communicate with EGMs 1120 and gaming tables 1122 via wireless link 1418, and environmental sensors 1414 communicate with each other and gateways 1416 via mesh network 1206 (see FIG. 17).

Method 2000 continues in this embodiment by forwarding 2104, by each of the environmental sensors, its environmental data to the at least one gateway utilizing the third wireless interface. For example, environmental sensors 1414 forward their environmental data via mesh network 1206 to gateways 1416 (see FIG. 17).

Method 2000 continues in this embodiment by collating 2106, by the at least one gateway, the environmental data received from the plurality of environmental sensors. For example, gateways 1416 collate the environmental data received from environmental sensors 1414 (see FIG. 17).

Method 2000 continues in this embodiment by forwarding 2108, by the at least one gateway, the environmental data to the server utilizing the second wireless interface. For example, gateways 1416 forward the environmental data received from environmental sensors 1414 to environmental data server 1412 utilizing wireless links 1418 (see FIG. 17). In this embodiment, environmental sensors 1414 may be configured to operate directly with gateways 1416 for data transfer to environmental data server 1412 via the use of eSMIB 1500 within EGMs 1120 (see FIG. 17).

In some embodiments, method 2000 further comprises deploying 2102 (see FIG. 21) at least one gateway that includes a first wireless interface that communicatively couples with a wireless network, and a wired network interface that communicatively couples with a wired network, wherein each of the environmental sensors further includes a second wireless interface that communicatively couples with the wireless network. For example, gateways 1416 are deployed, where gateways 1416 include both wired interfaces that communicate with network 1302 and wireless interfaces that communicate with mesh network 1206 (see FIG. 18).

Method 2000 continues in this embodiment by forwarding 2104, by each of the environmental sensors, its environmental data to the at least one gateway utilizing the second wireless interface. For example, environmental sensors 1414 forward their environmental data to gateways 1416 via mesh network 1206 (see FIG. 18).

Method 2000 continues in this embodiment by collating 2106, by the at least one gateway, the environmental data received from the plurality of environmental sensors. For example, gateways 1416 collate the environmental data received from environmental sensors 1414 (see FIG. 18).

Method 2000 in this embodiment by forwarding 2108, by the at least one gateway, the environmental data to the server utilizing the wired network interface. For example, gateways 1416 forward the environmental data received from environmental sensors 1414 to servers 1128 (e.g., environmental data server 1412) utilizing network 1302 (see FIG. 18).

In this embodiment, deploying 2102 the at least one gateway may further comprise deploying a SMIB within at least one of the gaming devices to operate as the at least one gateway. For example, eSMIBs 1500 (see FIG. 15) may be deployed within EGMs 1120-2, with eSMIBs 1500 operating as gateways for mesh network 1206 (see FIG. 12).

In this embodiment, method 2000 continues by retrieving, by the SMIB from its corresponding gaming device, gaming data corresponding to a use of the corresponding gaming device by a user. For example, eSMIBs 1500 retrieve gaming data corresponding to the use of EGMs 1120-2 by users (see FIG. 19).

In this embodiment, method 2000 continues in forwarding, by the SMIB, the gaming data to the server utilizing the wired network interface. For example, eSMIBs 1500 in EGMs 1120-2 forward their gaming data to servers 1128 via network 1302 (see FIG. 19).

In some embodiments, method 2000 further comprises broadcasting, by the plurality of environmental sensors, unique identifiers (IDs) proximate to their different locations in the gaming venue. For example, environmental sensors 1414 broadcast their unique IDs to mobile devices 1110 utilizing beacon 1618 (see FIGS. 11 and 16).

Method 2000 continues in this embodiment by receiving, from a mobile device of a user, at least one of the unique IDs. For example, location server 1410 receives the unique IDs from mobile devices 1110 (see FIG. 11).

Method 2000 continues in this embodiment by identifying, based on the unique ID and the spatial data, an approximate location of the mobile device of the user within the gaming venue. For example, location server 1410 utilizes the spatial data stored by floor data server 1408 to determine an approximate location of mobile device 1110 within the gaming venue (see FIG. 14). Based on a location of mobile device 1110 and data from environmental sensors 1414, a customized modification of the gaming environment may be provided (e.g., upgraded payouts, additional bonuses, etc.).

Further described herein are systems and methods for implementing a gaming system platform using modular devices. In the example embodiments presented below, a platform server is configured to communicate with a plurality of modular devices that are deployed within a casino property, also referred to herein as an "operations venue" or just "venue" (e.g., gaming floor, hotel, lobbies, or such). The modular devices may be coupled to and/or integrated into assets (sometimes referred to herein as "casino assets", e.g., via wired or wireless connections) within the casino property (e.g., kiosks, EGMs, tables, signage, gaming and/or retail terminals, robotic devices, and/or other devices), and/or may be stand-alone devices located within the venue, but outside the casino gaming area (e.g., parking lots, retail store, and/or dining). The platform server may wirelessly connect to each of the modular devices using a centralized wireless network (e.g., a Wi-Fi network). The modular devices may be further configured to detect and/or communicate among one another and with the platform server using a wireless ad hoc network (e.g., a wireless mesh network). The modular devices may be further configured to detect and/or communicate with user devices (e.g., mobile telephones, tablets, smart wearable devices, and/or cards)

directly (e.g., via Bluetooth or near field communication (NFC)) and/or indirectly via the centralized wireless network.

The platform server may be configured to determine a location of casino assets, patrons, and employees by determining a location of corresponding modular devices and user devices. The platform server may utilize one or more technologies, such as Bluetooth low energy beacon, Wi-Fi, and/or global positioning system (GPS), to determine the location of the modular devices and/and user devices. Further, three-dimensional (3D) triangulation using the wireless mesh network, ultra-wideband (UWB) ranging, and/or other location technologies may be used to precisely determine the location of casino assets, patrons, and employees to within a few inches of their actual location within the property. Such location tracking may be used for a variety of reasons including to enhance user experience, map assets or people within the property, deploy new assets, relocate assets, and many other reasons discussed herein. For example, operation of a casino asset (e.g., an EGM) can be tailored for a patron that is known to be in proximity of the casino asset, or operation of a user device (e.g., an app) associated with the casino may change based on the location of the patron. 3D triangulation using WiFi may provide a location precision of about +/− eight meters when calibrated and about +/− twenty meters when uncalibrated. 3D triangulation using Bluetooth may provide a location precision of about +/− ten centimeters. In some embodiments, two-dimensional (2D) triangulation using the wireless mesh network may be used to determine the location of the modular devices and/or the end user devices. For examples, Bluetooth devices may utilize received signal strength indicator (RSSI) for 2D triangulation, which may provide a location precision of about +/− ten centimeters.

The platform may be further configured for automatic identification and connection of new devices. For example, the modular devices may be pre-configured prior to installation to, upon connection, utilize location information obtained from the system to automatically adopt fundamental device information from close or surrounding devices. The modular device may use a combination of the data it sees through these connections and physical proximity to create a profile of its purpose and operate according to the profile. The profile can be used as a type of device identifier or digital "fingerprint." If changes to the device configuration (e.g., a change in the device's location) are made, an algorithm may be applied to the digital "fingerprint" to identify these changes to the device configuration, and operators of the platform may be alerted to review and approve of such changes to the device location or other configuration data. In some embodiments, rule-based artificial intelligence (AI) and/or machine learning (ML) techniques may be used to propose alternative uses or purposes of a device based on its configuration, enabling an operator to select from purposes detected and proposed by the system via the AI/ML function.

Figure 22A:
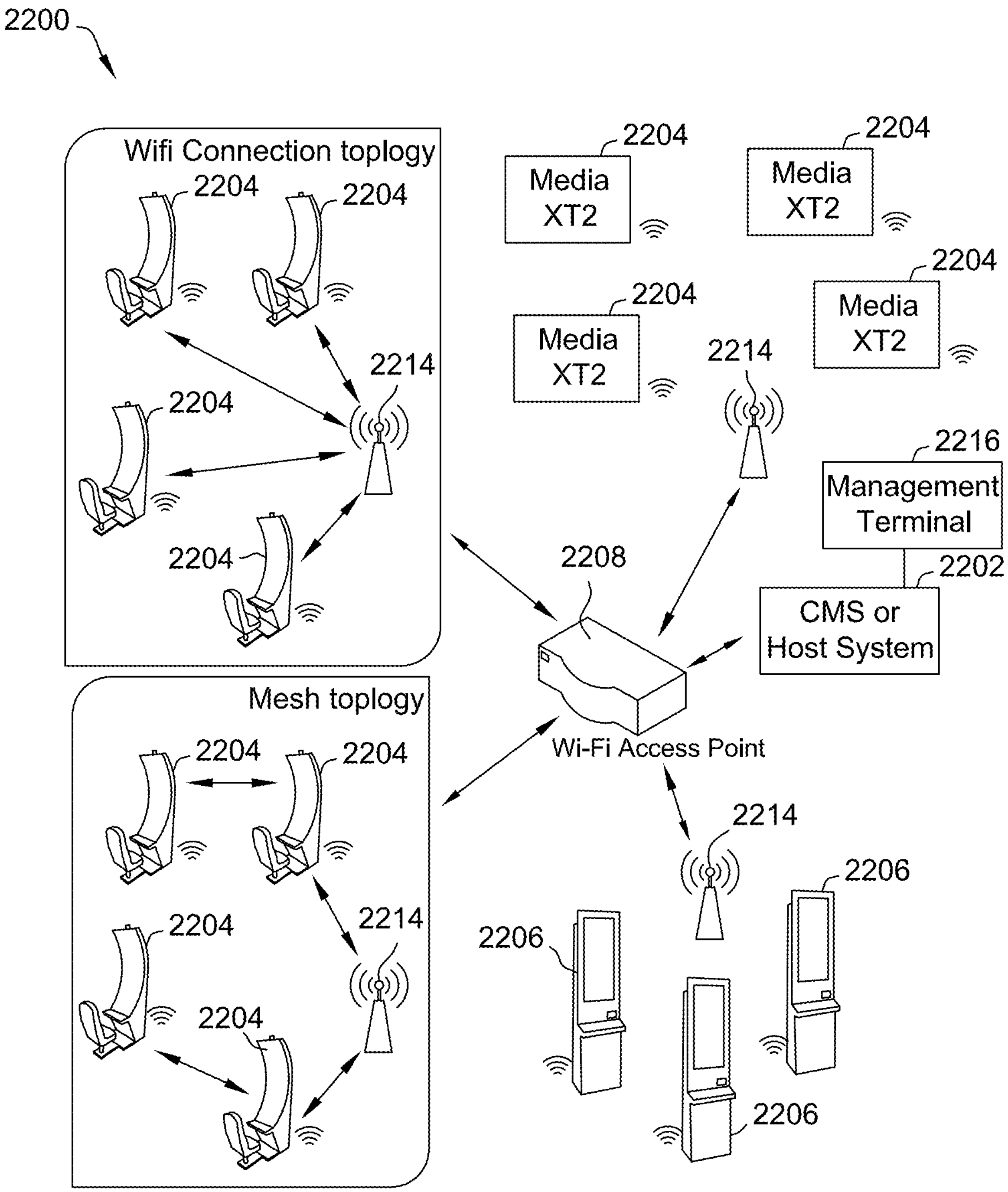
FIG. 22A depicts an example device management platform according to some aspects of the present disclosure.
Figure 22B:
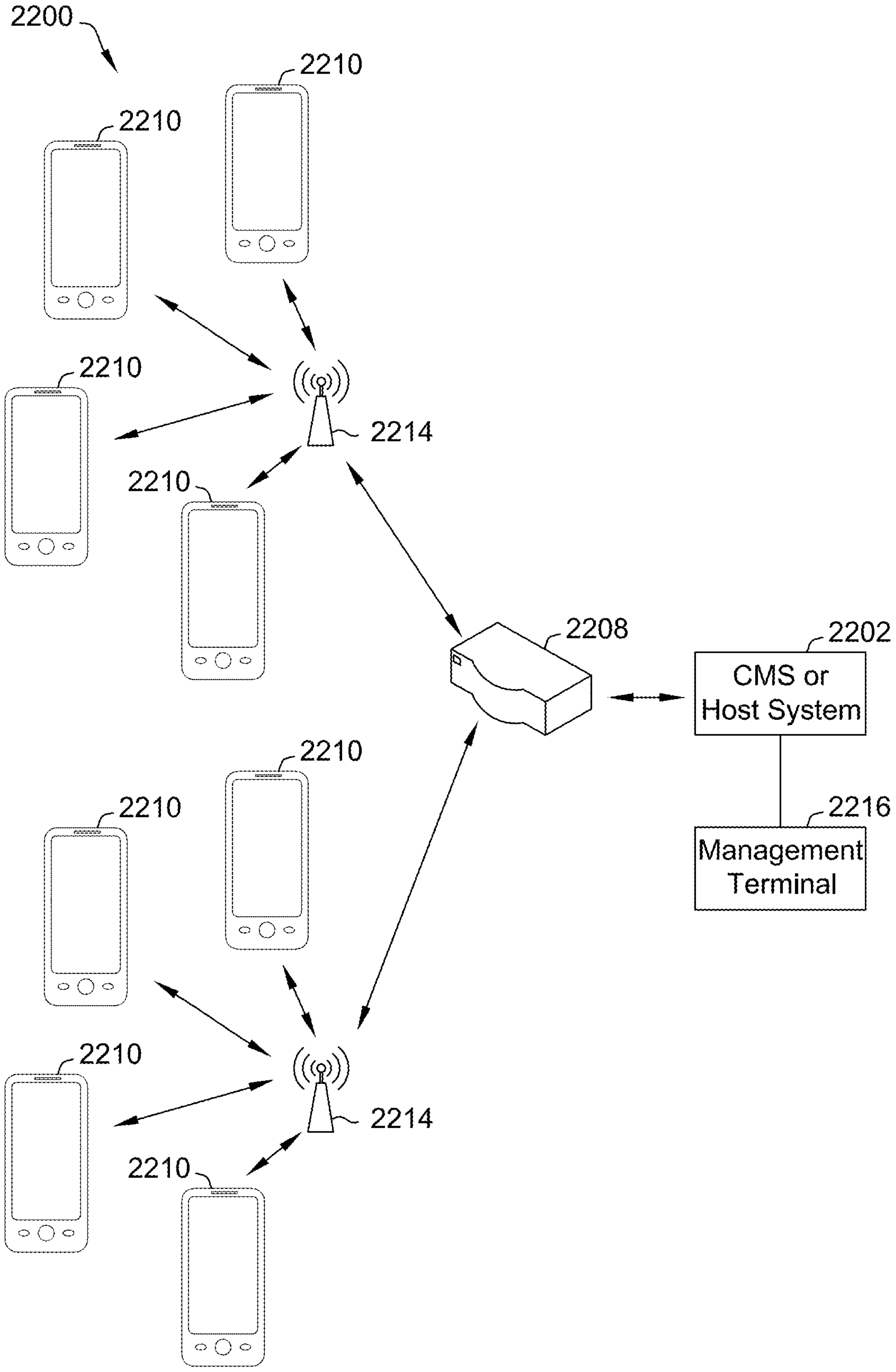
FIG. 22B depicts player mobile device components of the device management platform shown in FIG. 22A.
Figure 22C:
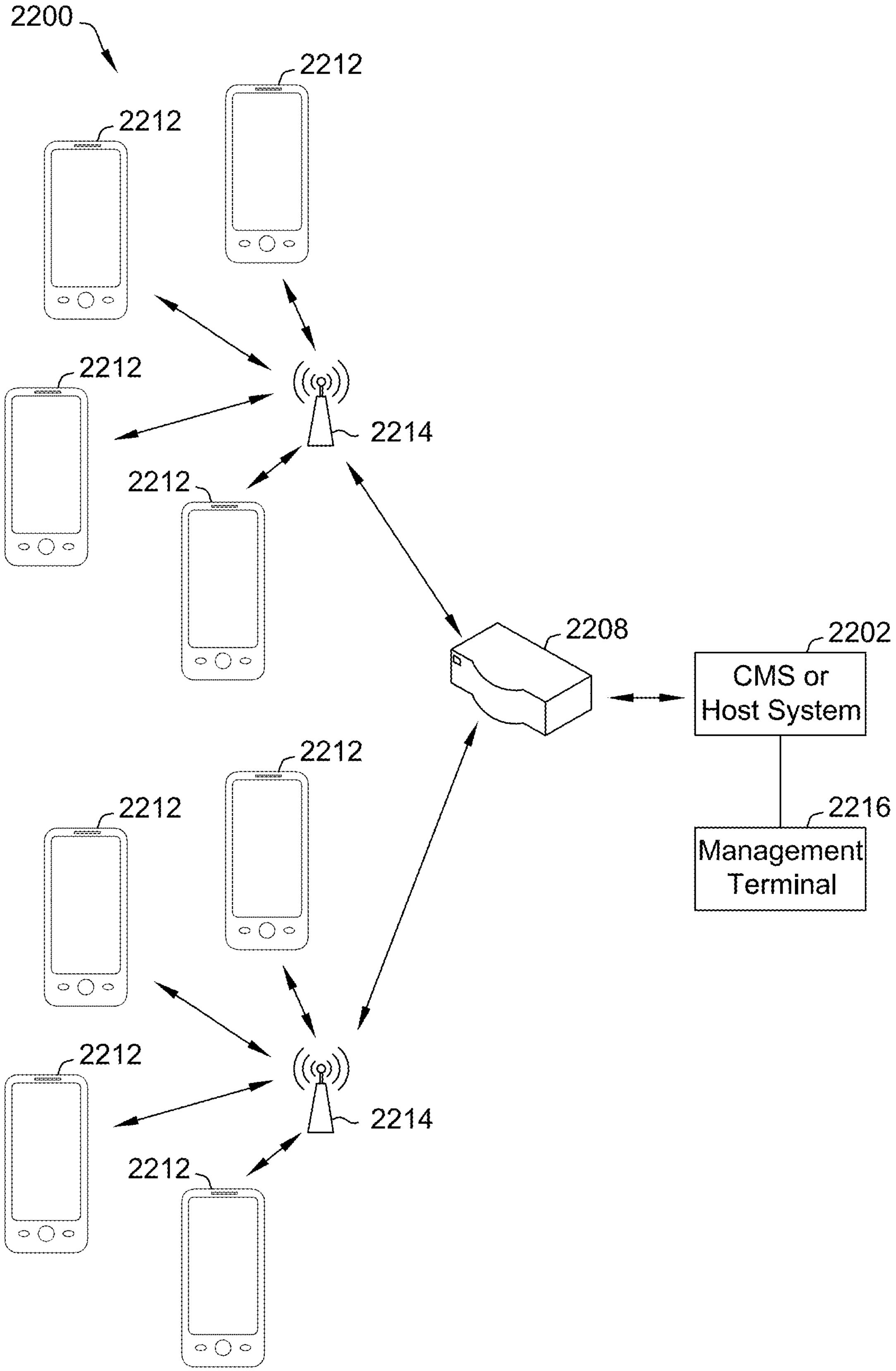
FIG. 22C depicts employee mobile device components of the device management platform shown in FIGS. 22A and 22B.

FIGS. 22A, 22B, and 22C illustrate a device management platform 2200 according to an example embodiment. As described in further detail below, the EGMs and gaming environment shown in FIGS. 1 and 2A-2C may be part of or in communication with device management platform 2200.

As shown in FIG. 22A, a host system 2202 may be in communication with one or more EGMs 2204 (e.g., slot games, table games, and/or other electronic gaming devices) and connected devices 2206 (e.g., kiosks, signage, gaming tables, and/or gaming or point of sale terminals) via a wireless access point 2208 (e.g., a Wi-Fi access point). Components of the system, such as EGMs 2204 (similar to EGMs 104 (see FIG. 1), gaming devices 200 (see FIG. 2), EGM/Ts 406 (see FIG. 4), EGMs 1120 (see FIG. 11), and gaming tables 1122 (see FIG. 11)) and connected devices 2206, may further be in communication with each other via a wireless mesh network, such as mesh network 1206 (see FIG. 12). As shown in FIG. 22B, device management platform 2200 may further include a plurality of player mobile devices 2210 (similar to mobile game devices 408 (see FIG. 4) and mobile devices 1110 (see FIG. 11)), which may be configured for wireless communication with host system 2202 via wireless access point 2208. Similarly, as shown in FIG. 22C, a device management platform 2200 may further include a plurality of employee mobile devices 2212, which may be configured for wireless communication with host system 2202 via wireless access point 2208. Player mobile devices 2210 and employee mobile devices 2212 may include, for example, smart phones, tablets, wearable smart devices, cards, or other wireless-capable devices that may be carried by patrons or employees of the casino, respectively. Player mobile devices 2210 and employee mobile devices 2212 may further be configured to wirelessly communicate directly with EGMs 2204 and connected devices 2206, for example, using Bluetooth, Radio Frequency Identification, Near-Field Communication, Ultra Wide Band, time of flight, etc.

In the example embodiment, device management platform 2200 includes multiple wireless indoor positioning transmitters 2214, which may be similar to gateways 1416 (see FIG. 14). Transmitters 2214 may be installed within the venue and arranged throughout the venue such as to allow adequate positioning coverage (e.g., trilateration or multilateration) to EGMs 2204, connected devices 2206, player mobile devices 2210 and/or employee mobile devices 2212 in all areas where such devices are expected to move and/or be positioned. For example, in some embodiments, such devices use distance signals from at least three transmitters 2214 to triangulate a position estimate of the device.

In an implementation, device management platform 2200 further includes a management terminal 2216, in communication with the host system 2202. The management terminal 2216 may be a stationary device, e.g., located in a venue back-office, located behind a bar, or a kiosk located on the venue floor, or may be a mobile device, e.g., a tablet computer, laptop, smart phone, etc. In some embodiments, management terminal 2216 may be implemented as an application executing on one or more employee mobile devices 2212. The management terminal 2216 is configured for an operator (e.g., administrator, technician, service staff) to perform various administrative functionality for the various devices of device management platform 2200. In an example, management terminal 2216 is configured to allow the operator to, using an input device operatively connected to management terminal 2216 such as, for example, a mouse or touchscreen, select, for example, an EGM 2204 and/or connected device 2206, and view detailed information pertaining to the selected device, e.g., via a pop-up window appearing on the terminal display. In the example embodiment, the management terminal 2216 provides a GUI through which the operator administers device management platform 2200 and its component devices.

Figure 23:
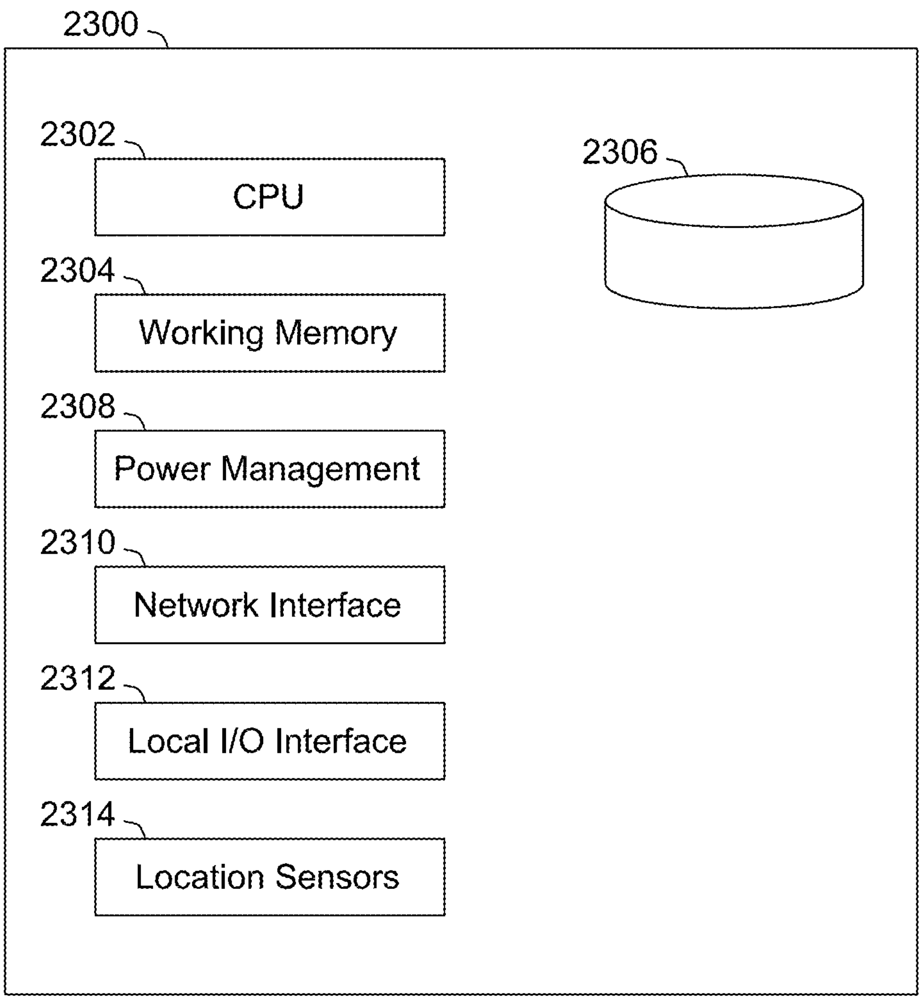
FIG. 23 depicts an example modular device according to some aspects of the present disclosure.

FIG. 23 illustrates a modular device 2300 that may be part of device management platform 2200 shown in FIGS. 22A, 22B, and 22C. Modular device 2300 may be similar to and/or uSMIB s 404 (see FIG. 4), environmental sensors 1414 (see FIG. 14), and eSMIB s 1500 (see FIG. 15). Specifically, modular device 2300 may be coupled to or integrated with EGMs 2204 and connected devices 2206, and enables EGMs 2204 and connected devices 2206 to be communicated with and be controlled via the centralized and mesh wireless networks previously described. Modular device 2300 may be integrated into a newly manufactured EGMs 2204 and/or connected device 2206, and/or may be retrofitted into an existing EGMs 2204 and/or connected device 2206. In some embodiments, modular device 2300 may convert data received from associated EGMs 2204 and/or connected device 2206 for transmitting via device management platform 2200 using a standardized and/or proprietary protocol, enabling EGMs 2204 and/or connected devices 2206 to communicate even when certain individual devices may not be compatible for direct communication with one another.

Each modular device 2300 includes one or more CPUs 2302 that use working memory 2304 (e.g., random access memory or the like) and non-volatile storage 2306 (e.g., solid state drive, disk drive, or the like) to execute an operating system and various software systems for controlling operation of modular device 2300 and the various components. The CPUs 2302 may be connected to any or all of the components in modular device 2300 (e.g., via internal data busses, networks, or wireless channels, not shown) such as to allow control and communication with the components as described herein. In some embodiments, CPUs 2302 may include one or more dedicated processing CPUs such as, for example, one or more graphics processing units (GPUs), each of which may include additional dedicated memory. Each modular device 2300 may further include a power management system 2308 that is configured to provide electrical power to any or all of the components of the modular device 2300.

In the example embodiment, each modular device 2300 also includes one or more network interface devices 2310 that enable wireless communication between modular device 2300 and various wireless networks described herein (e.g., the centralized wireless network and/or the wireless mesh network). For example, modular device 2300 may include a Wi-Fi network interface that allows wireless connection to one or more Wi-Fi access points installed at the operations venue, and a wireless mesh network interface that allows wireless connection to other nearby modular devices 2300 within the operations venue. Such wireless network access provides network connectivity to the host system 2202 and may provide network connectivity to other infrastructure servers and networks, to other modular devices 2300, to player mobile devices 2210 and/or employee mobile devices 2212, and/or to the Internet. In some embodiments, network interface devices 2310 may include NFC beacons (active or passive), UWB-based interfaces, Bluetooth beacons, or other wireless network devices that allow proximity connection to nearby devices (e.g., other modular devices 2300, player mobile devices 2210 and/or employee mobile devices 2212). Such proximity connections may allow modular device 2300, and any EGM 2204 and/or connected device 2206 coupled thereto, to wirelessly communicate with nearby gaming devices 200, kiosks 260, personal devices 256 or EUDs 264. In some embodiments, network interface devices 2310 may include cellular network interfaces (e.g., for connectivity to 3G/4G/5G cellular networks).

In the example embodiment, each modular device 2300 further includes a local I/O interface 2312, through which modular device 2300 may communicate with the EGM 2204 and/or connected device 2206 in which modular device 2300 is installed and/or connected. To the extent that EGMs 2204 and/or connected devices 2206 may include various I/O components such as, for example, display devices, audio output device (e.g., speakers), audio input devices (e.g., microphones), biometric scanners (e.g., fingerprint or hand-print readers, retinal scanners, and/or thermal detectors), camera devices, card readers and/or ticket readers, RFID and/or NFC receivers for receiving contactless payment, card and/or ticket printers, lighting systems, and/or other peripheral devices, any of which, in some embodiments, may be integrated into modular device 2300.

In some embodiments, each modular device 2300 further includes one or more location sensors 2314 that are used to acquire sensor-based location information and perform sensor-based position determination of modular device 2300 and its associated EGM 2204 and/or connected device 2206 within the operations venue. For example, modular device 2300 may perform trilateration or multilateration of wireless signals (e.g., Bluetooth, Wi-fi) to enable the host system 2202 or the modular device 2300 itself to determine a location of the device within the operations venue (e.g., global positioning system ("GPS") or various indoor positioning systems). The modular device 2300, in some embodiments, may include a receiver that is configured to receive signals from multiple transmitters placed in fixed indoor locations throughout the operations venue, using time of arrival ("ToA") of the signals from the various transmitters to determine location of the modular device 2300 (e.g., based on propagation time). In another embodiment, the modular device 2300 uses ultra-wideband ("UWB") indoor positioning to determine the position of modular device 2300. The operations venue may be configured with multiple reference points that similarly use ToA, angle of arrival ("AoA"), time difference of arrival ("TDoA"), received signal strength ("RSS"), or a hybrid of such approaches to compute position estimations between the transmitters and receivers. In some embodiments, the operations venue may be configured with ultrasonic audio transmitters or receivers that can be used in conjunction with complementary ultrasonic receivers or transmitters on modular device 2300 for location determination. In some embodiments, various outputs from EGMs 2204 and/or connected devices 2206 (e.g., a camera device and/or a microphone) connected to modular device 2300 may be used for position determination. In some embodiments, modular device 2300 may use location sensors 414 for landmark detection (e.g., identifying pre-defined landmarks statically positioned within the operational venue and having known positions and, by proxy, thus providing positioning information about modular device 2300). In example embodiments, the modular device 2300 uses multiple types of position sensors concurrently. Use of multiple different types of position sensors may provide technical benefits such as redundancy, more refined positioning, and such.

In an example embodiment, modular device 2300 is configured to, upon initial power-up, collect "device profile" configuration data from connected devices (e.g., an EGM 2204 and/or connected device 2206 connected to modular device 2300) and push the device profile configuration data to the host system for evaluation and authorization. Modular device 2300 may automatically detect nearby devices, search for the mesh network, link to host system 2202, detect system and profile configuration from a connected EGM 2204 and/or connected device 2206, and calibrate and scale. Modular device 2300 may use a combination of the data it receives through its connections (e.g., from an EGM 2204 and/or connected device 2206 associated with modular device 2300) and physical proximity (e.g., a location of modular device 2300 and detected nearby devices and/or features of the venue) to create a profile of the device's purpose. The profile can be used as a type of device identifier or digital "fingerprint." Host system 2202 and/or modular device 2300 may apply an algorithm to the digital "fingerprint" to identify changes to device configuration that are used to raise awareness to system users (e.g., via a GUI of management terminal 2216) to support review and approval of changes to device location or other configuration data. AI and/or machine learning techniques may be used by host system 2202 and/or modular device 2300 to propose alternative uses or purposes of a device based on its configuration (e.g., location, type of device, software installed on the device), for example, to an operator via management terminal 2216, enabling the operator to select from purposes detected and proposed by the system via the AI/ML function. The operator may review, approve, and alter the device configuration via management terminal 2216 to ensure it suits the operator's intended purpose. An electronic approval indicator generated by management terminal 2216 in response to such a selection may be transmitted to modular device 2300, and modular device 2300 may confirm the role and/or profile based on the indicator.

Examples of functions that may be performed by the operator via device management platform 2200 using modular devices 2300 include performing end-to-end configuration of an EGM slot machine interface board (SMIB), including coin-testing, with the goal of bringing a game into online/operational state (includes EGM verification) with minimal user input, updating and manage Firmware versions on the devices, displaying summary information about EGMs 2204 in the network (e.g., floor visualization in terms of games online/offline, on floor heat map, player sessions, and/or hot players), controlling content that runs on a device, assigning location to a device (e.g., site, section, area, bank, and/or machine number/slot mast), and/or managing templates that represent a set of configuration data associated with an EGM 2204, including subgames, pay tables and other configuration data. These templates can subsequently be used in the EGM provisioning process and applied to cabinets as needed.

Further examples of functions that may be performed by the operator via device management platform 2200 using modular devices 2300 include viewing and modifying a game group definition (e.g., a static list of EGM cabinets or a dynamic filter that is applied to cabinets or subgames), generating alerts (SMS, email, etc.) when certain conditions are detected (e.g., a work ticket being opened (service request), door open/door close), creating service requests when certain conditions are detected on the devices and that include details about the request, location, and time, manually and/or automatically directing nearby available employees to service a specific task, recording service performed for an EGM 2204 to correct a problem including tracking service times are tracked and reporting the service times for operation efficiency, remote shutdown of EGMs 2204 and/or connected devices 2206 in case of a power surge or power outage, and/or performing continuous health checks and monitoring. For example, displaying a map of the floor that highlights EGMs 2204 and/or connected devices 2206 that need service. The map may be reduced by the operator to show only a specific portion of the overall map ("service area"). Highlighted games may be filtered using either predefined filters such as service types required (i.e., "games that need paper", "games not yet online", "games with pending configuration changes") or user-defined filters.

Further examples of functions that may be performed by the operator via device management platform 2200 using modular devices 2300 include determining load and/or utilization of EGMs 2204 and/or connected devices 2206, error reporting, uploading a list of game definitions provided by an operator in advance of system migration, security checks (e.g., scanning software for any vulnerabilities), remote verification of software remote verification of the software (e.g., with SHA 1 method), self-updating of devices, etc.

By enabling communication via device management platform 2200, in some embodiments, modular devices 2300 may enhance operation of EGMs 2204 by enabling real time updates by sending and receive real time updates and/or events from host system 2202 and displaying session balances, notifications and various countdowns shown to the player during a live session using real time values calculated by host system 2202. Modular devices 2300 may further enable sending of real-time messages to players, generating user specific user interfaces based on player characteristics (e.g., tier, player preferences), streaming content, social media sharing, and/or support for multiple languages.

Figure 24:
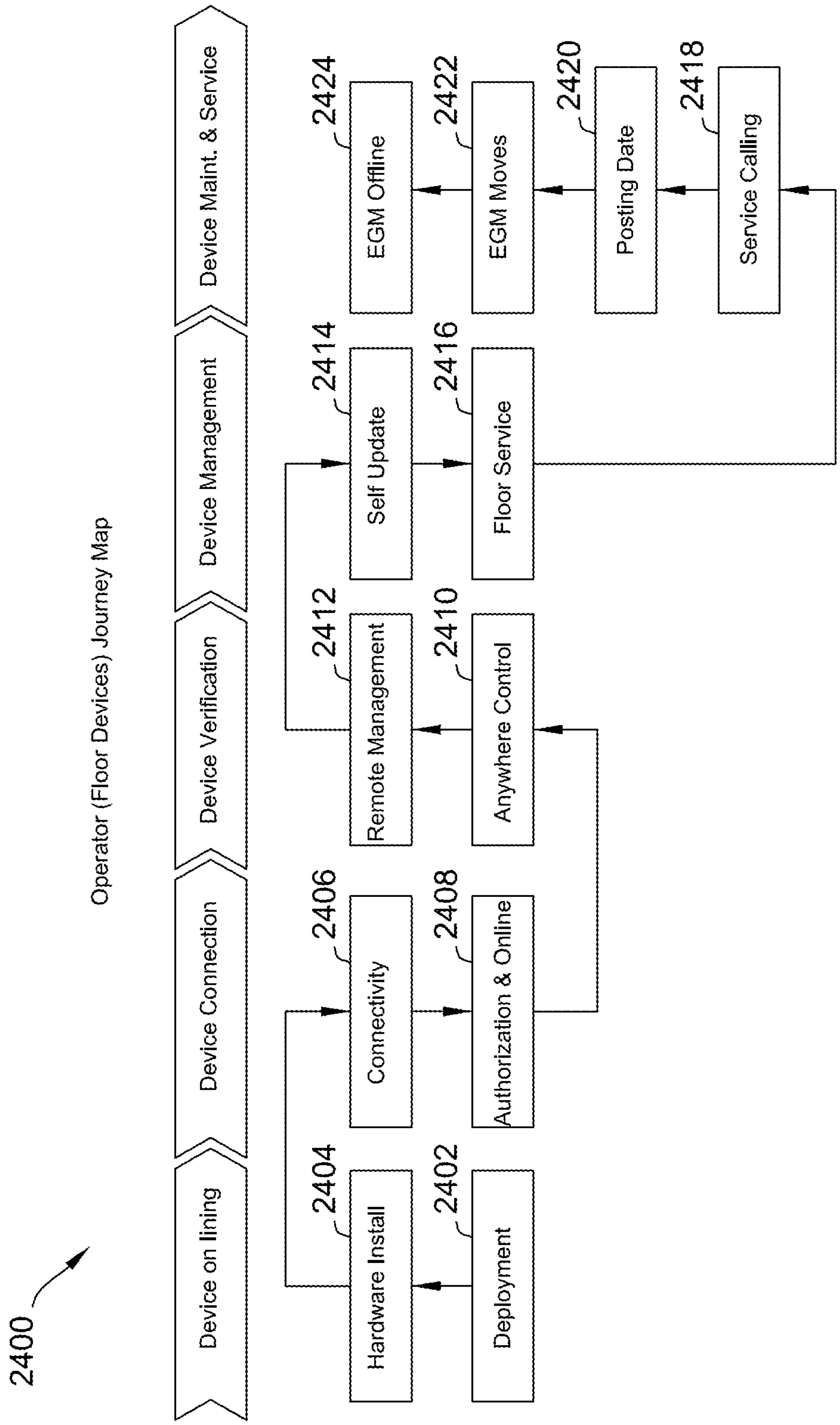
FIG. 24 depicts flow map illustrating example functionality of the device management platform according to some aspects of the present disclosure.

FIG. 24 is a flow diagram illustrating a process 2400 for setting up and operating modular devices 2300 according to an example embodiment. Process 2400 may include selecting 2402 a specific type of modular device 2300. This selection may be based on, for example, jurisdictional requirements, market requirements, and/or desired operating capabilities.

Process 2400 may further include hardware installation 2404 of modular device 2300. During installation, modular device 2300 may be communicatively coupled to an EGM 2204 and/or connected device 2206. In examples wherein modular device 2300 is coupled to an EGM 2204, modular device may be installed within the EGM cabinet of EGM 2204.

Process 2400 further includes connecting 2406 modular device 2300 to other devices within device management platform 2200 via a network, such as by forming a Wi-Fi connection with host system 2202 via wireless access point 2208, forming wireless connections with other modular devices 2300 via a wireless mesh network, and/or forming wireless connections with player mobile devices 2210 and/or employee mobile devices 2212 via the Wi-Fi network or directly (e.g., via Bluetooth or other sensors). In some embodiments, modular devices identify a Wi-Fi network to connect based on date received from nearby modular devices 2300 and/or from employee mobile devices 2212, for example, via the wireless mesh network and/or direct wireless communication, and may obtain credentials for connecting to the Wi-Fi network from the nearby modular devices 2300 and/or from employee mobile devices 2212.

Process 2400 may further includes configuring 2408 modular device 2300. For example, as described above, modular device 2300 may determine a profile or fingerprint based on, for example, location data, configuration data obtained from the associated EGM 2204 and/or connected device 2206, and/or data obtained from nearby modular devices 2300 and/or employee mobile devices 2212. An operator may review, approve, or make changes to the determined profile or fingerprint, for example, using management terminal 2216. Configuring 2408 modular device 2300 will be discussed in more detail below with respect to FIGS. 26-28.

Process 2400 may further include remotely controlling 2410 and managing 2412 modular device 2300. For example, an operator (e.g., using management terminal 2216) may remotely access real-time data logs corresponding to the EGM 2204 and/or connected device 2206 associated with modular device 2300, perform integrity checks, soft power off the EGM 2204 and/or connected device 2206, remotely monitor and/or test and EGM 2204 associated with modular device 2300 and/or perform any of the other management functions described above with respect to modular device 2300.

Process 2400 further includes self-updating 2414 modular devices 2300 and/or EGMs 2204 and/or connected devices 2206 connected thereto. The updates may occur in response to, for example, predefined events and/or according to a time schedule.

Process 2400 further includes determining 2416 a location of players and/or other patrons of the venue. For example, as described above, modular devices may utilize 3D triangulation using the wireless mesh network, Bluetooth, Wi-Fi, or UWB locating techniques to precisely determine the location of nearby player mobile devices 2210. In one example, the wireless mesh network may use location information from three or more devices (e.g., EGMs 2204, connected devices 2206, and/or other devices) to triangulate and/or calculate a position estimate of the device. Three of such devices are a minimum to accurately compute a location, but more devices could be utilized to further improve accuracy. As described in further detail below with respect to FIG. 25, determining the location of players and/or other patrons of the venue may be used to enhance a customer experience for players and/or other patrons by tailoring operation of nearby EGMs 2204 and/or connected devices 2206 to the individual players, and may also provide operators of the venue data relating to the habits and preferences of customers. Determining location of the players and/or patrons may also be used for other purposes such as for deploying gaming resources in a more efficient manner, reconfiguring device or asset location, and other purposes described herein. In some embodiments, different operating modes, services, and/or functionalities may utilize different location technology. Accordingly, a particular EGM 2204 and/or connected device 2206 may be equipped with multiple different location technologies.

Process 2400 may further include performing 2418 service calls. For example, if an error or other need for service is detected in an EGM 2204, connected device 2206, and/or modular device 2300, a nearby service employee may be identified by device management platform 2200 (e.g., using host system 2202 and/or modular device 2300), and the nearby service employee may be alerted (e.g., via an employee mobile device 2212). The device management platform 2200 may further determine when the service has been completed and track other data, such as time to service completion.

Process 2400 may further include posting 2420 data. For example, host system 2202 may compile revenue and/or financial data based on data received from modular devices 2300 of device management platform 2200.

Process 2400 further include detecting 2422 and responding to moving of EGMs 2204. For example, as described above, modular device 2300 may determine a new location of the EGM 2204, update the role and/or profile of the EGM 2204 accordingly, and report the moving to management (e.g., via management terminal 2216). Detecting 2422 and responding to moving of EGMs 2204 will be discussed in more detail below with respect to FIG. 28.

Process 2400 may further include using 2424 modular devices 2300 to perform operations when an EGM 2204 is offline, such as device repurposing or factory resets. In some embodiments, modular devices 2300 may remain active and/or wirelessly connected to device management platform 2200 when an associated EGM 2204 and/or connected device 2206 is offline.

Figure 25:
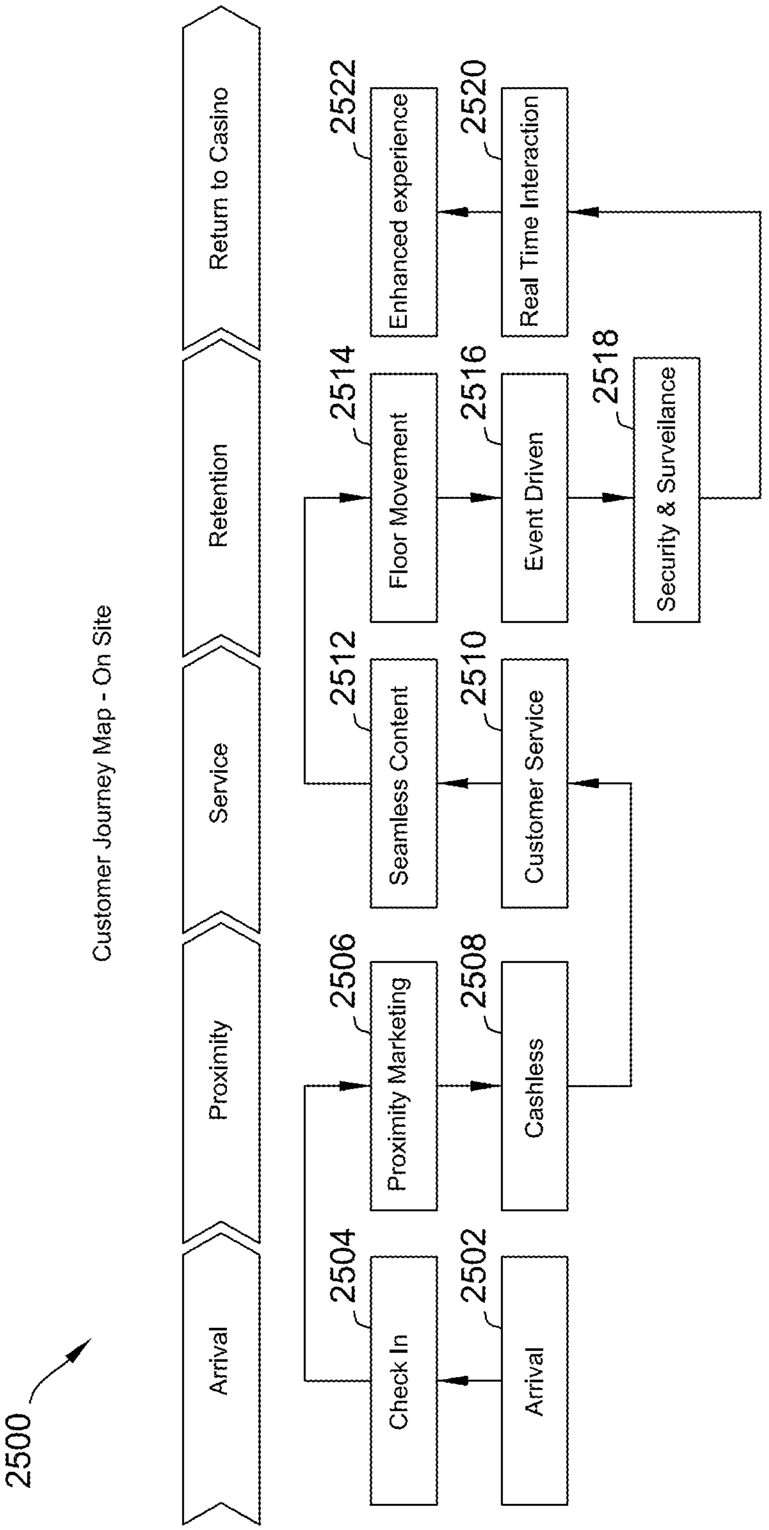
FIG. 25 depicts another flow map illustrating additional example functionality of the device management platform according to some aspects of the present disclosure.

FIG. 25 is a flow diagram illustrating a process 2500 for tracking and interacting with customers using device management platform 2200 according to an example embodiment. Process 2500 may include determining 2502 that guests (e.g., customers, players, and/or other patrons) have arrived at the venue. This determination may be made by identifying a location of a player mobile device 2210 associated with the guest corresponds to a location of the premises and/or detecting the player mobile device 2210 on the premises using, for example, 3D triangulation using the wireless mesh network, Wi-Fi, Bluetooth, and/or UWB location detection functionality of modular devices 2300. Process 2500 may further include determining 2504 that a guest has "checked-in" to the venue, for example, by checking into a hotel room or performing other actions (e.g., an in-app check-in with player mobile device 2210 or utilizing a card in association with venue services) that indicate that the guest is now present in the venue. In some embodiments, if the guest has booked and/or checked into a hotel room, and/or used a transportation service associated with the venue (e.g., shuttle service, ticketed self, or valet parking), device management platform 2200 may retrieve data associated with these services to determine that guests have arrived.

Process 2500 further includes proximity marketing 2506. For example, device management platform 2200 may utilize geofencing, or determining the patron's location with respect to a floor map, to provide targeted marketing or information to the user. For example, the patron may be provided static or interactive advertisements and/or coupons through nearby EGMs 2204 and/or connected devices 2206, and/or messages sent to player mobile device 2210 (e.g., emails, text messages, and/or in-app messages). For example, if a certain patron ("John Doe") is playing at an EGM 2204 located near a buffet, the EGM 2204 may display a personalized advertisement for the buffet (e.g., "Hello John Doe, we think you may like to try the Buffet. Please check your messages for a coupon!"), and the patron may receive the coupon on player mobile device 2210 via the app. Such a coupon may be tailored to the patron's interests. In the above example, the coupon may include a discount for the buffet or an offer of free play credits for EGM 2204 if the buffet is purchased.

Process 2500 may further include providing 2508 cashless functionalities via player mobile device 2210 using player tracking. For example, when performing cashless transactions, a patron's identity may be verified based on the tracked location of the patron's player mobile device 2210. For example, during a transaction, the patron attempting to complete the transaction may be identified by device management platform 2200 based on their location, and the patron may be prompted through the app to complete the transaction.

Process 2500 may further include providing 2510 customer service functionality using player tracking. For example, using player mobile device 2210, a patron may be able to request assistance, and nearby employees may be notified via employee mobile devices 2212. Device management platform 2200 may further provide customer information through player mobile device 2210. For example, device management platform 2200 may use player tracking to identify crowds and/or estimate wait times, and provide this information via the app. Process 2500 may further include providing 2512 seamless content to a patron. For example, the location of the player may be used to provide seamless and uniform campaigns at devices with which the patron interacts (e.g., EGMs 2204, connected devices 2206, and/or player mobile device 2210), and to perform campaign analytics to develop future campaigns based on click tracking, and/or other data obtained from patrons. Analysis 2516 of floor movement by patrons may be further used, for example, to develop campaigns and/or otherwise guide operation of the venue. Such data may be further used to provide 2518 security and surveillance based on analysis of location and movement of individuals on the premises. Process 2500 may further include real time interaction 2520 and campaigns 2522 after the patron has left the venue. Such campaigns may be selected in part based on location information obtained from the patron during the patron's visit.

In some embodiments, other functionality provided to patrons by device management platform 2200 using location tracking of player mobile devices 2210 in connection with player profiles include: automatic parking access; valet services dynamic outdoor signage (e.g., signage to indicate new games, hot products, new promotions, progressive wins, shows, and/or events); dynamic directional signage; resort information; directional navigation; touch-free hotel check-in and/or check-out; hotel area access; baggage services; promotions; obtaining feedback and/or reviews; very important person (VIP) entry and management; alerts to welcome staff of player arrival; analytics (e.g., campaign effectiveness analytics, click tracking, behavioral tracking, location tracking); marketing sign-ups; cross-selling services (e.g., media and messaging through in-room entertainment and/or hotel room entertainment integration to casino floor promotions); wallet and/or cash availability at tables; service access (e.g., food and drinks); drawings; social media integration; ticket bookings; sports events (e.g., live stream, sports betting, and/or bonusing on sporting events); proximity marketing; and/or viewing menus and/or wait times for restaurants.

Figure 26:
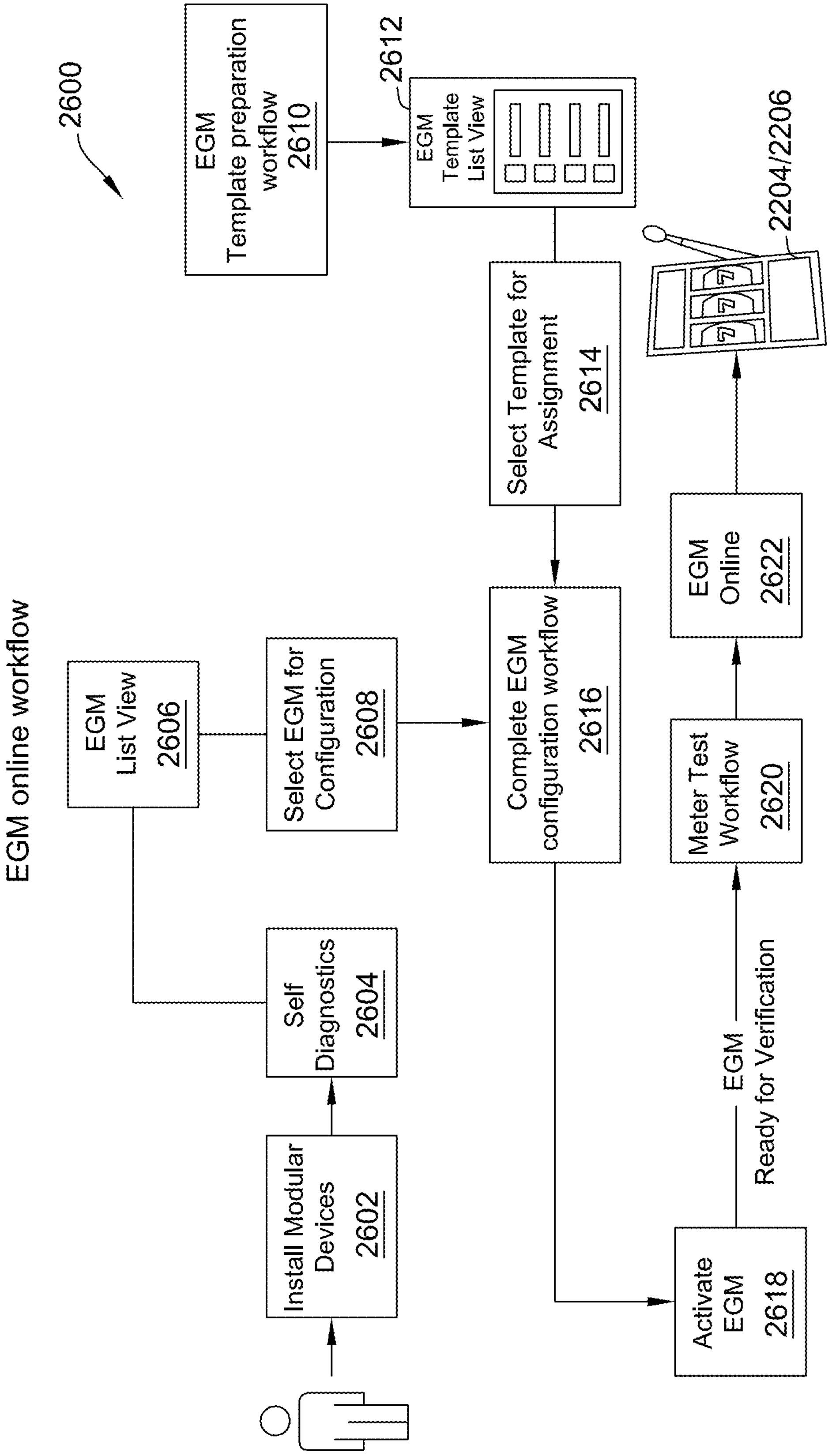
FIG. 26 depicts a flow diagram illustrating an on-lining process for electronic game machines and/or connected devices using the device management platform of FIGS. 22A, 22B, and 22C according to an example embodiment.

FIG. 26 depicts a flow diagram illustrating an on-lining process 2600 for EGMs 2204 and/or connected devices 2206 using device management platform 2200 according to an example embodiment. In this embodiment, on-lining process 2600 includes installing 2602 modular device 2300 in EGM 2204/connected device 2206. For example, modular device 2300 may be installed on the gaming floor, in a workshop, or prior to delivery of EGM 2204 or connected device 2206. On-lining process 2600 continues in this embodiment by performing, by modular device 2300, a self-diagnostic process 2604. This will be discussed in more detail below with respect to FIG. 27. On-lining process 2600 continues in this embodiment by generating 2606 an EGM list view. The EGM list view is automatically updated to display modular devices 2300 that are awaiting final configuration (e.g., modular devices 2300 that have been discovered by device management platform 2200 but may not yet have been configured). For example, the EGM list view may be displayed on management terminal 2216 and/or employee mobile device 2212, which allows the technician to select EGM 2204/connected device 2206 for configuration. Utilizing the EGM list view, the technician selects 2608 EGMs 2204 and/or connected devices 2206 for configuration. On-lining process 2600 continues in this embodiment by performing an EGM template preparation process 2610, which may be similar to a checklist. For example, different machines in different locations maybe configured differently. On-lining process 2600 continues in this embodiment by displaying 2612 an EGM template list view, which allows the technician to select 2614 an EGM template for EGM 2204/connected device 2206. Selecting an EGM template and EGM 2204/connected device 2206 for configuration completes 2616 an EGM configuration process.

Once the EGM configuration process is completed, EGM 2204/connected device 2206 is ready for activation. On-lining process 2600 continues in this embodiment by activating 2618 EGM 2204/connected device 2206. For example, EGM 2204/connected device 2206 may be assigned a poller IP (floor service) and/or a slot machine ID. Once activated, EGM 2204/connected device 2206 should indicate in the EGM list view that its status is online. However, EGM 2204/connected device 2206 may remain unplayable until verified or verification is bypassed. Once activated, the initial meters for EGM 2204/connected device 2206 may be captured. Once activated, EGM 2204/connected device 2206 is ready for verification. While verifying EGM 2204/connected device 2206 depends on the jurisdiction and the technician, on-lining process 2600 continues in this embodiment by performing a meter test process 2620. This will be discussed in more detail below with respect to FIG. 28. Once meter test process 2620 is complete, then on-lining process 2600 continues and EGM 2204/connected device 2206 is online 2622 and ready for customer play.

Figure 27:
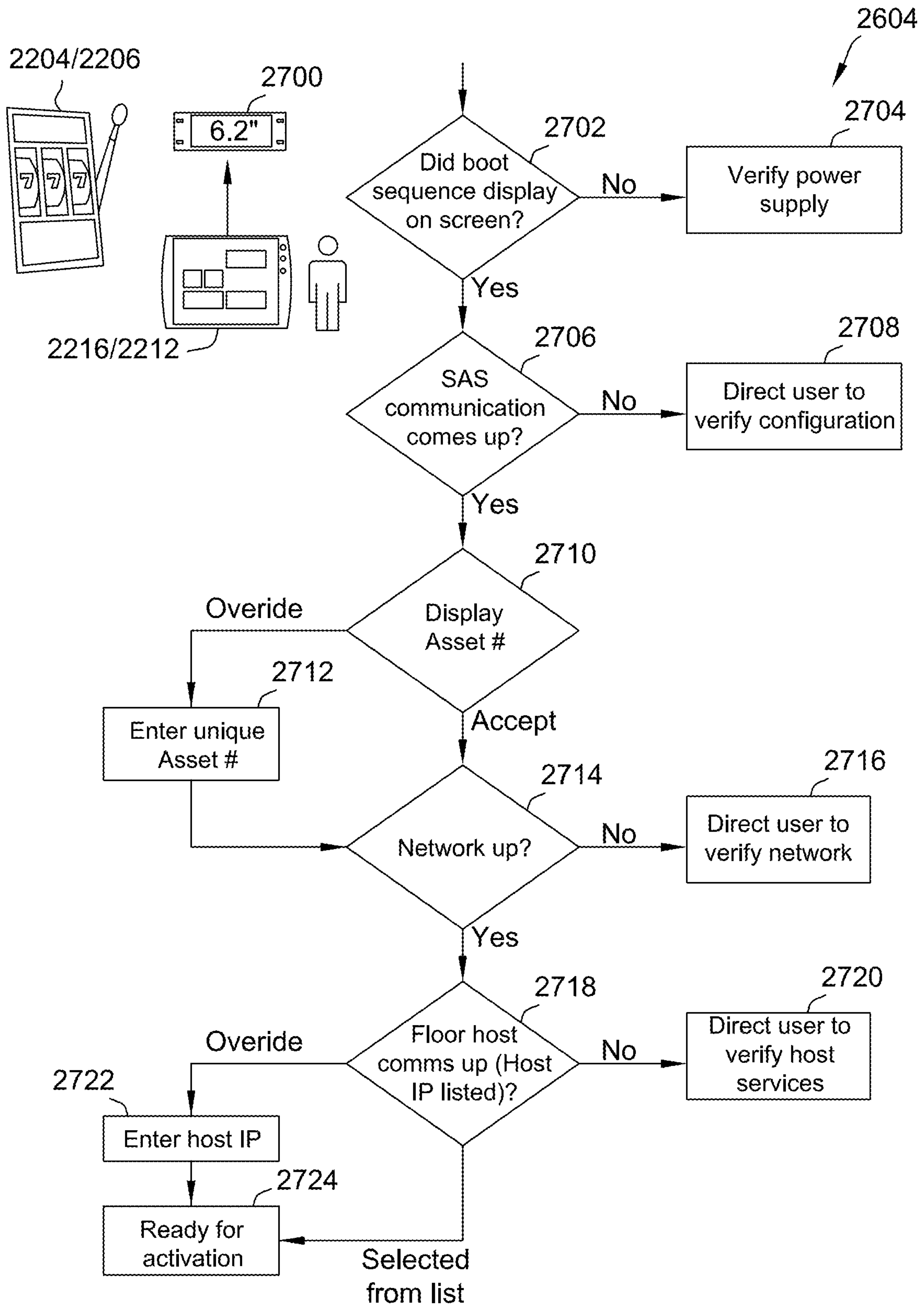
FIG. 27 depicts a flow diagram illustrating a self-diagnostic process for modular devices of the device management platform of FIGS. 22A, 22B, and 22C according to an example embodiment.

FIG. 27 depicts a flow diagram illustrating self-diagnostic process 2604 for modular devices 2300 of device management platform 2200 according to an example embodiment. In some embodiments, a technician may utilize management terminal 2216 and/or employee mobile device 2212 to interact with device management platform 2200 in order to implement self-diagnostic process 2604. In other embodiments, the technician may interact with a display device 2700 of modular devices 2300 associated with EGMs 2204/connected devices 2206 currently being tested via self-diagnostic process 2604. Self-diagnostic process 2604 begins in this embodiment by determining 2702 if a boot sequence is displayed on management terminal 2216 and/or employee mobile device 2212 and/or display device 2700. If no boot sequence is displayed, self-diagnostic process 2604 continues in this embodiment by verifying that power is being supplied to EGM 2204/connected device 2206. If the boot sequence is being displayed, self-diagnostic process 2604 continues by determining if the SAS communication for EGM 2204/connected device 2206 is up. If the SAS communication is not up, then self-diagnostic process 2604 continues by informing 2708 the technician to verify that communication cables for EGM 2204/connected device 2206 are correct, and/or that the configuration of EGM 2204/connected device 2206 is correct. If the SAS communication is up, then self-diagnostic process 2604 continues in this embodiment by determining 2710 if an asset number is being displayed. The technician may override the displayed asset number and enter 2712 a unique asset number or the technician may accept the displayed asset number.

Self-diagnostic process 2604 continues in this embodiment by determining 2714 if the network is up. If the network is not up, then self-diagnostic process 2604 directs 2716 the technician to verify the network connection for EGM 2204/connected device 2206, and/or verify various network settings, including but not limited to, the correct operation of dynamic host configuration protocol (DHCP) servers on the network, the correct operation of domain name system (DNS) servers on the network, whether network time protocol (NTP) servers are reachable, etc. If the network is up, then self-diagnostic process 2604 determines 2718 if the floor host communication is up (e.g., the host IP(s) are listed). If the floor host communications are not up, then directs 2720 the technician to verify the host services provided by the network. If the host communications are up, then the technician may override the list of host IP(s) and enter 2722 a host IP manually. The technician may also select one or more of the host IPs from the list. In either case and in response thereto, EGM 2204/connected device 2206 is ready 2724 for activation.

Figure 28:
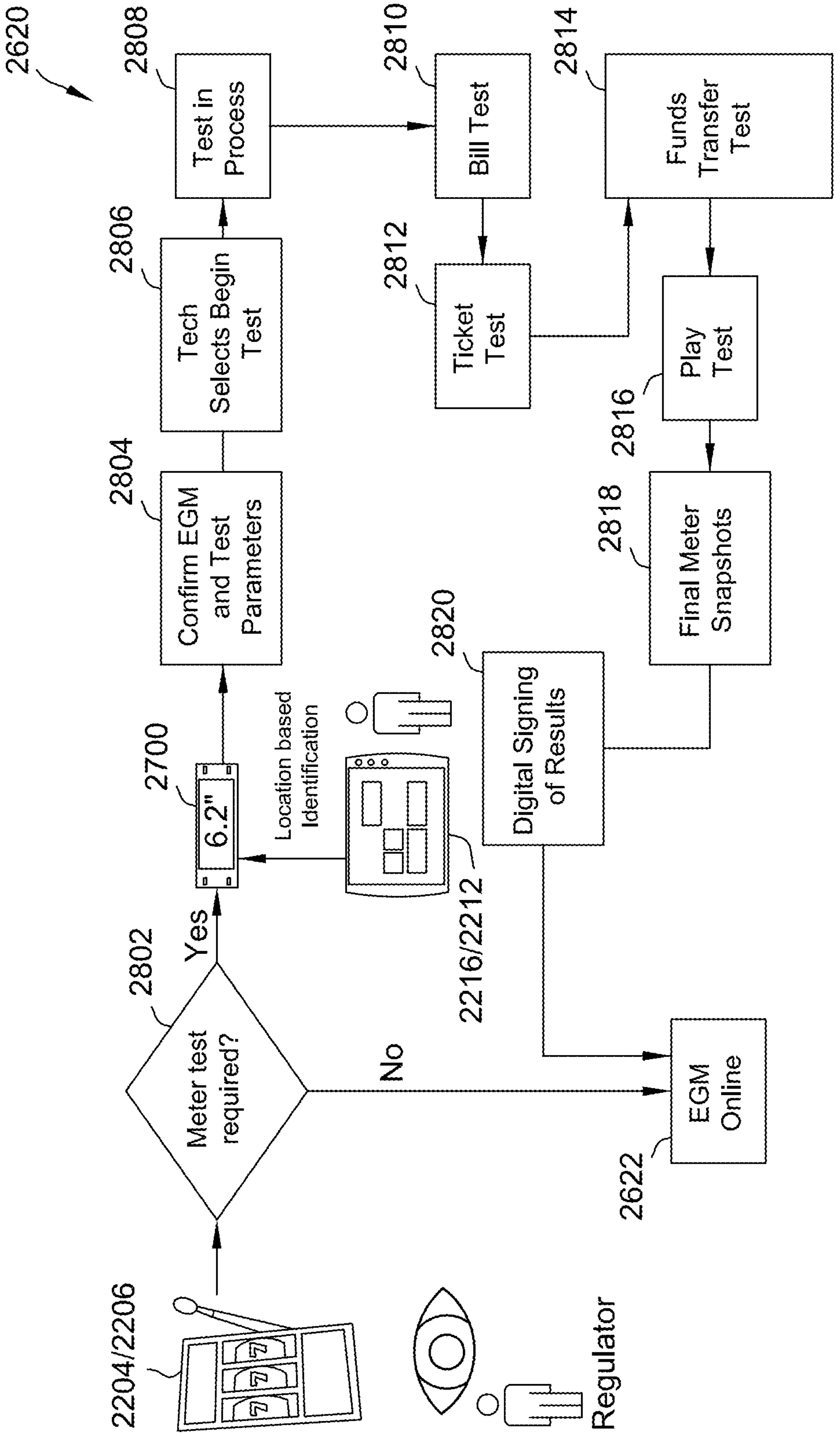
FIG. 28 depicts a flow diagram illustrating a meter test process for verifying electronic game machines and/or connected devices using the device management platform of FIGS. 22A, 22B, and 22C according to an example embodiment.

FIG. 28 depicts a flow diagram illustrating meter test process 2620 for verifying EGM 2204/connected device 2206 using device management platform 2200 according to an example embodiment. In some embodiments, a technician may utilize management terminal 2216 and/or employee mobile device 2212 to interact with device management platform 2200 in order to implement meter test process 2620. In other embodiments, the technician may interact with display devices 2700 of modular devices 2300 associated with EGMs 2204/connected devices 2206 currently tested via meter test process 2620. Meter test process 2620 begins in this embodiment by determining 2802 if a meter test is needed. If a meter test is not needed, then meter test process 2620 continues and EGM 2204/connected device 2206 is online 2622 and ready for customer play. If a meter test is needed, then meter test process 2620 continues by confirming 2804 EGM 2204/connected device 2206 and the test parameters for EGM 2204/connected device 2206. For example, device management platform 2200 presents EGM data to the technician, and the technician confirms that EGM 2204/connected device 2206 is correct. In another example, the technician confirms the test parameters for EGM 2204/connected device 2206, with at least some of the test parameters pre-selected based on the operator/jurisdictional verification requirements. The technician starts 2806 the test, and device management platform 2200 records the initial meters for EGM 2204/connected device 2206. Meter test process 2620 continues in this embodiment by performing 2808 the selected tests. For example, management terminal 2216 and/or employee mobile device 2212 and/or display device 2700 may display the current state of EGM 2204/connected device 2206, including the initial and/or current meters, to the technician. The technician may then begin testing the functions at EGM 2204/connected device 2206.

Meter test process 2620 continues in this embodiment by performing 2810 a bill test. For example, the technician inserts a bill at EGM 2204/connected device 2206 and verifies the bill meter via management terminal 2216 and/or employee mobile device 2212 and/or display device 2700. Meter test process 2620 continues in this embodiment by performing 2812 a ticket test. For example, the technician cashes out and verifies the amount on the ticket. In another example, the technician verifies the meters displayed by management terminal 2216 and/or employee mobile device 2212 and/or display device 2700 by inserting the ticket, verifying the meters, and cashing out again. Meter test process 2620 continues in this embodiment by performing 2814 a funds transfer test. For example, the technician inserts a test player card, views the player account information, and observes point, and/or promo balances at EGM 2204/connected device 2206 and verifies that this information matches the information presented by management terminal 2216 and/or employee mobile device 2212. The technician may, for example, transfer promo credits from the player account to EGM 2204/connected device 2206 and attempt a cash-out, which may fail if the promo credits do not permit a cash out.

Meter test process 2620 continues in this embodiment by performing 2816 a play test. For example, the technician may play a game at EGM 2204/connected device 2206 and observing meter changes displayed by EGM 2204/connected device 2206 and at management terminal 2216 and/or employee mobile device 2212 and/or display device 2700. Meter test process 2620 continues in this embodiment by performing 2818 final meter snapshots. For example, management terminal 2216 and/or employee mobile device 2212 and/or display device 2700 may prompt the technician for a picture meter screen generated by EGM 2204/connected device 2206, and device management platform 2200 combines the picture with screenshots of test meters displayed by management terminal 2216 and/or employee mobile device 2212 and/or display device 2700 to generate a final verification image.

Meter test process 2620 continues in this embodiment by digitally signing 2820 the results. The technician may, for example, verify the physical integrity of the housing for EGM 2204/connected device 2206, print and submit the results of meter test process 2620 for auditing purposes, etc. Meter test process 2620 continues in this embodiment and EGM 2204/connected device 2206 is online 2622 and ready for customer play.

Figure 29:
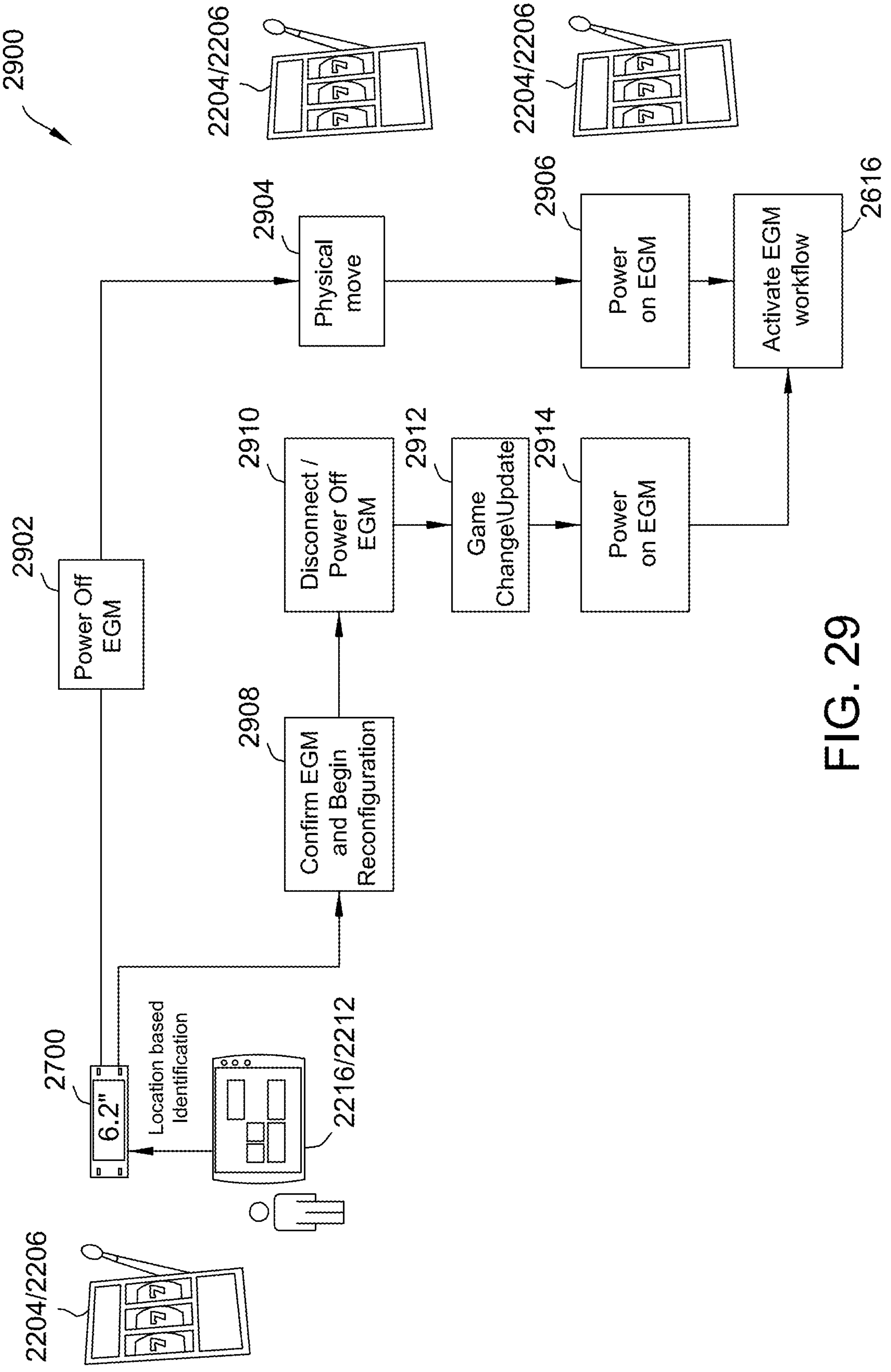
FIG. 29 depicts a flow diagram illustrating a move/reconfiguration process for electronic game machines and/or connected devices using the device management platform of FIGS. 22A, 22B, and 22C according to an example embodiment.

FIG. 29 depicts a flow diagram illustrating a move/reconfiguration process 2900 for EGMs 2204 and/or connected devices 2206 using device management platform 2200 according to an example embodiment. In some embodiments, a technician may utilize management terminal 2216 and/or employee mobile device 2212 to interact with device management platform 2200 in order to implement move/reconfiguration process 2900. In other embodiments, the technician may interact with display devices 2700 of modular devices 2300 associated with EGMs 2204/connected devices 2206 in order to implement move/reconfiguration process 2900. Move/reconfiguration process 2900 begins in this embodiment by powering off 2902 EGM 2204/connected device 2206, physically moving 2904 EGM 2204/connected device 2206, and powering on 2906 EGM 2204/connected device 2206. For example, the technician, in response to the move, may connect EGM 2204/connected device 2206 to the network (e.g., via a network cable or wireless interface), and power on EGM 2204/connected device 2206. Modular device 2300 of EGM 2204/connected device 2206 may perform an auto discovery process, which will be discuss in more detail below.

When reconfiguring EGM 2204/connected device 2206, move/reconfiguration process 2900 includes confirming 2908 EGM 2204/connected device 2206 for reconfiguration. For example, management terminal 2216 and/or employee mobile device 2212 and/or display device 2700 may present EGM data to the technician, who confirms that EGM 2204/connected device 2206 is correct (e.g., that an ID or serial number is correct). Move/reconfiguration process 2900 continues in this embodiment by disconnecting 2910 EGM 2204/connected device 2206 from network connections and powering off EGM 2204/connected device 2206. In the EGM list view, EGM 2204/connected device 2206 should be displayed as offline. Move/reconfiguration process 2900 continues in this embodiment by performing 2912 a game change/software or hardware update at EGM 2204/connected device 2206. Simple moves may include updating a location ID, while more complicated game changes may include re-onboarding EGM 2204/connected device 2206. Move/reconfiguration process 2900 continues in this embodiment by powering on 2914 EGM 2204/connected device 2206. For example, EGM 2204/connected device 2206 may begin an auto discovery process. EGM 2204/connected device 2206 should be visible in the EGM list view, and in addition, EGM 2204/connected device 2206 should display updated game information in the EGM list view based on game changes/updates performed on EGM 2204/connected device 2206.

In some embodiments, device management platform 2200 allows guests to utilize player mobile devices 2210 to interact with EGM 2204/connected device 2206. In one embodiment, device management platform 2200 provides automatic real-time updates to floor maps utilized by the guests. Device management platform 2200, in some embodiments, provides real-time or near real-time account updates. For example, Device management platform 2200 may provide player balance information and/or player rating information to the guests.

In addition, device management platform 2200 provides casino employees and/or casino operators with additional capabilities and/or benefits. Device management platform 2200, in various embodiments, reduces the cost and maintenance associated with EGMs 2204 and/or connected devices 2206 by automating device installation, device discovery, asset management, cash drop operations, etc. Device management platform 2200, in some embodiments, automatically maintains floor maps used by casino employees when managing and operating EGMs 2204 and/or connected devices 2206.

In some embodiments, device management platform 2200 provides automated authorization and on-lining capabilities to EGMs 2204 and/or connected devices 2206, as discussed previously with respect to on-lining process 2600 (see FIG. 26). In an embodiment, modular devices 2300 of EGMs 2204 and/or connected devices 2206 connect automatically to host system 2202 (see FIGS. 22A, 22B, 22C) upon powering up EGMs 2204 and/or connected devices 2206, and may in some embodiments, connect to a pre-defined network. Modular devices 2300, in some embodiments, auto-discovers its application (e.g., via fingerprinting, via its detected location, etc.), and becomes ready for the technician to review and activate if desired. Modular devices 2300, in some embodiments, are user-configurable via employee mobile devices 2212 and/or management terminal 2216 and/or display device 2700. Once connected, modular devices 2300 send out information to host system 2202, performing auto discovery and registration with host system 2202. For example, modular devices 2300 may detect the type of EGM 2204 and/or connected device 2206 they are connected to, and use a combination of data regarding its connected type of EGMs 2204 and/or connected devices 2206, along with its physical proximity to other EGMs 2204 and/or connected devices 2206 to create a profile regarding the purpose of modular devices 2300. The profile may be used as a device identifier or digital fingerprint. In some cases, a technician may assign a radio frequency ID tag to EGMs 2204 and/or connected devices 2206, and modular devices 2300 may utilize the RFID tags to generate a slot master ID for EGMs 2204 and/or connected devices 2206.

Some examples of the device profile data include, but are not limited to, device domain, device type (slot vs table vs media vs point of sale), hardware model details, manufacturer, electronic data storage space, uptime\downtime info IP address, asset type, operating system, installed software, install date version, processor usage, event logs, and/or network switch connected to modular device 2300. Other types of device profile data include, but are not limited to, other machines connected to the switch, hardware addresses, RFID information, platform type, firmware, spatial location (XYZ coordinates), status, etc.

In some embodiments, device management platform 2200 provides floor visualization abilities to casino operators. For example, device management platform 2200 may allow for the management of various EGMs 2204 and/or connected devices 2206 using various graphical user interfaces, including list views and floor map views in real-time or near real-time. Device management platform 2200 may display summary information regarding EGMs 2204 and/or connected devices 2206 in the network. For example, device management platform 2200 may provide visualization in terms of EGMs 2204 and/or connected devices 2206 that are online or offline, player sessions, etc., in various visual formats including heat maps. Device management platform 2200 may provide continuous and/or periodic health checks for EGMs 2204 and/or connected devices 2206 in a floor map and/or list format. In a floor map format, EGMs 2204 and/or connected devices 2206 that need service may be highlighted on the map or indicated on the map using other visual cues, which may be provided to technicians via their employee mobile devices 2212. The floor maps may be expanded via a zoom process to show a portion of the overall floor map, forming a service area for the technician. EGMs 2204 and/or connected devices 2206 marked for service may be filtered using predefined filters such as the type of service needed (e.g., EGMs 2204 and/or connected devices 2206 that need paper, EGMs 2204 and/or connected devices 2206 not online, EGMs 2204 and/or connected devices 2206 with pending configuration changes, etc. In other embodiments EGMs 2204 and/or connected devices 2206 may be filtered on the floor map using any other type of filter as desired.

Device management platform 2200 may provide a consolidated view of the hardware IDs and a location, on a floor map of the casino, EGMs 2204 and/or connected devices 2206. In some embodiments, EGMs 2204 and/or connected devices 2206 include a unique ID and a locating feature, previously described, on the casino floor. In some cases, device management platform 2200 detects changes in the reported locations for EGMs 2204 and/or connected devices 2206 and renders them on the floor map using visual cues that alert employees regarding the location changes. Device management platform may, in various embodiments, update the floor map based on the spatial location of EGMs 2204 and/or connected devices 2206 in the casino, and an employee may need to authorize the physical move of EGMs 2204 and/or connected devices 2206 in order to complete the move process as previously described with respect to FIG. 29.

In some embodiments, device management platform 2200 tracks which devices a customer and/or employee has and/or which device a customer and/or employee is currently interacting with. Tracking may include devices such as player mobile devices 2210, employee mobile devices 2212, and the devices the customer and/or employee interacts with including EGMs 2204 and/or connected devices 2206.

In some embodiments, device management platform 2200 provides basic floor map information and device management, but additional features may be unlocked via subscription or cost adders, such as task integration, tracking, and enhanced management.

In some embodiments, device management platform 2200 provides enhanced cash handling capabilities, which improves the efficiency of the casino. For example, drops may be handled automatically via RFID and IDs associated with EGMs 2204 and/or connected devices 2206. For example, device management platform 2200 may provide automated meter capture based on the cash drop when cash boxed are pulled from EGMs 2204 and/or connected devices 2206 and new boxes are placed in EGMs 2204 and/or connected devices 2206. In another example, device management platform 2200 may identify a cash box as new if the RFID tag for the new box is different than the RFID tag of the old cash box or no cash box was re-inserted into EGMs 2204 and/or connected devices 2206.

In some embodiments, device management platform 2200 provides enhanced guest experiences. For example, device management platform 2200, in various embodiments, provides real time guest location tracking, way finding for guests, enables features for favorite game play or point of interest tagging and locating for guests, provides personalized offers, real time session updates to enable game rewarding, notifications, displaying the most up to date account information to players, optimizes the service response time for employees of the casino for guest services by routing guest requests such as drink and EGMs 2204 and/or connected devices 2206 service requests to the nearest available casino employee. In some embodiments, device management platform 2200 enables players to reserve EGMs 2204 and/or connected devices 2206 in order to play their favorite games, enables players to engage in more than one session concurrently on both mobile gaming devices and EGMs 2204 and/or connected devices 2206, and provides social integration, sch as enabling players to post a win or play to social media to enhance the engagement of players with the casino.

In some embodiments device management platform 2200 may provide additional social-oriented opportunities to players, such as casino-based interactive games. For example, players may utilize their player mobile devices 2210 to chase a game symbol on the floor, and earn a bonus or a special game at a specific location in the casino. Once the player accesses the game, the player maybe presented with a special game. Further, the bonuses live on the casino floor may be visually presented to the player on their player mobile devices 2210, providing new avenues to engage players with various EGMs 2204 and/or connected devices 2206 in the casino. In another example, players may utilize their player mobile devices 2210 to engage in treasure hunts, scavenger hunts, bingo like games, etc. For example, an operator may create requirements to play games, or create locations in a casino to win a prize during a defined time period. In one example, the requirement is for the player to play on different EGMs 2204 and/or connected devices 2206, play different amounts, play different games, in the time period in order to earn an amount of free game play. In the case of a bingo type game, a player may have a bingo card where each space is a required action for the player to complete. The required actions may be play and timing driven (e.g., the required action entails more than one trip), and the player may get a reward if they get a bingo. These actions may be tied to social interactions provided by device management platform 2200 using achievements, avatars, and the like.

Using guest movement tracking, device management platform 2200 allows solution providers the ability to track the movement of players in real time on the floor, and get services delivered to the guests in an efficient manner. Using a geo-location service provided by device management platform 2200, a guest can see where the closest casino or a point of interest location is, along with an estimated ready time, allowing the guest to make a reservation, such that the destination is ready upon arrive of the guest. Using real time way finding, device management platform 2200 provides guests with directions based on the floor map, the current location of the guest, and the location of a destination for the guest. The destination for the guest may be EGMs 2204 and/or connected devices 2206, a location on the casino property, a point of interest, service desk, restaurant, etc. Using real time wayfinding, device management platform 2200 may provide fly through animations to the guest, route highlighting on floor maps, assesses changes to the floor maps and navigational waypoints using machine learning, and provides dynamic path updates in real time based on changes on the floor. For example, device management platform 2200 may analyze the traffic patterns/player and/or employee movements on the floor to determine the most efficient route (e.g., time efficiency and/or path length) from a multitude of possible paths from the current location of the user to the location of the intended destination. Using real time wayfinding, device management platform 2200 provides 3D floor augmented reality on player mobile devices 2210 to provide additional guest experiences while at the casino. For example, device management platform 2200 may allow the players to follow a game character to a point of interest, such as a location or a particular EGMs 2204 and/or connected devices 2206 and/or a particular game, bonusing program, etc.

In some embodiments, device management platform 2200 provides enhanced player game opportunities using player mobile devices 2210 and NFC. For example, a player may register a mobile casino application installed on their player mobile device 2210, which provides location-based services within the casino. EGMs 2204 and/or connected devices 2206 may also include location aware hardware. In addition, both EGMs 2204 and/or connected devices 2206 and player mobile device 2210 may include NFC, such as Bluetooth, etc. As the player walks proximate to EGMs 2204 and/or connected devices 2206 the player is interested in playing, the player launches the mobile application on their player mobile device 2210 to initiate a session with EGMs 2204 and/or connected devices 2206. In the example, the player may have access to their account information and additionally, have access to various account functions while the session is in progress. During game play, the player is displayed contextual content based on the proximity of the player to other media devices. For example, the player may be displayed offers/bonuses based on the real time location proximity of the player to the media devices. Once the player decides to terminate the session, the player may walk away from EGMs 2204 and/or connected devices 2206, may manually terminate the session on their player mobile device 2210, etc.

In other embodiments, device management platform 2200 provides enhanced player game opportunities using player mobile devices 2210 via device triangulation. For example, a player may register a mobile casino application installed on their player mobile device 2210. As the player walks proximate to EGMs 2204 and/or connected devices 2206 the player is interested in playing, device management platform 2200 recognizes the player by triangulation with other devices. EGMs 2204 and/or connected devices 2206 may greet the player based on which of EGMs 2204 and/or connected devices 2206 are closest to the player. The player may then launch the mobile application on their player mobile device 2210 to initiate a session with EGMs 2204 and/or connected devices 2206. Once the player decides to terminate the session, the player may walk away from EGMs 2204 and/or connected devices 2206, may manually terminate the session on their player mobile device 2210, etc.

In some embodiments, device management platform 2200 provides queue management at player clubs. Using location-based services enabled by modular devices 2300, device management platform 2200 monitors and manages queue depth by engaging with guests to streamline operations. The application may proactively provide options to the players for predefined tasks, such as enrollment, redeeming a ticket to their player wallet, printing a card, claiming rewards/promotional items, etc., so the player can self-serve various activities, which reduces queues at various stations in the casino, such as cashiers.

In some embodiments, device management platform 2200 provides real time or near real time updates from the casino floor for internal use or use by third parties via, for example, API endpoints at device management platform 2200 and/or real time data streams exported by device management platform 2200. For example, device management platform 2200 may provide for exposing and licensing data streams generated by device management platform 2200 for use by third parties (discussed in more detail below). Device management platform 2200 may provide real time data stream support and/or API support to/from modular devices 2300 in EGMs 2204 and/or connected devices 2206, and also to components of EGMs 2204 and/or connected devices 2206 that communicate with modular device 2300. Some examples of the types of data that may be provided to internal systems and/or third parties from device management platform 2200 include, but are not limited to, events on EGMs 2204 and/or connected devices 2206 related to a card reader (e.g., card inserted, card removed), beacon related events (e.g., mobile device detected, mobile device out of range), RFID related events (e.g., card inserted, card removed), bezel control, SAS Access (which may include read-only transactions), peripheral status (e.g., printers, bill validators), door open, door closed, hoppers, lightings, displays connected, sensor related events (e.g., sound, motion, heat, humidity, or other types of environmental data described previously. Other types of data that may be provided to third parties from device management platform 2200 include, but are not limited to, error conditions detected related to the events outlined above.

Some use cases associated with providing real time data streams and/or exposing APIs from device management platform 2200 include, but are not limited to, detecting player/employee sessions and transactions on EGMs 2204 and/or connected devices 2206, recording individual customer actions, such as a wager placed on EGMs 2204 and/or connected devices 2206, defining the threshold number of events within a time frame, where the threshold may trigger a notification for employees, detecting anomalies in EGMs 2204 and/or connected devices 2206, performing an action on EGMs 2204 and/or connected devices 2206 (via the API exposed by device management platform 2200) based on an event. Some examples of the actions include, but are not limited to, putting cash \ promotions on EGMs 2204 and/or connected devices 2206, modifying lighting on EGMs 2204 and/or connected devices 2206 in response to a game win at EGMs 2204 and/or connected devices 2206, generating awards at EGMs 2204 and/or connected devices 2206, and/or displaying a content stream or content (e.g., full screen or in a campaign area on a display) at EGMs 2204 and/or connected devices 2206.

Some other types of information that may be provided by device management platform 2200 via API calls and/or real time data streams include information regarding modular devices 2300, such as hardware and software information, information regarding a display associated with modular devices 2300, various SAS events, include meter values and changes, etc. Further, device management platform 2200 may provide, via API support and/or real time data streams, information regarding the game configurations at EGMs 2204 and/or connected devices 2206, game configurations enabled, game info, subgame info, bonusing methods, progressives, pay tables, payment methods, etc.

In some embodiments, device management platform 2200 may provide, via API support and/or real time data streams, session information for EGMs 2204 and/or connected devices 2206. For example, the session information may include player account information displayed by EGMs 2204 and/or connected devices 2206 in real time, including account balance updates. Additional examples include player (carded or uncarded) session updates, account countdowns coin-in events, player click tracking for player sessions in order to analyze what is being used by players most of time based on interactions, player notifications, which may provide enhanced player experiences using real time messages to players in response to event conditions, player account notifications, player promotion lifecycle events, promotion anticipations, including start and stop notifications, countdowns, leaderboard information, celebration events, awards to players, announcements or individual player wins, award amounts, units, paid methods, etc.

As discussed briefly above, device management platform 2200 may provide licensing capabilities to third parties (e.g., API licensing capabilities, real time data stream licensing capabilities, etc.). In some embodiments, device management platform 2200 provides per-device licensing capabilities for EGMs 2204 and/or connected devices 2206, including, for example, subscription-based pricing models. Device management platform 2200 may, for example, support variations in licensing models based on the jurisdictions where EGMs 2204 and/or connected devices 2206 are installed (e.g., features, data, and capabilities licensed may depend upon what is allowed per jurisdiction). Licensing models may include, for example, subscriptions based on the number of EGMs 2204 and/or connected devices 2206 managed by device management platform 2200, subscription models based on subset of the number of EGMs 2204 and/or connected devices 2206 managed by device management platform 2200, etc. In some embodiments, licensing (e.g., to third parties) may include read-only API implementations, write-only API implementations, or combinations of both read-only and write-only API implementations. Other licensing variations include licensing based on the count vs based on transactions generated. Various licensing models exist, including based on a venue, on time, on location, the number of EGMs 2204 and/or connected devices 2206, on the software being used on EGMs 2204 and/or connected devices 2206, the number of active games on EGMs 2204 and/or connected devices 2206 at a given time, the number of transactions, e.g., the number of electronic fund transfers a day, the amount of fees charged for each debit/credit withdrawal transaction, etc.

In some embodiments, device management platform 2200 provides content creation tools and/or content delivery mechanisms for providing content streams and/or contextual content to players via EGMs 2204 and/or connected devices 2206. Such content streams and/or contextual content may be provided by internal sources (e.g., the owner-operator of device management platform 2200) and/or external sources (e.g., third parties via, for example, APIs exposed and/or licensed by device management platform 2200). Content streams may include video/image advertisements, video/image promotions displayed by EGMs 2204 and/or connected devices 2206, while contextual content may include any type of content displayable by EGMs 2204 and/or connected devices 2206 to the player that is based on the attributes of the player.

For example, the player may be presented with a targeted campaign or a content stream (video or images) from a third party or an internal media editor based on the player demographics, interests, and tier, at EGMs 2204 and/or connected devices 2206. A precondition for a targeted campaign or a content stream (video or images) may be set based on the player group, player demographics, etc. Another precondition may be based on the session on EGMs 2204 and/or connected devices 2206 meeting a criterion to view the targeted campaign or content stream. In order to present the targeted campaign or content stream to a player, device management platform 2200 may determine if a session has started on EGMs 2204 and/or connected devices 2206 and meets the criteria for the session. Once a determination is made by device management platform 2200 to present content to the player, device management platform 2200 provides the targeted campaign or content stream at EGMs 2204 and/or connected devices 2206 (e.g., on a device campaign display area and/or video display area of EGMs 2204 and/or connected devices 2206).

Further described herein are network-based systems and methods for tracking the locations of assets of a casino.

Slot floor analysis software can analyze an existing slot floor's historical financial performance and suggest changes to the game mix and location changes. This often entails adding gaming devices, moving gaming devices, and/or removing gaming devices. When a gaming device (e.g., a new slot machine or table) is added, removed, or moved to a different location, casino technicians are used to manually move the gaming device. The process of updating the location database and floor layout graphics is also a manual process. After the gamine device is moved and activated, the casino technician notifies the casino floor manager of the completed move and activation. The device's new location data is sent to the casino floor database for updating. The device's new location data is also sent to facility engineering to update the graphics (i.e., the casino floor map). Because of the manual process involved, which results in a time lag, location-based services such as EGM repairs, player concierge services (e.g., drinks, valet, markers, etc.), EGM service dispatch (e.g., EGM printer out of paper, etc.), can be erroneous while waiting for the location data updates to be processed and implemented. Further, when a gaming device isn't in service (e.g., the gaming device is off the casino floor waiting for repairs, is in a warehouse, is in transit to another casino location, etc.), the casino manager still needs to keep track of the gaming devices, which may be rather expensive (e.g., tens of thousands of dollars), while they are still responsible for the gaming devices. Further still, in addition to the desire to know where the gaming assets are, with the rise of iGaming on mobile devices, casinos also have the desire to know where these devices (and the players that use these devises) are in order to provide concierge services, marketing promotions, etc. Thus, there is a need for monitoring the locations of all gaming devices, as well as players on their mobile de devices, on the gaming floor in real time or near real time. Further, there is a need to monitor gaming devices off of the gaming floor such as when the gaming devices are in transit.

In the embodiments described herein, a location controller is provided that monitors the location of gaming devices and mobile devices of users. In some embodiments, beacon nodes are installed in a casino (e.g., as stand-alone devices and/or integrated into EGMs) which communicate via a mesh network. In some embodiments EGMs operate as gateway (backhaul) nodes. For example, beacons can be built into an EGM's candle device, onto the button panel, built-in to the EGM controller, etc., and connected to a SMIB for network access. Beacon-to-beacon short range communication is implemented via the mesh network. Beacon-to-EGM may be wired if a beacon is inside the EGM, and wireless if not. Wired EGM gateway nodes (wired from the EGM SMIB to a network router) for backhauling is provided in some embodiments, although wireless backend connectivity is also provided in other embodiments.

Figure 30:
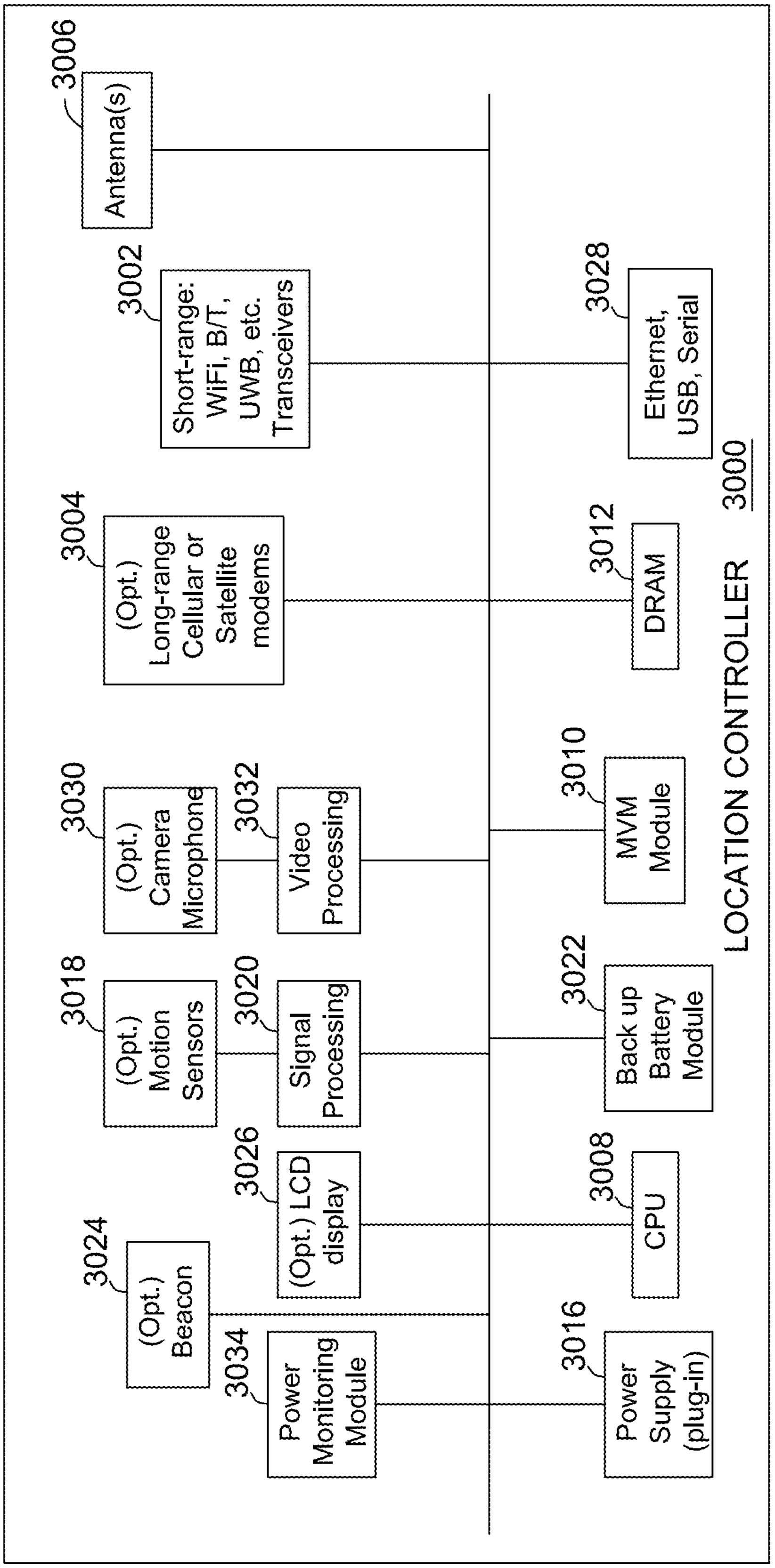
FIG. 30 is a block diagram of a location controller in an example embodiment.

FIG. 30 is a block diagram of a location controller 3000 in an example embodiment. Location controller 3000, which may be attached to an asset or to a structure such as a wall, ceiling, or floor of a venue (operating in some embodiments as a stand-alone controller) includes any component, system, or device that performs the functionality described herein for the location controllers described herein. Location controller 3000 will be described with respect to various discrete elements, which perform functions. These elements may be combined in different embodiments or segmented into different discrete elements in other embodiments.

In this embodiment, location controller 3000 includes one or more short-range RF transceivers 3002 and optionally, one or more long-range RF transceivers 3004 communicatively coupled to one or more antennas 3006. RF transceivers 3002, 3004 may implement any wireless network as desired, as previously described, such as mesh network 1206 (see FIG. 12). In this embodiment, location controller 3000 includes a processor 3008, a non-volatile random-access memory 3010 (NVRAM, such as NAND Flash, Magnetic RAM, Ferroelectric RAM, etc.), and DRAM 3012. In this embodiment, location controller 3000 includes a plug-in power module 3016, optional motion sensors 3018, and signal processing circuits 3020. Location controller 3000 in this embodiment includes a battery backup module 3022, which provides mobile operation for location controller 3000 when plug-in power module 3016 is disconnected (e.g., when an EGM is being transported). Motion sensors 3018 may include any type of sensor or device, such as accelerometers, infrared sensors, piezoelectric sensors, radio wave sensors, optical sensors, gyroscopes, etc., and may be used, for example, to detect when location controller 3000 is moved. Signal processing circuits 3020 operate to process the signals generated by motion sensors 3018 into a desired format. For example, signal processing circuits 3020 may amplify and/or convert analog signals generated by motion sensors 3018 into digital signals, prior to transmission of data across a mesh network, such as mesh network 1206 (see FIG. 12). In some embodiments, location controller 3000 includes a beacon 3024, such that location controller 3000 advertises its own location. Beacon 3024 may operate similar to beacons 714, 1514 of uSMIB 404 and eSMIB 1500 of FIGS. 7 and 15, respectively. In this embodiment, location controller 3000 further includes a display 3026 (e.g., a liquid crystal display), an Ethernet/serial interface 3028 (e.g., Ethernet, parallel (IEEE-488) and/or serial (USB, RS-232, RS-485) interfaces), a camera/microphone module 3030, a video processing module 3032, and a power monitoring module 3034.

RF transceivers 3002, 3004 may be used to ping nearby gaming devices or other location controllers, calculate their relative positions to other RF transceivers, determine if their locations have changed, and report location changes to a location server (e.g., generate location exceptions for gaming devices). Power monitoring module 3034 monitors plug-in power module 3016, detects the loss of power at location controller 3000, and switches to battery backup module 3022 for power. It also directs location controller 3000 to track the location changes (e.g., EGMs in transit) by utilizing RF transceivers 3002, 3004 identify, at least periodically, the location of location controller 3000. Short-range RF transceivers 3002 provide communication between gaming devices and gaming servers, while long-range RF transceivers 3004 provide long-range communications between gaming devices and servers when short-range communications are unavailable, such as when EGMs are in transit outside of the casino. Motion sensors 3018 may include accelerometers, inertial gyroscopes, etc., and can, in one embodiment, may be attached to an EGM, an EGM's CPU box, a bill validator cash (drop) box, a casino chip tray, a drop cart, etc., and are used to detect motion location exceptions of the attached (and tracked) assets, and/or trigger the acquisition of location data. Location exceptions occur when EMGs are moved unexpectedly. Camera/microphone module 3030 may be used to take pictures, record video clips, and/or audio clips of nearby objects (e.g., the environment, barcodes on walls on other EGMs, etc.), which may be used to identify a location of location controller 3000. Video processing module 3032 may be used to reformat raw video/audio data into a more suitable format for transmission across a mesh network (e.g., the use of compression such as H.264, H.265, etc.), such as mesh network 1206 (see FIG. 12). In some embodiments, Ethernet/serial interfaces 3028 are used to backhaul data from the mesh network back to various casino servers, such as location server 1410, over a wired network connection. In other embodiments, one or more of RF transceivers 3002, 3004 may be used to backhaul data from the mesh network back to the various casino servers, such as location server 1410, over a wireless network connection.

Figure 31:
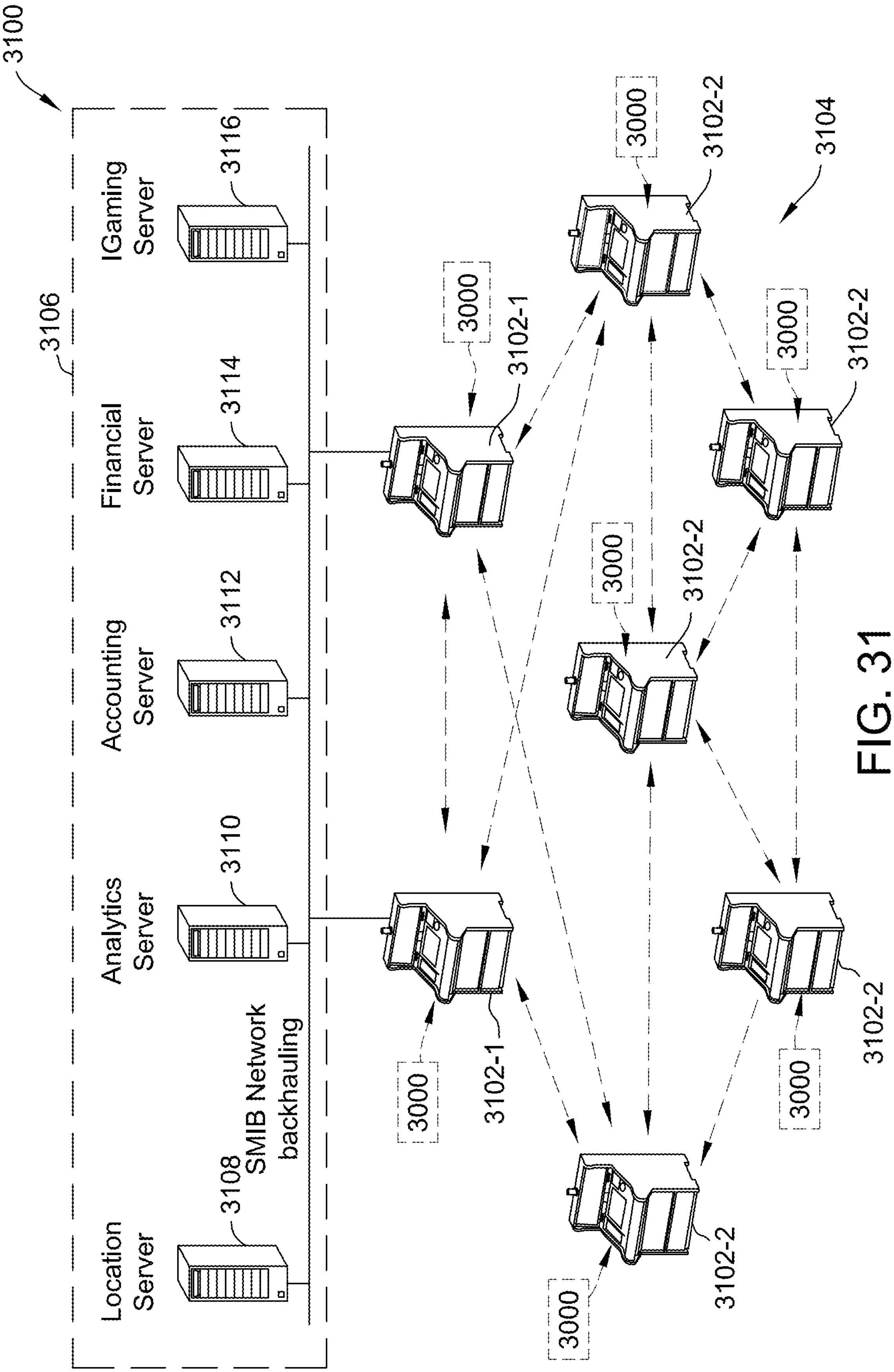
FIG. 31 depicts a location network in an example embodiment.

FIG. 31 depicts a location network 3100 in an example embodiment. In this embodiment, EGMs 3102 include location controllers 3000. EGMs 3102 may be the same or similar to any of the EGMs previously described, such as EGM 104, EGM/T 406, EGM 1120, EGM 2204, etc.

Location controllers 3000 communicate with each other via a wireless network 3104, and forward their location data to one or more servers 3106. Wireless network 3104 may operate similarly to mesh network 1206 previously described (see FIG. 12). In this embodiment, servers 3106 include a location server 3108, an analytics server 3110, an accounting server 3112, a financial services sever 3114, and an iGaming server 3116. Any of servers 3106 may implement the various functions described herein for server computers 102 of FIG. 1, CMS servers 410 of FIG. 4, and servers 1128 of FIG. 17. In this embodiment, location controllers 3000 communicate with location server 3108 and return their location data regarding the location of their associated EGMs 3102. In particular, location controllers 3000 located within EGMs 3102-1 communicate with each other via wireless network 3104 and with servers 3106 via a wired network connection. Thus, location controllers 3000 within EGMs 3102 form gateway nodes for wireless network 3104, backhauling data from wireless network 3104 to servers 3106.

In this embodiment, location controllers 3000 in EGMs 3102-1 utilize ethernet/serial interfaces 3028 for wired backhaul, and utilize short-range RF transceivers 3002 to implement wireless network 3104. During operation, location controllers 3000 in EGMs 3102-1 collect and backhaul location data from wireless network 3104 to location server 3108. In addition, location controllers 3000 within EGMs 3102-2 may act as a relay node to receive and forward location data from other location controllers 3000 to the EGM gateway nodes 3102-1 via wireless network 3104.

In some embodiments, location controller 3000 is powered by the power supply of EGM 3102 (via plug-in power module 3016) when available, and by battery backup module 3022 when EGMs 3102 are unplugged (e.g., when EGMs 3102 are in transit). Location controller 3000 periodically retrieves (e.g., reads) nearby beacons and/or RF transceivers (e.g., beacons 3024, Bluetooth or UWB RF transceivers 3002, or other stand-alone beacon devices, not shown) and records the beacon/transceiver data (e.g., a beacon ID's, time stamps, RSSI data, casino IDs, etc.) into non-volatile memory 3010. In some embodiments, location controller 3000 includes beacon 3024, which allows location controller 3000 to advertise its own location to other location controllers 3000. In some embodiments, non-volatile memory 3010 is write-once read many (WORM) memory, which can be used as a verifiable audit trail. In some embodiments, location controller 3000 includes power monitoring module 3034, which monitors plug-in power module 3016, detects the loss of power, and switches to battery backup module 3022. Power monitoring module 3034 may then send signals that directs location controller 3000 to obtain location data at least periodically during the power loss event (e.g., using long- or short-range wireless networks via RF transceivers 3002, 3004).

In some embodiments, an EGM's 3102 location controller 3000 periodically detects its nearby beacons and/or RF transceivers (e.g., stand-alone beacons and/or beacons 3024, RF transceivers 3002 (Bluetooth, UWB) installed in a nearby EGM 3102 location controllers 3000), stores the data in local non-volatile memory 3010 of location controller 3000, and pushes the data to location server 3108 when a communication connection becomes available. The ability to acquire location data and store the location data in non-volatile memory 3010 (which may be WORM memory) creates a secured storage and verifiable audit trail whether plug-in power is available or not. Location server 3108 receives raw data from location controllers 3000 at EGMs 3102 (e.g., when location controller 3000 detects that an EGM 3102 has been moved and/or periodically regardless of movement), and location server 3108 computes the location of EGMs 3102 on the casino floor.

In some embodiments, location server 3108 compares the newly computed location of EGMs 3102 to previously recorded locations, and generates a discrepancy message/report if a location change is detected. If the location data remains unchanged, then a location computation and/or a location database update may not be needed. By computing the location data, location server 3108 is aware of EGM 3102 locations in addition to the devices near location controllers 3000. In some embodiments, the location data of EGMs 3102 plus the location data of the nearby EGMs 3102 is used to automatically generate a floor map of where all of the EGMs 3102 are located, as well as validating an EGM's 3102 newly reported data. For example, if an EGM 3102 reports that its nearby neighbors (e.g., stand-alone beacons, stand-alone RF transceivers, beacons 3024 and/or RF transceivers 3002, 3004) are devices A, B, C, and M, and location server 3108 calculates that the nearby neighbors should be A, B, Q, and T, then location server 3108 can ping devices A, B, C, and M and verify that each also hears this EGM 3102. If so, then location server 3108 may update its location database. If not, then location server 3108 may generate a discrepancy message/report.

As discussed previously, location server 3108 may automatically update the floor map as needed as EGMs 3102 change location, and/or automatically update a gaming asset database to indicate the location information for EGMs 3102 both on the casino floor and outside of the casino floor. In some embodiments, location server 3108 implements geo-fencing for casino assets monitored by location controllers 3000. In these embodiments, location server 3108 may use various location rules and determine if an alarm should be generated depending on the location information for tracked devices. For example, location server 3108 may generate an alarm if a tracked device is outside of its predefined geo fenced zone, such as a casino floor. In some embodiments, short-range location architectures may be used by location controllers 3000 within the casino to implement wireless network 3104, such as WiFi, UWB, Z-wave, Zigbee, etc. In other embodiments, long-range location architectures may be used by location controllers 3000 outside of the casino, such as GPS, cellular modems, satellite links, etc., via long-range RF transceivers 3004 when tracked devices are in transport outside of a venue's local network.

In some embodiments, location controllers 3000 can also detect nearby mobile gaming devices (not shown). For example, location controllers 3000 can detect nearby smart phones executing a gaming application and/or detect nearby dedicated mobile gaming devices operated by the casino. In these embodiments, location controllers 3000 track the location of the nearby mobile gaming devices in real time or near real time, and report the location of the nearby mobile devices to location server 3108. Location server 3108 may use this information to identify the location, movement, etc., of mobile gaming devices and users of the mobile gaming devices on the casino floor. By overlaying the stationary gaming device map with the foot traffic indicated by the mobile device map, whether or not a mobile device is engaged in gaming on the casino floor, casino managers can view the status of their casino floors in real time or near real time, integrating activities at stationary devices and the foot traffic flow.

Figure 32:
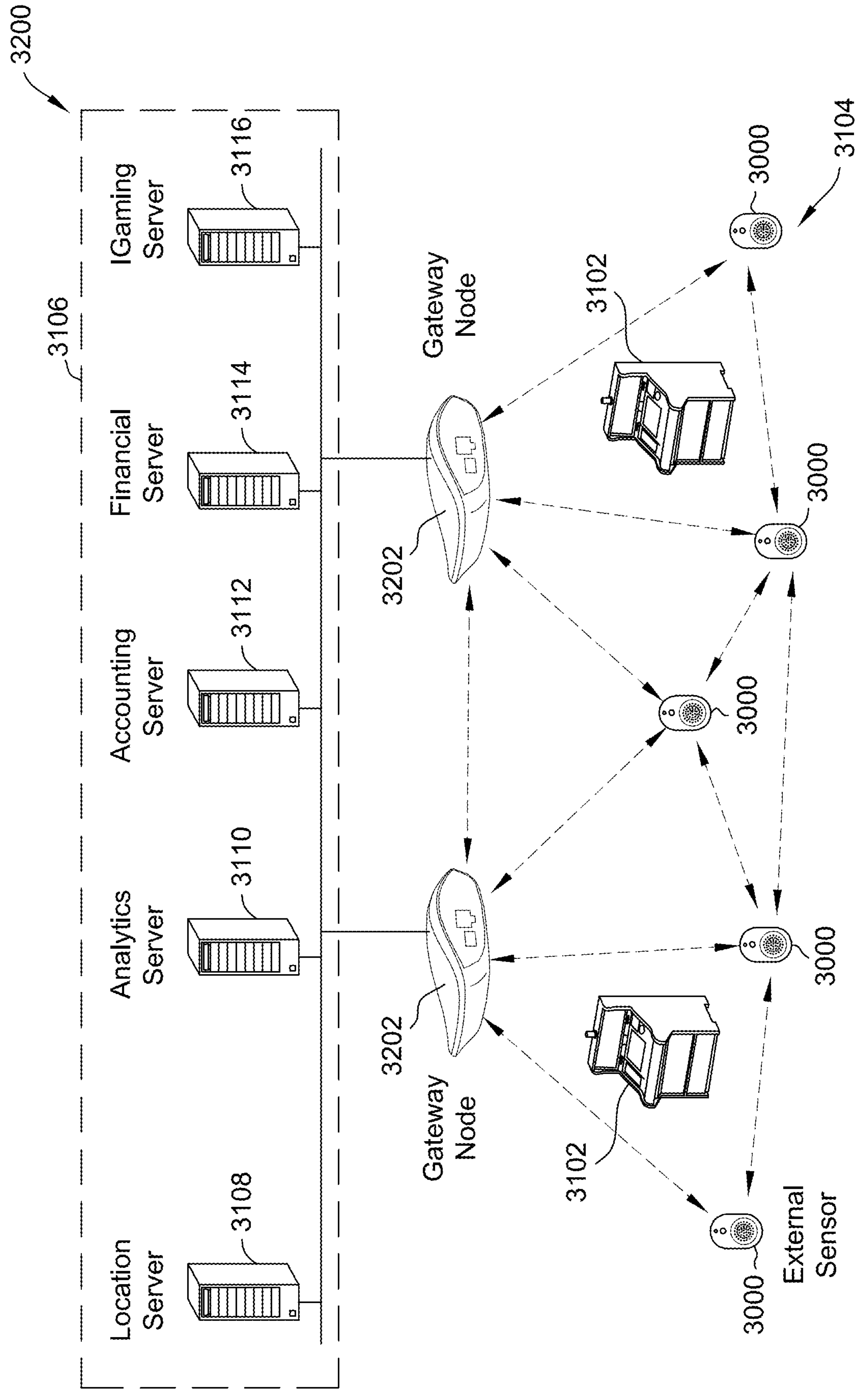
FIG. 32 depicts a location network in another example embodiment.

FIG. 32 depicts a location network 3200 in another example embodiment. In this embodiment, location network 3200 includes wireless network 3104 and servers 3106. EGMs 3102 are not used in this embodiment as a backhauling gateway in cases where they are not available, not accessible, or installing location controllers 3000 are not permitted.

In this embodiment, wireless network 3104 includes location controllers 3000 and gateways 3202. Gateways 3202 include both wired and/or wireless interfaces that communicate with servers 3106 in addition to wireless interfaces that communicate with wireless network 3104.

During operation, location controllers 3000, which operate as stand-alone devices in this embodiment, generate location data previously described, which is forwarded across wireless network 3104 by location controllers 3000 to gateways 3202. Gateways 3202 collate the raw location data and backhaul the location data to one or more of servers 3106, such as location server 3108. As stand-alone devices, location controllers 3000 may be used to track the location of any casino assets, including EGMs 3102, cash drop boxes on gaming tables, etc.

Figure 33:
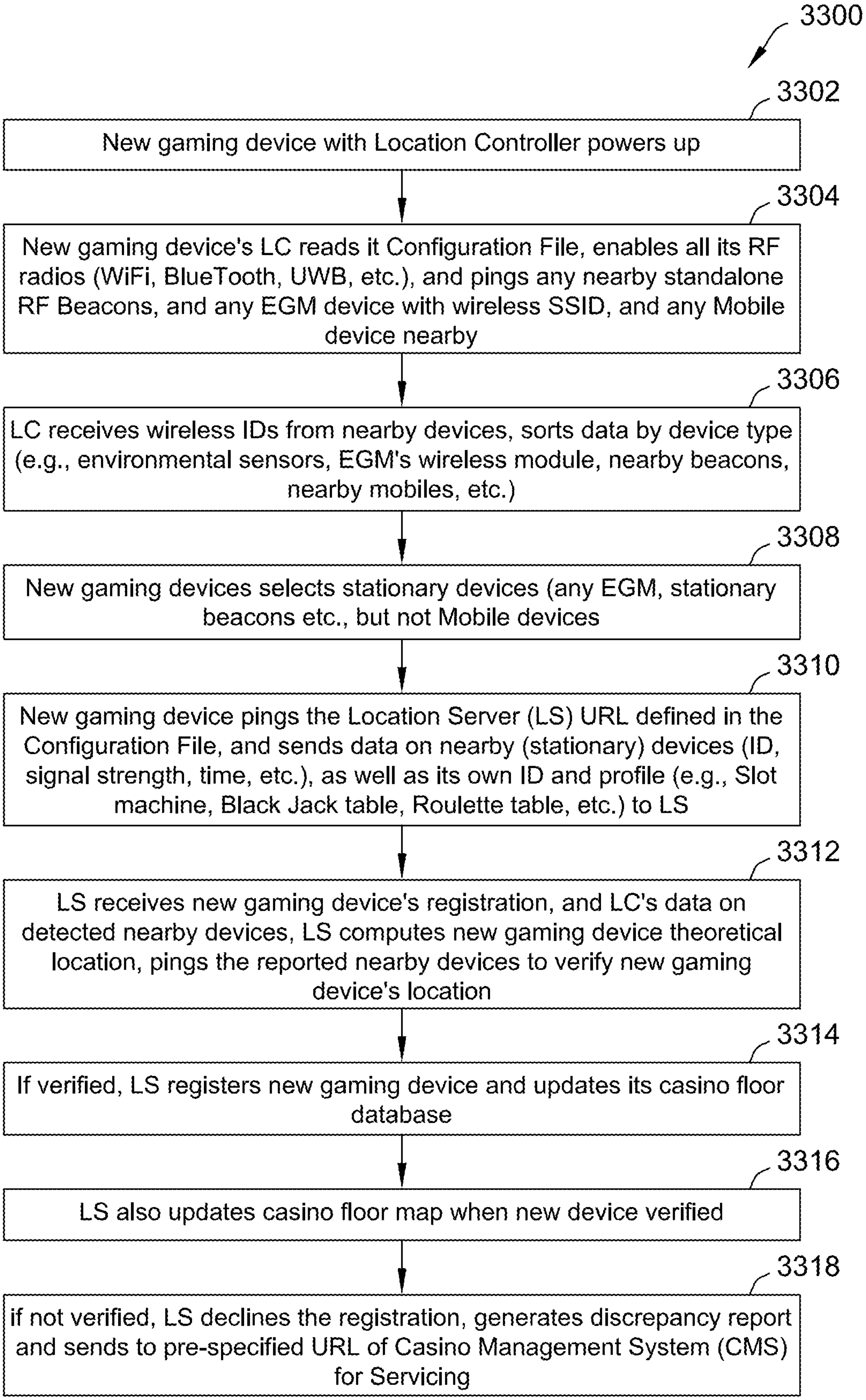
FIG. 33 is a flow diagram illustrating a process for registering a new gaming device in an example embodiment.

FIG. 33 is a flow diagram illustrating a process 3300 for registering a new gaming device in an example embodiment. Process 3300 will be discussed with respect to location networks 3100 and 3200 of FIGS. 31 and 32, although process 3300 may apply to other systems, networks, and devices, not shown.

Process 3300 begins in this embodiment when a new gaming device that includes a location controller powers up (see step 3302). For example, one of EGMs 3102 depicted in FIG. 31 that includes location controller 3000 powers up.

Process 3300 continues in this embodiment when the new gaming device's location controller reads its configuration file, enables its radios, and reads nearby beacons and/or RF transceivers, EGMs 3102 with beacons 3024 and/or transceivers 3002, and nearby mobile devices (see step 3304). For example, location controller 3000 associated with a new EGM 3102 reads its configuration file from non-volatile memory 3010, enables its RF transceivers 3002, 3004, and reads nearby beacon devices and nearby mobile devices.

Process 3300 continues in this embodiment when the location controller receives the wireless IDs from devices nearby the new EGM 3102 and sorts the data by device type (e.g., environmental sensors, EGM wireless modules, nearby stand-alone beacons, nearby mobile devices, nearby beacons 3024 of location controllers 3000 etc., see step 3306). For example, location controller 3000 receives and sorts wireless IDs read from nearby devices.

Process 3300 continues in this embodiment when the location controller selects stationary beacon devices and/or nearby RF transceivers, but not mobile devices (see step 3308). For example, location controller 3000 sorts the wireless IDs read from nearby devices in order to identify and select beacon IDs that are recognized as stationary.

Process 3300 continues in this embodiment when the location controller pings the location server URL defined in the configuration file, and sends the data from the nearby stationary devices as well as its own ID and EGM profile to the location server (see step 3310). For example, location controller 3000 pings the location server URL defined in the configuration file, and sends the data from the nearby stationary devices as well as its own ID and EGM profile to location server 3108.

Process 3300 continues in this embodiment when the location server receives the new gaming devices' registration and the location controllers' data on the detected nearby devices. The location server computes the new gaming devices' theoretical location, and pings nearby devices to verify the new gaming devices' location (see step 3312). For example, location server 3108 receives the new EGM's 3102 registration and data on the detected nearby devices by location controller 3000, and location server 3108 pings nearby devices to verify the location of EGM 3102 by confirming that the nearby devices receive the new device's RF signal (e.g., ID broadcasting).

Process 3300 continues in this embodiment when the location server, if the data is verified, registers the new gaming device, and updates the casino floor database (see step 3314). For example, location server 3108 updates the casino floor database if the data is verified.

Process 3300 continues in this embodiment when the location sever also updates the casino floor map if the new gaming device is verified (see step 3316). For example, location server 3108 updates the casino floor map if the data is verified.

Process 3300 continues in this embodiment when the location server declines the registration if the data is not verified, generates a discrepancy message/report, and sends the discrepancy message/report to a pre-defined URL of the CMS for servicing (see step 3318). For example, location server 3108 sends the discrepancy message/report to the CMS server (e.g., one or more of servers 3106) for reconciliation.

Figure 34:
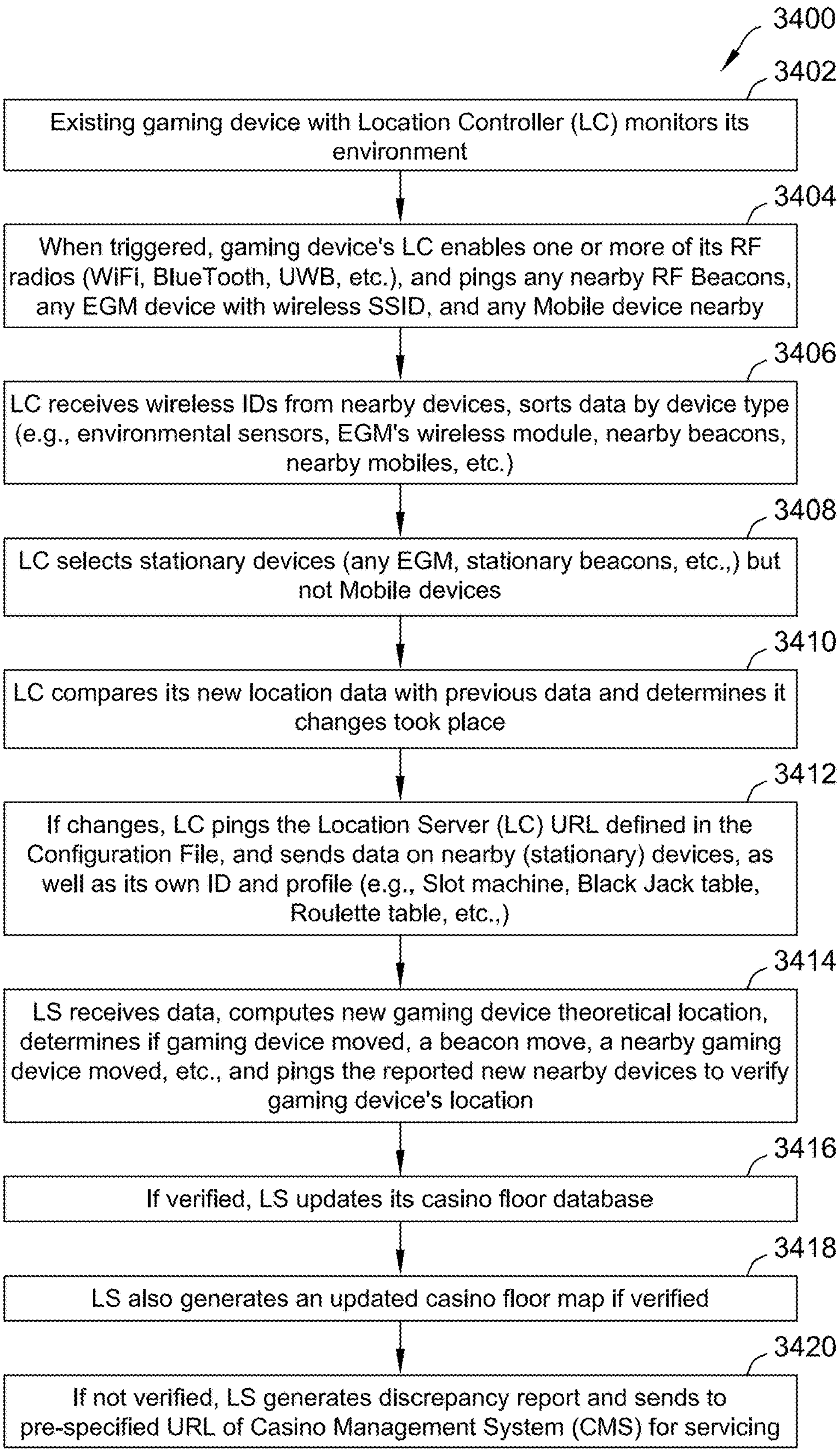
FIG. 34 is a flow diagram illustrating a process for monitoring location changes for an existing gaming device in an example embodiment.

FIG. 34 is a flow diagram illustrating a process 3400 for monitoring location changes for an existing gaming device in an example embodiment. Process 3400 will be discussed with respect to location networks 3100 and 3200 of FIGS. 31 and 32, although process 3400 may apply to other systems, networks, and devices, not shown.

Process 3400 begins in this embodiment when existing gaming devices with location controllers monitors their environment (see step 3402). For example, location controllers 3000 monitor the environment of their EGMs 3102.

Process 3400 continues in this embodiment then the location controller of a gaming device enables its radios and pings nearby beacons, any EGMs with beacons and/or RF transceivers, and any mobile devices nearby (see step 3404). For example, location controllers 3000 enables its RF transceivers 3002, 3004, and pings nearby beacons 3024.

Process 3400 continues in this embodiment when the location controller receives the wireless IDs from devices nearby the new EGM and sorts the data by device type (e.g., environmental sensors, EGM wireless modules and/or RF transceivers, nearby beacons, nearby mobile devices, etc., see step 3406). For example, location controller 3000 receives and sorts wireless IDs from nearby devices such as beacons 3024 and/or RF transceivers 3002, 3004.

Process 3400 continues in this embodiment when the location controller selects stationary beacon and RF transceiver devices, but not mobile devices (see step 3408). For example, location controller 3000 sorts the wireless IDs received in order to identify and select beacon and RF transceiver IDs that are recognized as stationary.

Process 3400 continues in this embodiment when the location controller compares its new location data with previous location data and determines if a location change has taken place (see step 3410). For example, location controller 3000 compares its new location data with previous location data and determines if its location has changed.

Process 3400 continues in this embodiment when the location controller, upon identifying a change in location, pings the location server URL defined in the configuration data and send the location controller data on nearby stationary devices as well as its own ID and EGM profile (see step 3412). For example, location controller 3000 communicates this information to location server 3108.

Process 3400 continues in this embodiment when the location server receives the location controller's data on the detected nearby devices. The location server computes the new gaming device's theoretical location, and pings nearby devices to verify the new gaming devices' location (see step 3414). For example, location server 3108 receives data on the detected nearby devices by location controller 3000, and location server 3108 pings nearby devices to verify the location of EGM 3102 by confirming that the nearby devices receive the gaming devices' RF signal (e.g., ID broadcasting).

Process 3400 continues in this embodiment when the location server, if the data is verified, updates the casino floor database (see step 3416). For example, location server 3108 updates the casino floor database if the data is verified.

Process 3400 continues in this embodiment when the location sever also updates the casino floor map when the location data is verified (see step 3418). For example, location server 3108 updates the casino floor map if the data is verified.

Process 3400 continues in this embodiment when the location server, if the data is not verified, generates a discrepancy message/report and sends the discrepancy message/report to a pre-defined URL of the CMS for servicing (see step 3420). For example, location server 3108 sends the discrepancy message/report to a CMS, such as one or more of servers 3106.

Figure 35:
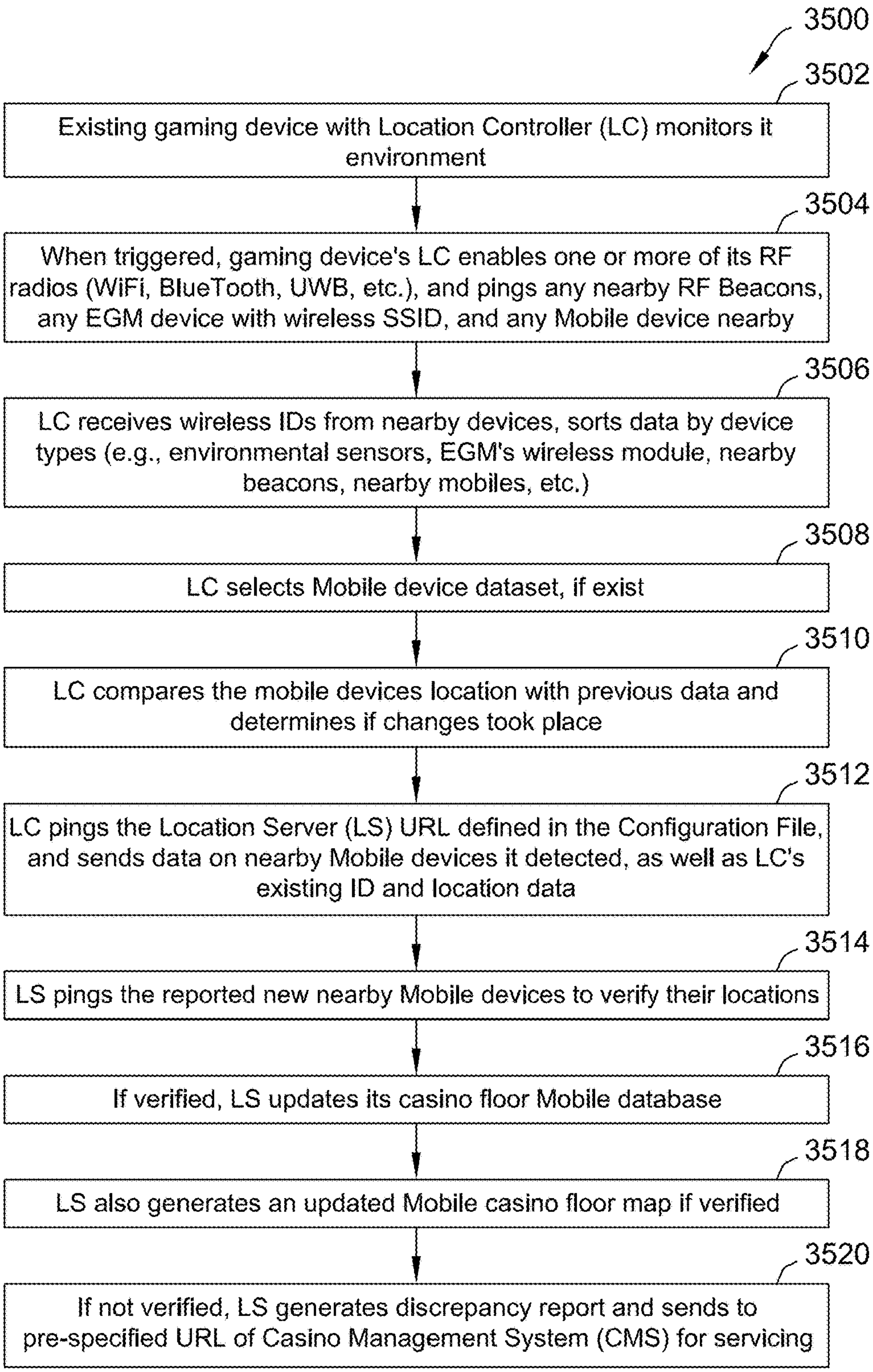
FIG. 35 is a flow diagram illustrating a process for monitoring location changes of mobile devices in an example embodiment.

FIG. 35 is a flow diagram illustrating a process 3500 for monitoring location changes of mobile devices in an example embodiment. Process 3500 will be discussed with respect to location networks 3100 and 3200 of FIGS. 31 and 32, although process 3500 may apply to other systems, networks, and devices, not shown.

Process 3500 begins in this embodiment when existing gaming devices with location controllers monitors its environment (see step 3502). For example, location controllers 3000 monitor the environment of their EGMs 3102.

Process 3500 continues in this embodiment then the location controller of a gaming device enables its radios and pings nearby beacons, any EGMs with wireless beacons and/or RF transceivers, and any mobile devices nearby (see step 3504). For example, location controllers 3000 enables its transceivers 3002, 3004, and pings nearby beacons and/or RF transceivers (e.g., nearby beacons 3024 and/or RF transceivers 3002, 3004).

Process 3500 continues in this embodiment when the location controller receives the wireless IDs from devices nearby the new EGM and sorts the data by device type (e.g., environmental sensors, EGM wireless modules, nearby beacons, nearby mobile devices, nearby RF transceivers, etc., see step 3506). For example, location controller 3000 receives and sorts wireless IDs from nearby devices.

Process 3500 continues in this embodiment when the location controller selects mobile devices (see step 3508). For example, location controller 3000 sorts the wireless IDs received in order to identify and select wireless IDs that are recognized as mobile.

Process 3500 continues in this embodiment when the location controller compares the mobile device's location with previous location data and determines if a location change has taken place (see step 3510). For example, location controller 3000 compares the location of mobile devices with previous location data and determines if a location change has taken place.

Process 3500 continues in this embodiment when the location controller, upon identifying a change in location of the mobile devices, contacts the location server from the URL defined in the configuration data and sends the location data on nearby mobile devices as well as its own ID to the location server (see step 3512). For example, location controller 3000 contacts the location server from the URL defined in the configuration data and sends the location data on nearby mobile devices as well as its own ID to location server 3108.

Process 3500 continues in this embodiment when the location server pings the new nearby mobile devices to verify their locations (see step 3514). For example, location server 3108 pings the new nearby mobile devices to verify that they receive the location controller's ID (e.g., that they both hear each other).

Process 3500 continues in this embodiment when the location server, if the data is verified, updates the casino floor mobile database (see step 3516). For example, location server 3108 updates the casino floor database if the data is verified.

Process 3500 continues in this embodiment when the location sever also updates the mobile casino floor map when the location data is verified (see step 3518). For example, location server 3108 updates the casino floor map if the data is verified.

Process 3500 continues in this embodiment when the location server, if the data is not verified, generates a discrepancy message/report and sends the discrepancy message/report to a pre-defined URL of the CMS for servicing (see step 3520). For example, location server 3108 sends the discrepancy message/report to a CMS server, such as one or more of servers 3106.

Figure 36:
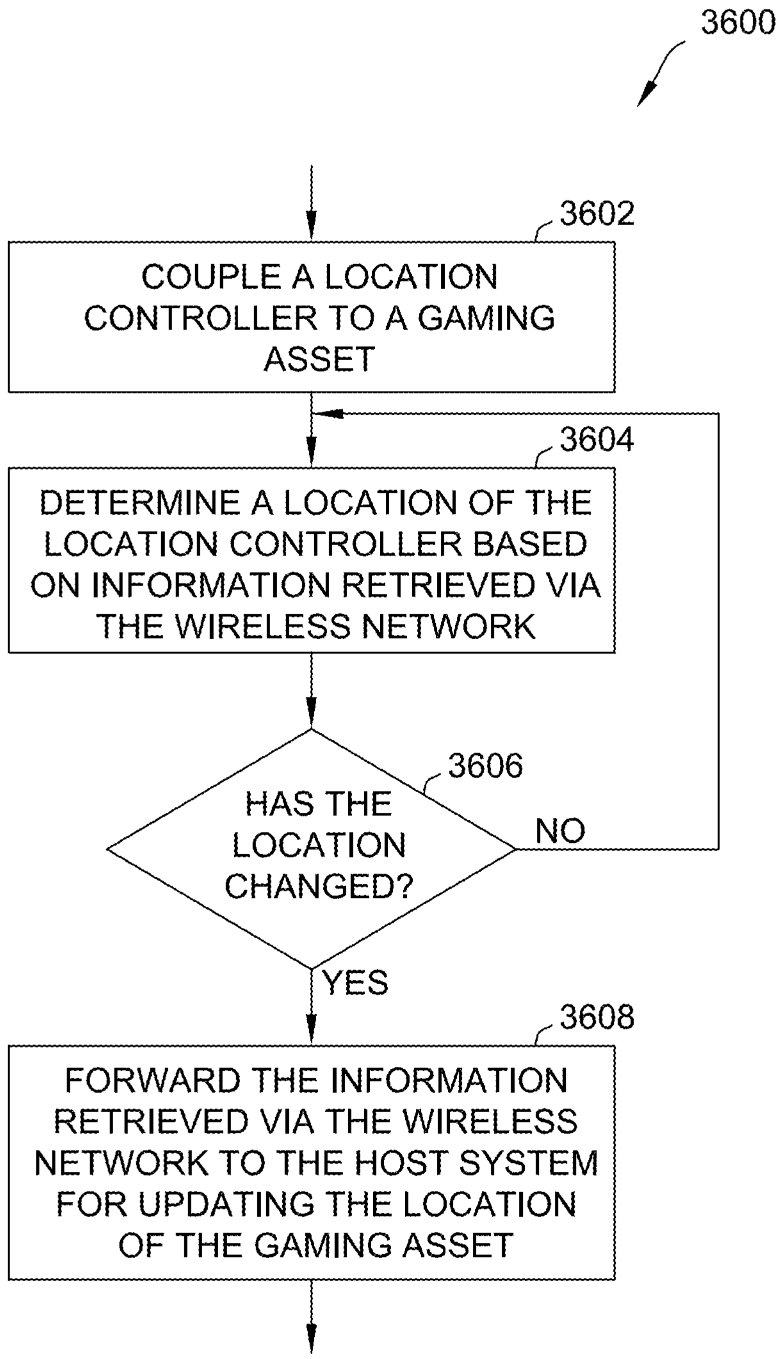
FIG. 36 depicts a flow chart of a method operable by a management system for monitoring locations of a plurality of gaming assets of a gaming venue in an example embodiment.

FIG. 36 depicts a flowchart of a method 3600 operable by a management system for monitoring locations of a plurality of gaming assets of a gaming venue in an example embodiment. The management system includes a host system and a plurality of location controllers in wireless communication with the host system, and the location controllers form a wireless network. Method 3600 will be discussed with respect to location networks 3100 and 3200 of FIGS. 31 and 32, although method 3600 may apply to other systems, networks, and devices, not shown.

In this embodiment, method 3600 includes coupling a location controller of the plurality of location controllers to a gaming asset of the plurality of gaming assets (see step 3602). For example, location controllers 3000 are attached to EGMs 3102. Location controller 3000 may communicatively couple to EGMs 3102 in a number of different ways, utilizing, for example, Ethernet/serial interface 3028 and/or RF transceivers 3002, 3004 (see FIG. 30). Some examples of gaming assets include gaming devices (e.g., EGMs 3102), chip trays, drop carts, and/or cash boxes.

Method 3600 continues in this embodiment by determining, by the location controller and based on information retrieved via the wireless network, the location of the location controller (see step 3604). For example, location controller 3000 periodically retrieves (e.g., reads) nearby beacons and/or RF transceiver data from casino assets, such as EGMs 3102 and other gaming assets (e.g., beacons 3024 and/or Bluetooth, UWB, Wi-Fi RF transceivers 3002 attached to EGMs 3102 or other stand-alone beacon devices, not shown) and records the beacon/transceiver data (e.g., a beacon ID's, time stamps, RSSI values, casino IDs, etc.) into non-volatile memory 3010 (see FIG. 30).

Method 3600 continues in this embodiment by determining, by the location controller, whether the location of the location controller has changed (see step 3606). For example, location controller 3000 of one of EGMs 3102 may determine that its location has changed by detecting changes in IDs of beacons 3024, RF transceivers 3002, and/or by detecting changes in RSSI values for local beacons 3024 and/or RF transceivers 3002, or using other mechanisms previously described.

Method 3600 continues in this embodiment by forwarding, by the location controller, the information retrieved via the wireless network to the host system for updating the location of the gaming asset within the gaming venue in response to determining that the location of the location controller has changed (see step 3608). For example, location controller 3000 retrieves (e.g., reads) nearby beacons and/or RF transceivers (e.g., beacons 3024, Bluetooth, Wi-Fi, UWB RF transceivers 3002, 3004 in EGMs 3102 or other stand-alone beacon/RF transceiver devices, not shown) and forwards the raw data (e.g., a beacon ID's, time stamps, RSSI values, casino IDs, etc.) to location server 3108, which used the information to determine and update the location of the gaming asset (e.g., EGM 3102) within the gaming venue.

In some embodiments, when the gaming asset includes a gaming device, then method 3600 may further include generating, by the location controller, a profile based on a device configuration of the gaming device and the location of the location controller, where the profile defines a role of the gaming device. For example, location controller 3000 generates a profile for EGM 3102 based on the device configuration of EGM 3102 and its location. If, for example, an EGM 3102 is at a location that is proximate other EGMs 3102 having a specific configuration (e.g., nearby EGMs 3102 are configured with the same game), then location controller 3000 may generate a profile for the EGM 3102 that corresponds to the configuration of nearby EGMs. This reduces the setup time for EGMs 3102 when they are initially set up within the gaming venue.

In this embodiment, method 3600 may further include updating, by the location controller, the profile based on the change in location of the location controller. If, for example, an EGM 3102 is moved to a new location that is proximate other EGMs 3102 having a new device configuration (e.g., nearby EGMs 3102 are configured with a different game), then location controller 3000 may generate a new profile for the EGM 3102 that corresponds to the configuration of the new nearby EGMs. This reduces the setup time for EGMs 3102 when they are moved within the gaming venue.

In some embodiments, the information retrieved by the location controller includes wireless identifiers broadcast by one or more of the plurality of location controllers that are proximate to the location controller. For example, location controllers 3000 may each include their own beacon 3024, which is broadcasted and read by nearby location controllers 3000. In this embodiment, the information retrieved may comprise mobile device identifiers, and/or internet protocol addresses, and/or network addresses broadcast by at least one mobile gaming device of the gaming venue. When the information retrieved is from a mobile gaming device, the location controller may disregard the identifiers when determining whether the location of the location controller has changed. For example, because the users of mobile gaming devices may be moving through the gaming venue, location controller 3000 may disregard or ignore the information from the mobile gaming devices when determining whether the location of the location controller 3000 has changed, as the mobile gaming devices may be moving rather than the gaming asset that location controller 3000 is attached to.

In some embodiments, method 3600 further includes identifying, by the host system and based on the information retrieved via the wireless network, which of the plurality of location controllers are proximate to the location controller, and querying, by the host system, one or more of the plurality of location controllers that are proximate to the location controller in order to verify the location of the location controller. For example, location server 3108 may identify, based on the information provided by location controller 3000, additional location controllers 3000 that are nearby (e.g., based on their unique IDs associated with their beacons 3024), and query nearby location controllers 3000 to determine if they can detect the beacon ID of location controller 3000 being verified. If location server 3108 cannot verify the location of location controller 3000 after its movement, then location server 3108 may generate a discrepancy message/report. The discrepancy message/report may note that location server 3108 is unable to verify the new location of location controller 3000 because the location controllers 3000 that are nearby do not detect its beacon ID.

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

What is claimed is:

1. A management system configured to monitor locations of a plurality of gaming assets of a gaming venue, the management system comprising:

a host system; and a plurality of location controllers in wireless communication with the host system and forming a wireless network therebetween, wherein at least one location controller of the plurality of location controllers is coupled to a gaming asset of the plurality of gaming assets and configured to:

retrieve information from one or more other location controllers via the wireless network, the retrieved information including one or more wireless device identifiers associated with one or more devices detected as being proximate to the at least one location controller;

determine, based at least in part on the one or more device identifiers while disregarding any wireless device identifiers associated with at least one mobile device, a location of the at least one location controller;

determine whether the location of the at least one location controller has changed with respect to a previously determined location of the at least one location controller; and forward the information retrieved via the wireless network to the host system for updating the location of the gaming asset within the gaming venue in response to determining that the location of the at least one location controller has changed.

2. The management system of claim 1, wherein:

the gaming asset comprises a gaming device, and the at least one location controller is further configured to generate a profile based on a device configuration of the gaming device and the location of the at least one location controller, the profile defining a role of the gaming device.

3. The management system of claim 2, wherein:

the at least one location controller is further configured to update the profile based on the change in the location of the at least one location controller.

4. The management system of claim 1, wherein:

the information retrieved comprises at least one of mobile device identifiers, internet protocol addresses, and network identifiers broadcast by the at least one mobile device of the gaming venue.

5. The management system of claim 1, wherein:

the host system is further configured to:

identify, based on the information retrieved via the wireless network, which of the plurality of location controllers are proximate to the at least one location controller; and query one or more of the plurality of location controllers that are proximate to the at least one location controller in order to verify the location of the at least one location controller.

6. The management system of claim 5, wherein:

the host system is further configured to generate a discrepancy report in response to determining that the location of the at least one location controller is unverified.

7. The management system of claim 1, wherein:

the gaming asset comprises at least one of a gaming device, a chip tray, a drop cart, and a cash box for the gaming device.

8. A method operable by a management system for monitoring locations of a plurality of gaming assets of a gaming venue, the management system comprising a host system and a plurality of location controllers in wireless communication with the host system and forming a wireless network therebetween, the method comprising:

coupling a location controller of the plurality of location controllers to a gaming asset of the plurality of gaming assets;

retrieving, by the location controller, information from one or more other location controllers via the wireless network, the retrieved information including one or more wireless device identifiers associated with one or more devices detected as being proximate to the location controller;

determining, by the location controller and based at least in part on the one or more device identifiers while disregarding any wireless device identifiers associated with at least one mobile device, a location of the location controller;

determining, by the location controller, whether the location of the location controller has changed with respect to a previously determined location of the location controller; and forwarding, by the location controller, the information retrieved via the wireless network to the host system for updating the location of the gaming asset within the gaming venue in response to determining that the location of the location controller has changed.

9. The method of claim 8, wherein:

the gaming asset comprises a gaming device, and the method further comprises:

generating, by the location controller, a profile based on a device configuration of the gaming device and the location of the location controller, the profile defining a role of the gaming device.

10. The method of claim 9, further comprising:

updating, by the location controller, the profile based on the change in the location of the location controller.

11. The method of claim 8, wherein:

the information retrieved comprises at least one of mobile device identifiers, internet protocol addresses, and network addresses broadcast by at least one mobile gaming device of the gaming venue.

12. The method of claim 8, further comprising:

identifying, by the host system and based on the information retrieved via the wireless network, which of the plurality of location controllers are proximate to the location controller; and querying, by the host system, one or more of the plurality of location controllers that are proximate to the location controller in order to verify the location of the location controller.

13. The method of claim 12, further comprising:

generating a discrepancy report in response to determining that the location of the location controller is unverified.

14. The method of claim 8, wherein:

the gaming asset comprises at least one of a gaming device, a chip tray, a drop cart, and a cash box for the gaming device.

15. A management system configured to monitor locations of a plurality of devices within a gaming venue, the management system comprising:

a host system; and a plurality of location controllers in wireless communication with the host system and forming a wireless network therebetween, at least one location controller of the plurality of location controllers configured to:

receive wireless identifiers from at least one of the plurality of devices detected by the at least one location controller as being proximate to the at least one location controller;

identify, based on the wireless identifiers, which of the at least one of the plurality of devices is a mobile device;

determine whether a location of the mobile device has changed with respect to a previously determined location of the mobile device; and forward information regarding the mobile device to the host system for updating the location of the mobile device within the gaming venue in response to determining that the location of the mobile device has changed, wherein the host system is further configured to:

query the mobile device in order to verify the location of the mobile device; and generate a discrepancy report in response to determining that the location of the mobile device is unverified.

16. The management system of claim 15, wherein:

the host system is further configured to:

identify, based on the information regarding the mobile device, which of the plurality of location controllers are proximate to the mobile device; and query one or more of the plurality of location controllers that are proximate to the mobile device in order to verify the location of the mobile device.

* * * * *